United States Patent
Weisz

(10) Patent No.: US 11,427,079 B1
(45) Date of Patent: Aug. 30, 2022

(54) BI-DIRECTIONAL ROTARY SPEED CONVERSION VIA MIRRORED ROTATIONAL POWER TRANSFER TUNNEL

(71) Applicant: CVET Patent Technologies Inc., Markham (CA)

(72) Inventor: Ervin Weisz, Thornhill (CA)

(73) Assignee: CVET Patent Technologies Inc., Markham (CA)

( * ) Notice: Subject to any disclaimer, the term of this patent is extended or adjusted under 35 U.S.C. 154(b) by 0 days.

(21) Appl. No.: 17/734,431

(22) Filed: May 2, 2022

(51) Int. Cl.
  *B60K 17/16* (2006.01)
  *B60K 17/02* (2006.01)
  *B60K 17/14* (2006.01)
  *B60K 17/22* (2006.01)

(52) U.S. Cl.
  CPC .............. *B60K 17/16* (2013.01); *B60K 17/02* (2013.01); *B60K 17/14* (2013.01); *B60K 17/22* (2013.01)

(58) Field of Classification Search
  CPC ........ B60K 17/16; B60K 17/02; B60K 17/14; B60K 17/15
  USPC .................................................... 74/321, 331
  See application file for complete search history.

(56) References Cited

U.S. PATENT DOCUMENTS

| | | | |
|---|---|---|---|
| 1,173,778 A | 2/1916 | Coyle | |
| 6,461,266 B1 | 10/2002 | Weisz | |
| 6,726,588 B2 | 4/2004 | Weisz | |
| 6,743,143 B1 | 6/2004 | Usoro et al. | |
| 7,033,298 B2 | 4/2006 | Usoro et al. | |
| 7,263,907 B2 | 9/2007 | Stevenson | |
| 7,490,526 B2 | 2/2009 | Forsyth | |
| 7,611,433 B2 | 11/2009 | Forsyth | |
| 7,913,581 B2 | 3/2011 | Jackson | |
| 8,051,732 B2 | 11/2011 | Gitt | |
| 8,109,167 B2* | 2/2012 | Mohlin | F16H 3/006 74/331 |
| 8,151,662 B2 | 4/2012 | Fitzgerald et al. | |
| 8,323,142 B2* | 12/2012 | Masumoto | F16H 37/0833 475/221 |
| 8,333,126 B2 | 12/2012 | Enstroem et al. | |
| 8,701,808 B2 | 4/2014 | Zhu et al. | |
| 8,795,115 B2 | 8/2014 | Puiu | |
| 8,997,961 B2 | 4/2015 | Absenger et al. | |
| 9,121,480 B2 | 9/2015 | Weisz | |
| 9,664,260 B2 | 5/2017 | Weisz | |
| 9,714,698 B2 | 7/2017 | Markl et al. | |

(Continued)

*Primary Examiner* — Ha Dinh Ho
(74) *Attorney, Agent, or Firm* — Caesar Rivise, PC

(57) ABSTRACT

An apparatus includes: a first shaft coupled to second and third shafts; a fourth shaft coupled to fifth and sixth shafts; a first differential coupled to the second and fifth shafts; a second differential coupled to the third and sixth shafts; a seventh shaft coupled to the first differential; an eighth shaft coupled to the second differential; a first torque and/or speed converter coupled to the seventh shaft; a second torque and/or speed converter coupled to the eighth shaft; a ninth shaft coupled to the first torque and/or speed converter; a tenth shaft coupled to the second torque and/or speed converter; an eleventh shaft coupled to the ninth and tenth shafts; a one-way bearing/coupling-uncoupling device coupled to at least one of the fourth, fifth, sixth, seventh, and ninth shafts; and an other one-way bearing/coupling-uncoupling device coupled to at least one of the fourth, sixth, eighth, and tenth shafts.

30 Claims, 29 Drawing Sheets

(56) References Cited

U.S. PATENT DOCUMENTS

| | | | |
|---|---|---|---|
| 10,119,595 B2 | 11/2018 | Schepperle | |
| 10,221,897 B2 | 3/2019 | Kummer et al. | |
| 10,343,691 B2 | 7/2019 | Prost et al. | |
| 10,605,335 B2 | 3/2020 | Kirchhoffer | |
| 10,753,432 B2 * | 8/2020 | Hwang | B60K 6/48 |
| 10,807,466 B1 | 10/2020 | Haka et al. | |
| 10,814,714 B2 | 10/2020 | Hummel | |
| 10,836,375 B2 | 11/2020 | Kaufman et al. | |
| 10,837,522 B2 | 11/2020 | Hummel | |
| 10,837,533 B1 * | 11/2020 | Kim | F16H 37/046 |
| 10,837,534 B1 * | 11/2020 | Kim | F16H 37/0826 |
| 10,864,812 B2 | 12/2020 | Witt et al. | |
| 10,883,573 B2 | 1/2021 | Devreese et al. | |
| 10,955,029 B2 | 3/2021 | Eo et al. | |
| 10,955,036 B2 | 3/2021 | Kim et al. | |
| 10,975,960 B2 | 4/2021 | Rietdorf et al. | |
| 11,231,090 B2 | 1/2022 | Peterson et al. | |
| 11,274,732 B2 | 3/2022 | Roske et al. | |
| 11,280,391 B2 | 3/2022 | Engerman | |
| 11,293,526 B2 | 4/2022 | Gitt et al. | |
| 11,313,442 B2 | 4/2022 | Steffens et al. | |
| 11,325,455 B2 | 5/2022 | Park | |
| 11,326,668 B1 | 5/2022 | Matsuda | |
| 11,331,999 B2 | 5/2022 | Obergasser et al. | |
| 2007/0220999 A1 * | 9/2007 | Hatori | F16H 3/097 74/330 |
| 2013/0239715 A1 | 9/2013 | Singh et al. | |

\* cited by examiner

BI-DIRECTIONAL ROTARY SPEED CONVERSION VIA MIRRORED ROTATIONAL POWER TRANSFER TUNNEL

FIELD OF INVENTION

The field of invention for Applicant's apparatus, devices, systems, and methods relates to rotational power transmission apparatus, devices, systems, and methods of using the same.

BRIEF DESCRIPTION OF THE DRAWINGS

Applicant's apparatus, devices, systems, and methods will be described by way of example with reference to the accompanying drawings, in which.

BACKGROUND

Figure 1:
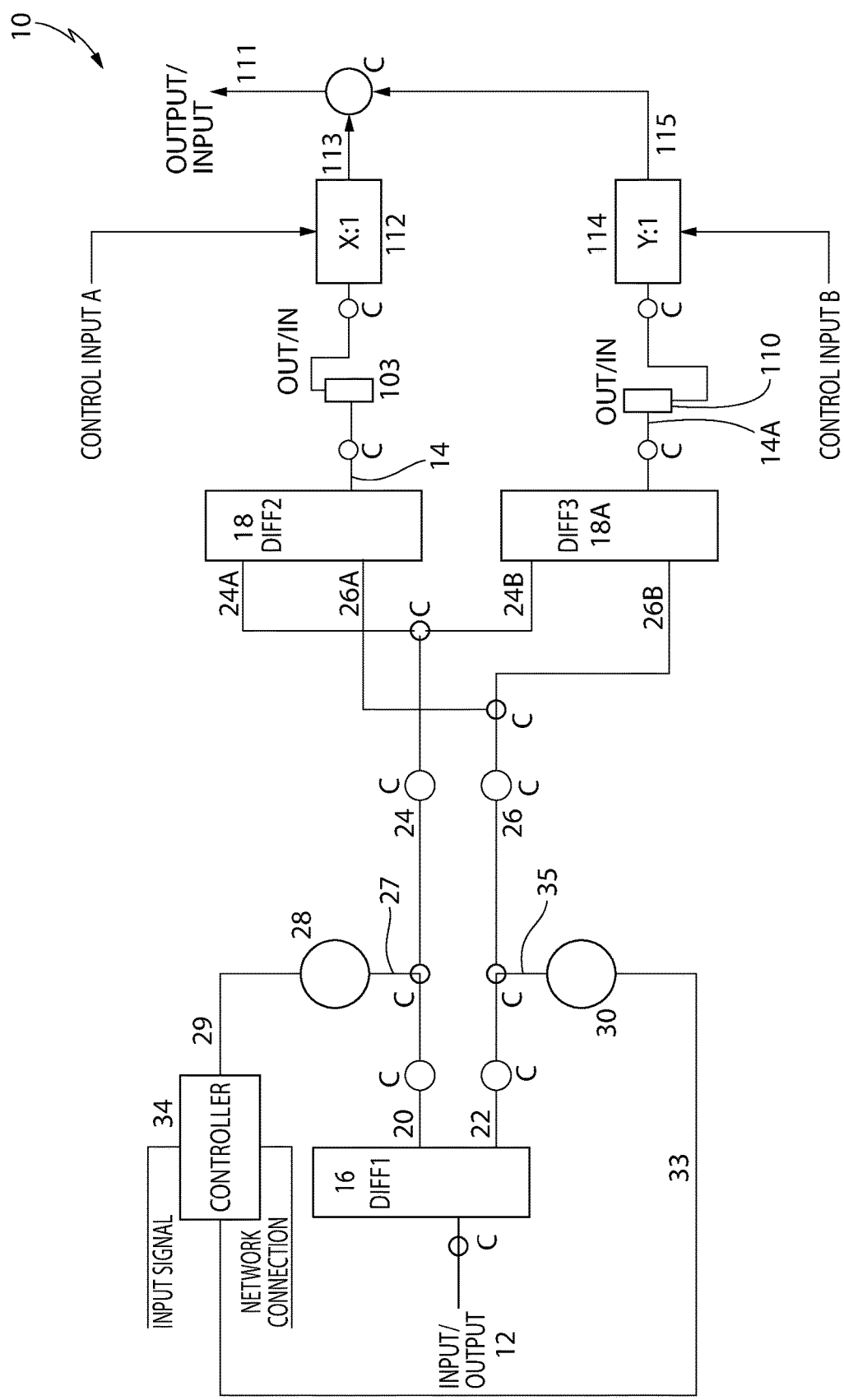
FIG. 1 is a block flow diagram of an exemplary embodiment of Applicant's apparatus or system.

Rotational power transmission apparatus and systems are disclosed in U.S. Pat. Nos. 6,461,266 and 6,726,588 as well as in U.S. Pat. Nos. 9,121,480 and 9,664,260. The disclosures of all four of said patents are incorporated herein by reference.

U.S. Pat. Nos. 6,461,266 and 6,726,588 disclose various embodiments of differential engines with variable torque inputs. U.S. Pat. Nos. 9,121,480 and 9,664,260 disclose various embodiments of a differential engine controlled rotational power transmission apparatus and systems using the same. Said patents also teach and disclose methods of providing rotational power transmission apparatus. Although each of those four patents made significant advances in the art of rotational power transmission apparatus and systems, there remain various problems not addressed by the prior art.

Applicant's apparatus, devices, systems, and methods taught and disclosed herein address a number of those problems, including but not limited to the problem(s) of optimal efficiency of all rotating components that are sources or sinks for rotational power under all conditions of speed and torque demands, variation of torque and/or speed produced to meet effectively random internal or external demands for torque and or speed under optimal conditions of efficiency for transitions between the demanded levels of torque and/or speed and minimization of interruption of torque when transfer of torque and/or speeds are demanded by a gear ratio change. For example, the problem of efficiency of source or sources of rotary power is solved enabling operation of all rotating sources or sinks of power to always operate at or near their optimal efficiency of rotational speeds for all vehicle (or other load) speed and/or torque demands and the switching of gear ratios to enable optimization of the energy density of the source(s) or sink(s) of rotational power in a highly efficient and smooth manner and to eliminate the physical disturbance due to interruption of the flow of torque when a gear change is required. That and other problems are solved by Applicant's apparatus, devices, systems, and methods.

Persons skilled in the art will recognize that Applicant's apparatus, devices, systems, and methods disclosed herein and illustrated in the drawings also address and solve other problems not previously addressed by the prior art, and also overcome many deficiencies of the prior art due to the various benefits and advantages of Applicant's apparatus, devices, systems, and methods, which advantages and benefits will become apparent to such persons upon review of the drawings and the complete disclosure herein.

BRIEF SUMMARY

There are various aspects of Applicant's apparatus, devices, systems, and methods, and many variations of each aspect.

One aspect is a first apparatus or system that includes a first rotatable shaft coupled to a second rotatable shaft and to a third rotatable shaft; a fourth rotatable shaft coupled to a fifth rotatable shaft and to a sixth rotatable shaft; a first differential coupled to the second rotatable shaft and to the fifth rotatable shaft; a second differential coupled to the third rotatable shaft and to the sixth rotatable shaft; a seventh rotatable shaft coupled to the first differential; an eighth rotatable shaft coupled to the second differential; a first torque and/or speed converter coupled to the seventh rotatable shaft; a second torque and/or speed converter coupled to the eighth rotatable shaft; a ninth rotatable shaft coupled to the first torque and/or speed converter; a tenth rotatable shaft coupled to the second torque and/or speed converter; an eleventh rotatable shaft coupled to both the ninth rotatable shaft and the tenth rotatable shaft; at least one one-way bearing/coupling-uncoupling device coupled to at least one of the fourth rotatable shaft, the fifth rotatable shaft, the sixth rotatable shaft, the seventh rotatable shaft, and the ninth rotatable shaft; and at least one an other one-way bearing/coupling-uncoupling device coupled to at least one of the fourth rotatable shaft, the sixth rotatable shaft, the eighth rotatable shaft, and the tenth rotatable shaft.

In a first variation of the first apparatus or system, a transfer of torque is bi-directional for at least one of the first rotatable shaft, the second rotatable shaft, the third rotatable shaft, the fourth rotatable shaft, the fifth rotatable shaft, the sixth rotatable shaft, the seventh rotatable shaft, the eighth rotatable shaft, the ninth rotatable shaft, the tenth rotatable shaft, and the eleventh rotatable shaft.

In a second variation of the first apparatus or system, the at least one first one-way bearing/coupling-uncoupling device transfers rotary torque between: (a) at least one of the fourth rotatable shaft and the fifth rotatable shaft, the seventh rotatable shaft and the first torque and/or speed converter, and the first torque and/or speed converter and the ninth rotatable shaft, when the fourth rotatable shaft is rotating in a first direction, or when the first one-way bearing/coupling-uncoupling device engages to transfer torque; or (b) at least one of the first rotatable shaft and the second rotatable shaft, the seventh rotatable shaft and the first torque and/or speed converter, and the first torque and/or speed converter and the ninth rotatable shaft, when the first rotatable shaft is rotating in the first direction, or when the first one-way bearing/coupling-uncoupling device engages to transfer torque; or (c) at least one of the first rotatable shaft and the second rotatable shaft, the fourth rotatable shaft and the fifth rotatable shaft, the seventh rotatable shaft and the first torque and/or speed converter, and the first torque and/or speed converter and the ninth rotatable shaft, when the seventh rotatable shaft is rotating in a first direction, or when the first one-way bearing/coupling-uncoupling device engages to transfer torque.

In a variation of the second variation of the first apparatus or system, the second one-way bearing/coupling-uncoupling device transfers rotary torque between: (a) at least one of the fourth rotatable shaft and the sixth rotatable shaft, the eighth rotatable shaft and the second speed and/or torque converter, and the second speed and/or torque converter and the tenth rotatable shaft, when the fourth rotatable shaft is rotating in a second direction opposite the first direction, or when the second one-way bearing/coupling-uncoupling device engages to transfer torque, if the first one-way bearing/coupling-uncoupling device is coupled to the fourth rotatable shaft: or (b) at least one of the first rotatable shaft and the sixth rotatable shaft, the eighth rotatable shaft and the second speed and/or torque converter, the second speed and/or torque converter and the tenth rotatable shaft, when the first rotatable shaft is rotating in a second direction opposite the first direction, or when the second one-way bearing/coupling-uncoupling device engages to transfer torque, if the first one-way bearing/coupling-uncoupling device is coupled to the first rotatable shaft; or (c) at least one of the first rotatable shaft and the sixth rotatable shaft, the fourth rotatable shaft and the fifth rotatable shaft, the eighth rotatable shaft and the second speed and/or torque converter, the second speed and/or torque converter and the tenth rotatable shaft, when the eighth rotatable shaft is rotating in a second direction opposite the first direction, or when the second one-way bearing/coupling-uncoupling device engages to transfer torque.

In a third variation of the first apparatus or system, a torque conversion ratio of the first torque and/or speed converter is fixed or is changeable by a first internal control mechanism or by a first external control input.

In a variation of the third variation of the first apparatus or system, a torque conversion ratio of the second torque and/or speed converter is fixed or is changeable by a second internal control mechanism or by a second external control input.

In a fourth variation of the first apparatus or system, at least one of the first rotatable shaft, the second rotatable shaft, the seventh rotatable shaft, and the eighth rotatable shaft has coupled to said at least one rotatable shaft at least one coupler.

In a variation of the fourth variation of the first apparatus or system, at least one of the at least one coupler includes a device providing a torque and/or conversion ratio.

In a variant of the variation in the paragraph above, at least one device provides a torque and/or speed conversion ratio different than at least one other torque and/or speed conversion ratio provided by at least one other device.

In a fifth variation of the first apparatus or system, a first speed conversion ratio between the second rotatable shaft and the seventh rotatable shaft is the same as a second speed conversion ratio between the third rotatable shaft and the eighth rotatable shaft, and a third speed conversion ratio between the fifth rotatable shaft and the seventh rotatable shaft is the same as a fourth speed conversion ratio between the sixth rotatable shaft and the eighth rotatable shaft.

In a variation of the fifth variation of the first apparatus or system, the first speed conversion ratio is the same as the third speed conversion ratio.

A second apparatus or system is similar to the first apparatus or system or any of the variations and variants discussed above, but also includes a first gear mechanism or a first other mechanism in the first differential, wherein there are a plurality of rotational speeds of the second rotatable shaft and a plurality of rotational speeds of the fifth rotatable shaft whereby a rotational speed of the seventh rotatable shaft is zero, and wherein the first gear mechanism or the first other mechanism transfers a rotational speed and/or torque to or from the seventh rotatable shaft when a difference of rotational speed occurs between the rotational speed of the second rotatable shaft and the rotational speed of the fifth rotatable shaft, whereby said difference of rotational speed is different than an other difference of rotational speed between the rotational speed of the second rotatable shaft and the rotational speed of the fifth rotatable shaft that causes the rotational speed of the seventh rotatable shaft to be zero.

A third apparatus or system is similar to the second apparatus and system and to the first apparatus or system or any of the variations and variants discussed above, but also includes a second gear mechanism or a second other mechanism in the second differential, wherein there are a plurality of rotational speeds of the third rotatable shaft and a plurality of rotational speeds of the sixth rotatable shaft whereby a rotational speed of the eighth rotatable shaft is zero, and wherein the second gear mechanism or the second other mechanism transfers a rotational speed and/or torque to or from the eighth rotatable shaft when a difference of rotational speed occurs between a rotational speed of the third rotatable shaft and a rotational speed of the sixth rotatable shaft, whereby said difference of rotational speed is different than an other difference of rotational speed between the rotational speed of the third rotatable shaft and the rotational speed of the sixth rotatable shaft that causes the rotational speed of the eighth rotatable shaft to be zero.

A fourth apparatus or system is similar to the first apparatus or system or any of the variations and variants discussed above, but also includes a first another rotatable shaft coupled to a third differential; a second another rotatable shaft coupled to the first rotatable shaft and to a first motor/generator; a third another rotatable shaft coupled to the third differential; a second motor/generator coupled to the third another rotatable shaft and to the fourth rotatable shaft; and at least one controller in communication with at least one of the first motor/generator or the second motor/generator, or with a third motor/generator coupled to the eleventh rotatable shaft.

In a variation of the fourth apparatus or system, the at least one controller is in communication with at least one network connection.

Another aspect is a fifth apparatus or system that includes a first rotatable shaft coupled to a second rotatable shaft and to a third rotatable shaft; a fourth rotatable shaft coupled to a fifth rotatable shaft and to a sixth rotatable shaft; a first differential coupled to the second rotatable shaft and to a thirteenth rotatable shaft; a second differential coupled to the third rotatable shaft and to the sixth rotatable shaft; a seventh rotatable shaft coupled to the first differential; an eighth rotatable shaft coupled to the second differential; a first torque and/or speed converter coupled to the seventh rotatable shaft; a second torque and/or speed converter coupled to the eighth rotatable shaft; a ninth rotatable shaft coupled to the first torque and/or speed converter; a tenth rotatable shaft coupled to the second torque and/or speed converter; an eleventh rotatable shaft coupled to the ninth rotatable shaft and to the tenth rotatable shaft; a third differential coupled to a twelfth rotatable shaft and to a fourteenth rotatable shaft; a fourth differential coupled to a fifteenth rotatable shaft and to the fifth rotatable shaft; a sixteenth rotatable shaft coupled to the third differential; a seventeenth rotatable shaft coupled to the fourth differential; a third torque and/or speed converter coupled to the sixteenth rotatable shaft; a fourth torque and/or speed converter coupled to the seventeenth rotatable shaft; an eighteenth rotatable shaft coupled to the third torque and/or speed converter and to both the ninth rotatable shaft and the eleventh rotatable shaft; a nineteenth rotatable shaft coupled to the fourth torque and/or speed converter and to both the ninth rotatable shaft and the eleventh rotatable shaft; at least one one-way bearing/coupling-uncoupling device coupled to at least one of the first rotatable shaft, the second rotatable shaft, the third rotatable shaft, the fourteenth rotatable shaft, the fifteenth rotatable shaft, a twentieth rotatable shaft, and a twenty first rotatable shaft; and at least one an other one-way bearing/coupling-uncoupling device coupled to at least one of the fourth rotatable shaft, the fifth rotatable shaft, the sixth rotatable shaft, the twelfth rotatable shaft, the thirteenth rotatable shaft, a twenty second rotatable shaft, and a twenty third rotatable shaft.

In a first variation of the fifth apparatus or system, a transfer of torque is bi-directional for at least one of the first rotatable shaft, the second rotatable shaft, the third rotatable shaft, the fourth rotatable shaft, the fifth rotatable shaft, the sixth rotatable shaft, the seventh rotatable shaft, the eighth rotatable shaft, the ninth rotatable shaft, the tenth rotatable shaft, the eleventh rotatable shaft, the twelfth rotatable shaft, the thirteenth rotatable shaft, the fourteenth rotatable shaft, the fifteenth rotatable shaft, the sixteenth rotatable shaft, the seventeenth rotatable shaft, the eighteenth rotatable shaft, the nineteenth rotatable shaft, the twentieth rotatable shaft, the twenty first rotatable shaft, the twenty second rotatable shaft, and the twenty third rotatable shaft.

In a second variation of the fifth apparatus or system, a first of the at least one an other one-way bearing/coupling-uncoupling devices transfers rotary torque between the fourth rotatable shaft and the thirteenth rotatable shaft or the twelfth rotatable shaft when the fourth rotatable shaft is rotating in a first direction, or when the first of the at least one an other one-way bearing/coupling-uncoupling device engages to transfer torque, or a second of the at least one an other one-way bearing/coupling-uncoupling devices transfers rotary torque between the fourth rotatable shaft and the sixth rotatable shaft or the fifth rotatable shaft when the fourth rotatable shaft is rotating in a second direction opposite the first direction, or when the second of the at least one an other one-way bearing/coupling-uncoupling device engages to transfer torque.

In a variation of the second variation of the fifth apparatus or system, a first of the at least one one-way bearing/coupling-uncoupling devices transfers rotary torque between the first rotatable shaft and the fourteenth rotatable shaft or fifteenth rotatable shaft when the first rotatable shaft is rotating in a first direction, or when the first of the at least one one-way bearing/coupling-uncoupling device engages to transfer torque, or a second of the at least one one-way bearing/coupling-uncoupling devices transfers rotary torque between the first rotatable shaft and the second rotatable shaft or the third rotatable shaft when the first rotatable shaft is rotating in a second direction opposite the first direction, or when the second of the at least one one-way bearing/coupling-uncoupling device engages to transfer torque.

In a third variation of the fifth apparatus or system, a torque conversion ratio of the first torque and/or speed converter is fixed or is changeable by a first internal control mechanism or by a first external control input, and a torque conversion ratio of the second torque and/or speed converter is fixed or is changeable by a second internal control mechanism or by a second external control input.

In a variation of the third variation of the fifth apparatus or system, a torque conversion ratio of the third torque and/or speed converter is fixed or is changeable by a third internal control mechanism or by a third external control input, and a torque conversion ratio of the fourth torque and/or speed converter is fixed or is changeable by a fourth internal control mechanism or by a fourth external control input.

In a fourth variation of the fifth apparatus or system, at least one of the first rotatable shaft, the fourth rotatable shaft, the seventh rotatable shaft, and the eighth rotatable shaft has coupled to said at least one rotatable shaft at least one coupler.

In a variation of the fourth variation of the fifth apparatus or system, at least one of the at least one coupler includes a device providing a torque conversion ratio.

In a variant of the variation in the paragraph above, at least one device provides a torque conversion ratio different than at least one other torque conversion ratio provided by at least one other device.

In a fifth variation of the fifth apparatus or system, a first speed conversion ratio between the second rotatable shaft and the seventh rotatable shaft is the same as a second speed conversion ratio between the third rotatable shaft and the eighth rotatable shaft, and a third speed conversion ratio between the fifth rotatable shaft and the seventh rotatable shaft is the same as a fourth speed conversion ratio between the sixth rotatable shaft and the eighth rotatable shaft.

In a variation of the fifth variation of the fifth apparatus or system, the first speed conversion ratio is the same as the third speed conversion ratio.

A sixth apparatus or system is similar to the fifth apparatus or system or any of the variations and variants discussed above, but also includes a first gear mechanism or a first other mechanism in the first differential, wherein there are a plurality of rotational speeds of the second rotatable shaft and a plurality of rotational speeds of the thirteenth rotatable shaft whereby a rotational speed of the seventh rotatable shaft is zero, wherein the first gear mechanism or the first other mechanism transfers a rotational speed and torque to or from the seventh rotatable shaft when a difference of rotational speed occurs between the rotational speed of the second rotatable shaft and the rotational speed of the thirteenth rotatable shaft, whereby said difference of rotational speed is different than an other difference of rotational speed between the rotational speed of the second rotatable shaft and the rotational speed of the thirteenth rotatable shaft that causes the rotational speed of the seventh rotatable shaft to be zero, and a second gear mechanism or a second other mechanism in the second differential, wherein there are a plurality of rotational speeds of the third rotatable shaft and a plurality of rotational speeds of the sixth rotatable shaft whereby a rotational speed of the eighth rotatable shaft is zero, and wherein the second gear mechanism or the second other mechanism transfers a rotational speed and torque to or from the eighth rotatable shaft when a difference of rotational speed occurs between a rotational speed of the third rotatable shaft and a rotational speed of the sixth rotatable shaft, whereby said difference of rotational speed is different than an other difference of rotational speed between the rotational speed of the third rotatable shaft and the rotational speed of the sixth rotatable shaft that causes the rotational speed of the eighth rotatable shaft to be zero.

A seventh apparatus or system is similar to the sixth apparatus and system and to the fifth apparatus or system or any of the variations and variants discussed above, but also includes a third gear mechanism or a third other mechanism in the third differential, wherein there are a plurality of rotational speeds of the fourteenth rotatable shaft and a plurality of rotational speeds of the twelfth rotatable shaft whereby a rotational speed of the sixteenth rotatable shaft is zero, wherein the third gear mechanism or the third other mechanism transfers a rotational speed and torque to or from the sixteenth rotatable shaft when a difference of rotational speed occurs between the rotational speed of the fourteenth rotatable shaft and the rotational speed of the twelfth rotatable shaft, whereby said difference of rotational speed is different than an other difference of rotational speed between the rotational speed of the fourteenth rotatable shaft and the rotational speed of the twelfth rotatable shaft that causes the rotational speed of the sixteenth rotatable shaft to be zero, and a fourth gear mechanism or a fourth other mechanism in the fourth differential, wherein there are a plurality of rotational speeds of the fifteenth rotatable shaft and a plurality of rotational speeds of the fifth rotatable shaft whereby a rotational speed of the seventeenth rotatable shaft is zero, and wherein the fourth gear mechanism or the fourth other mechanism transfers a rotational speed and torque to or from the seventeenth rotatable shaft when a difference of rotational speed occurs between a rotational speed of the fifteenth rotatable shaft and a rotational speed of the fifth rotatable shaft, whereby said difference of rotational speed is different than an other difference of rotational speed between the rotational speed of the fifteenth rotatable shaft and the rotational speed of the fifth rotatable shaft that causes the rotational speed of the seventeenth rotatable shaft to be zero.

An eighth apparatus or system is similar to the fifth apparatus or system or any of the variations and variants discussed above, but also includes at least one motor/generator coupled by at least one rotatable shaft to the first rotatable shaft or to the fourth rotatable shaft; and at least one controller in communication with at least one of the at least one motor/generator or with at least one an other motor/generator coupled to the eleventh rotatable shaft.

In a variation of the eighth apparatus or system, the at least one controller is in communication with at least one network connection.

DETAILED DESCRIPTION

For the purpose of promoting an understanding of Applicant's apparatus, devices, systems, and methods, references are made in the text to exemplary embodiments, only some of which are described herein. It should be understood that no limitations on the scope of Applicant's apparatus, devices, systems, and methods are intended by describing these exemplary embodiments.

One of ordinary skill in the art will readily appreciate that alternate but functionally equivalent materials, components, and designs may be used. The inclusion of additional elements may be deemed readily apparent and obvious to one of ordinary skill in the art. The exemplary embodiments and the specific elements disclosed herein are not to be interpreted as limiting, but rather as a representative basis for teaching one of ordinary skill in the art to employ Applicant's apparatus, devices, systems, and methods.

It should be understood that the drawings are not necessarily to scale; instead, emphasis has been placed upon illustrating the principles of Applicant's apparatus, devices, systems, and methods. In addition, in the exemplary embodiments illustrated in the drawings, like reference numerals in the various Figures of the drawings refer to like or similar elements.

Applicant's apparatus, devices, systems, and methods are widely applicable to numerous embodiments, as is readily apparent from the disclosure herein. Those skilled in the art will recognize that Applicant's apparatus, devices, systems, and methods may be practiced with modification and alteration without departing from the teachings disclosed herein.

A description of an embodiment with several components in communication with each other does not imply that all such components are required. On the contrary a variety of optional components are described to illustrate the wide variety of possible embodiments of Applicant's apparatus, devices, systems, and methods.

The term "shaft" as used herein, such as in rotatable "shaft," is not limited to a distinct physical entity that can couple or be coupled to one, or to one or more other rotatable entities, but may also be a part of, or represent an entity or assembly that enables flow of rotational activity to traverse between two or more other rotatable entities or assemblies, where the "shaft" may be an embedded, imperceptible, non-distinct aspect of a single rotatable entity or conjoined rotatable entities.

The term "couple" (and variations of it, such as coupled, couples, coupling, etc.) as used herein is not limited to direct mechanical, electrical, or other forms of coupling, connection, or communication between components, entities, or assemblies, but may also include indirect mechanical, electrical, or other forms of coupling, connection, or communication through multiple components, entities, or assemblies.

FIGS. 1-12 and the disclosure herein illustrate and discuss various embodiments of Applicant's apparatus, devices, systems, and methods for enhancing the performance and manufacturability of such apparatus, devices, systems, and methods, including exceptional and economically viable ways to provide variable gear-ratios between rotatable shaft 12 and rotatable shaft 111 while enabling the controlled non-linear relationship between the speeds of rotation of rotatable shaft 12 and rotatable shaft 111.

Applicant's apparatus, devices, systems, and methods discussed herein and illustrated in the drawings also disclose alternate and exceptional ways to produce optimally efficient and controlled variations in gear-ratios where an electric motor or motors are used to generate (or sink) electrical power. Some examples are shown in FIGS. 1 and 1A-1E, and in FIGS. 11 and 11A-11G. These exceptional means for controlled variation in gear-ratios enable minimizing electric motor size for a given maximum rotational power requirement and enabling the electric motors to operate at or near their optimal speed of rotational efficiency for all values of rotational torque that are allowed by design of the system to be transferred to the motor(s) or all the values of rotational torque that are allowed by design to be produced by the motor(s).

All rotatable shafts, including rotatable shafts 12, 20, 22, 24, 26, 113, 115, and 111 in FIG. 1, can support flow of rotational energy in either direction, meaning that an INPUT shaft may become an OUTPUT shaft and vice versa, and this may occur on a controlled or uncontrolled basis, due to internal circumstance(s) of the apparatus or system being disclosed, or due to external circumstances to the apparatus or system being disclosed, or to an interactive combination of internal and external circumstances. There is no limitation to the timing of occurrence of energy flows or direction of energy flows (though there may be inherent constraints in response and magnitudes due to component characteristics).

"C" denotes a coupler in FIGS. 1 through 11G. Although all couplers are identified with a letter C in the drawings, each coupler can be different from any other coupler. For example, a coupler may be a universal joint to allow for physical position variations between two shafts, or a coupler may be a gearbox to provide speed and torque differences between two or more shafts, or various combinations of bevel type gears to enable non-straight-line transfer of rotational energy between two or more shafts, or a differential type of coupling arrangement for two or more shafts, which may or may not have other elements of control such as one or more brakes, etc., or other method for similar functionality as the differential type of coupling with one or more elements of control, or compliant material between two or more shafts in an arrangement that enables certain physical variations in shaft position while maintaining transfer of rotation torque without interruption, to magnetic coupling between two or more shafts if physical contact between shafts needs to be avoided, etc.

Also, the motor or motors coupled to one of either rotatable shaft 24 or rotatable shaft 26 can be magnet less motor(s) (i.e., no magnets are used in the motor or motors acting as motor or generator) and which are not induction motors, nor brush motors.

FIGS. 1, 1A-1E, 2, 2A-2D, 7, 8, 9, 10, 11, and 11A-11G show exemplary embodiments with control inputs to the X:1 and Y:1 gear ratios through input control signals, namely Control Input A and Control Input B. The variation in values of X and Y can each approach the range of negative infinity to positive infinity, without any relationship required between the values of X and Y. Similarly, FIGS. 9, 10, 11 and 11A-11G show exemplary embodiments that also include control inputs to the W:1 and Z:1 gear ratios through input control signals, namely Control Input C and Control Input D. The variation in values of W and Z can each approach the range of negative infinity to positive infinity, without any relationship required between the values of W and Z.

Either rotatable shaft 113 or rotatable shaft 115 and where applicable, rotatable shaft 113A or rotatable shaft 115A, or additional such shafts as may be included in an embodiment of Applicant's apparatus, normally produces force or accepts force to be transmitted through it, while the other rotatable shaft can rotate without impediment, as not both shafts produce force or accept force to be transmitted through them at the same time.

In FIG. 1, with either motor/generator 28, 30 acting as a load on rotatable shaft 20 or rotatable shaft 22 (not both) and thus acting as a genera tor, and the other motor/generator 28, 30 being given the power for motoring, one of the one-way bearing/coupling-uncoupling device s 103, 110 transfers the rotational force from/to rotatable shafts 14 or 14A and to/from torque and/or speed converters 112 or 114 respectively, but not both. This enables a controlled transition between two different torque and/or speed converters 112 and 114 and to/from rotatable shaft 111. As the system transfers of rotational power between torque and/or speed converters 112 and 114, prior to the transfer, the torque and/or speed converters 112 and 114 can change their gear-ratios to any gear-ratio values they are designed to support. The smoothness may need to meet certain performance requirements and the motor/controller (and power source) coupled to the Output/Input shaft 111 (or 113) provides the short-term rotational power source or sink that can act to buffer the disturbance due to the interruption of the torque during the gear shifting process and produce a smoother transition by reducing or eliminating the torque interruption for this short period of time.

Without effecting the rotational power operation as a rotational power source or sink coupled to rotatable shaft 12, changing the motor to act as the generator and thus the generator to act as the motor can continue to produce or accept rotational power through rotatable shaft 14 or 14A, or additional such rotatable shafts as may be included in the embodiment of Applicant's apparatus without impacting the value of rotational power being transferred, but then producing change to the transfer of rotational power between the torque and/or speed converters 112 and 114, or other torque and/or speed converters as may be included in the embodiments of Applicant's apparatus.

For example, in the embodiment shown in FIG. 1, where rotatable shaft 111 is coupled to the wheels of a vehicle, rotational power acting as a source coupled to rotatable shaft 12, differential 16 transfers this rotational power to rotatable shafts 20 and 22 for torque to be transferred through differential 16. For simplification of example, if differential 16 has a 1:1:1 ratio of speeds between rotatable shafts 12, 20 and 22, and if rotatable shafts 20 and 22 experience the same torque applied to them, which torque could include "0" torque, both rotatable shafts 20 and 22 will rotate at the same speed, thus converting a single source of rotational power coupled to rotatable shaft 12 to dual sources of rotational power from rotatable shafts 20 and 22. Motor 28 which is coupled to rotatable shaft 20 can be controlled by controller 34 to operate as a sink for rotational power and thereby act as a generator to be a source of power for motor 30 to be controlled by controller 34 to act as a source of rotational power coupled to rotatable shaft 22, or vice versa with motor 30 acting as a generator to power motor 28. In this example, there is no external source of power for the motors 28 and 30, though there would be a relatively low-level power to support the circuitry of the controller 34. The controller 34 may control the operation of both motor 28 and motor 30. Rotatable shaft 24 is also coupled to rotatable shaft 20 and motor 28, and rotatable shaft 26 is coupled to rotatable shaft 22 and motor 30. If differentials 18 and 18A have gear or other mechanisms such that when rotatable shaft 24A and rotatable shaft 26A are rotating at the same speed and direction, the rotational speed of rotatable shaft 14 is zero, and when rotatable shaft 24B and rotatable shaft 26B are rotating at the same speed and direction, the rotational speed of rotatable shaft 14A is zero.

Rotatable shaft 14 is coupled by one-way bearing/coupling-uncoupling device 103 to rotational speed and/or torque converter 112, and rotatable shaft 14A is coupled by one-way bearing/coupling-uncoupling device 110 to rotational speed and/or torque converter 114. Speed and/or torque converter 112 is coupled to rotatable shaft 113, and speed and/or torque converter 114 is coupled to rotatable shaft 115. Both rotatable shafts 14 and 14A rotate at the same speed and in the same direction, with the direction of rotation of rotatable shafts 14 and 14A controlled by the relative speed between rotatable shaft 24 and rotatable shaft 26. When motor 28 operates as a generator and provides power to enable controller 34 to operate motor 30 as a source of rotational power, motor 28 acts as a sink for rotational power on rotatable shaft 20, which is coupled to rotatable shaft 24 and motor 28 slows down the speed of rotation of rotatable shaft 24 relative to the rotational speed of rotatable shaft 26 and rotatable shafts 14 and 14A rotate in one direction. When the reverse occurs through control of controller 34, such that motor 30 operates as a generator and motor 28 as a source of rotational power, with rotatable shaft 26 rotating slower than rotatable shaft 24, but still rotating in the same direction as before, rotatable shafts 14 and 14A rotate in the opposite direction.

When rotatable shafts 14 and 14A start to rotate in one direction and produce rotating torque in the same direction, rotatable shaft 14 coupled to one-way bearing/coupling-uncoupling device 103 will be transferring torque to speed and/or torque converter 112 and to rotatable shaft 113 coupled to Output/Input rotatable shaft 111 and rotatable shaft 14A coupled to one-way bearing/coupling-uncoupling device 110 will not transfer any torque.

When the direction of rotation on rotatable shafts 14 and 14A is opposite to the example above, with direction of torque in the direction of rotation, rotatable shaft 14A transfers torque to speed and/or torque converter 114, coupled to rotatable shaft 115, coupled to Output/Input shaft 111.

Depending on demand on the vehicle speed and torque, it may be determined that a different gear ratio than provided by torque and/or speed converter 112 is required, and this new gear ratio that would satisfy the demand would be internally or externally selected in torque and/or speed converter 114 in a relatively simple manner while there is no torque being transferred through the torque and/or speed converter 114. To enable the torque produced by rotary power source coupled to rotatable shaft 12 to flow through the new gear ratio in torque and/or speed converter 114 and to rotatable shaft 111, controller 34 is commanded by its input signal or via its network connection to change the relative speeds of rotatable shafts 24 and 26 without changing the direction of their direction of rotation. This change in relative speeds between rotatable shafts 24 and 26 will cause rotatable shafts 14 and 14A to rotate in the opposite direction of rotation, which will cause one-way bearing/coupling-uncoupling device 103 to cease transferring rotational torque and cause one-way bearing/coupling-uncoupling device 110 to start transferring rotational torque and produce rotational torque at rotatable shaft 14A coupled to torque and/or speed converter 114 with a specific internally or externally selected gear ratio, to rotatable shaft 115 and coupled to rotatable shaft 111. Changing the relative speed between rotatable shafts 24 and 26 enables shifting the transfer of torque between torque and/or speed converters 112 and 114.

The changing of the capability to transfer torque between torque and/or speed converters 112 and 114 is done under conditions where there is no transfer of torque from rotatable shaft 12 to rotatable shaft 111 until the relative change in speeds between rotatable shaft 24 and rotatable shaft 26 is sufficient to enable transfer of torque through the selected one-way bearing/coupling-uncoupling device 103 or one-way bearing/coupling-uncoupling device 110. The change in relative speeds of rotatable shaft 24 and rotatable shaft 26 is to be done sufficiently quickly and under sufficient precision of control by controller 34 as to produce the gear ratio change relatively quickly with minimized torque interruption.

As an electric motor 48 and its controller 52 (connected to a battery pack and/or possibly a super capacitor) can be a relatively small capacity electric motor but can provide large rotational power source or sink for a short time and help sufficiently reduce or eliminate the torque interruption that can occur when shifting between differential 18 and differential 18A or additional differentials as may be included in an embodiment of the Applicant's apparatus. Electric motor 48 can consist of a multitude of smaller electric motors connected in parallel or in series, each with its own controller functionality in the way controller 52 provides controller functionality for electric motor 48.

A significant, fundamental benefit of this system is that the rotational power produced or used through rotatable shaft 12 is not linearly related to the rotational power produced or used by rotatable shafts 14 and 14A, and the direction of rotational torque of rotatable shafts 14 and 14A is independent of the direction of rotation of rotatable shaft 12.

This allows for the rotational power source (sink) coupled to rotatable shaft 12 to be designed and/or dynamically controlled to run at the most efficient speed under any specific torque demand to produce or sink rotational power on rotatable shafts 14, 14A (14B and 14C and any other such shafts as may be embodied in Applicant's apparatus).

Additionally and importantly, unlike other systems using differential gears and dual or multiple motors and which require their motor to traverse through a wide range of speeds and directions, including motor (/generator) speeds that produce low or lower than optimal efficiency of operation, Applicant's system enables the motor/generator pair to rotate at or near their ideal and optimal efficiency of speed, under all conditions of speed and torque (power) transfer. In general, when the motor and generator are rotating at a certain range of speeds, they will not be transferring speed or torque between the input and output of the system.

FIG. 1 illustrates an embodiment of Applicant's apparatus or system 10 for transmitting or accepting force through two different torque and/or speed converters 112 and 114, where the apparatus allows switching between the two different gear ratios, and the gear ratio of each torque and/or speed converter can change the gear ratio while torque is not being transferred though it.

Multiple couplers C are shown in FIG. 1 and in many of the other Figures at various locations and appear similar in the illustrations. However, any coupler may be mechanically or otherwise different from any other coupler. Also, the couplers may be positioned at locations other than that shown in FIG. 1 (and in other Figures). For example, in the alternative embodiments illustrated in FIGS. 1A through 1E, various couplers C are located at positions different than the locations shown for the embodiment illustrated in FIG. 2.

A vehicle's movement covers the range of being stopped, being forced in forward movement to overcome air friction and other factors, at various and varying speeds, and being forced to slow down while moving forward. Reverse movement of the vehicle is a separate activity and can be simply created with known gearing methods and would typically start from a stopped position.

Figure 2:
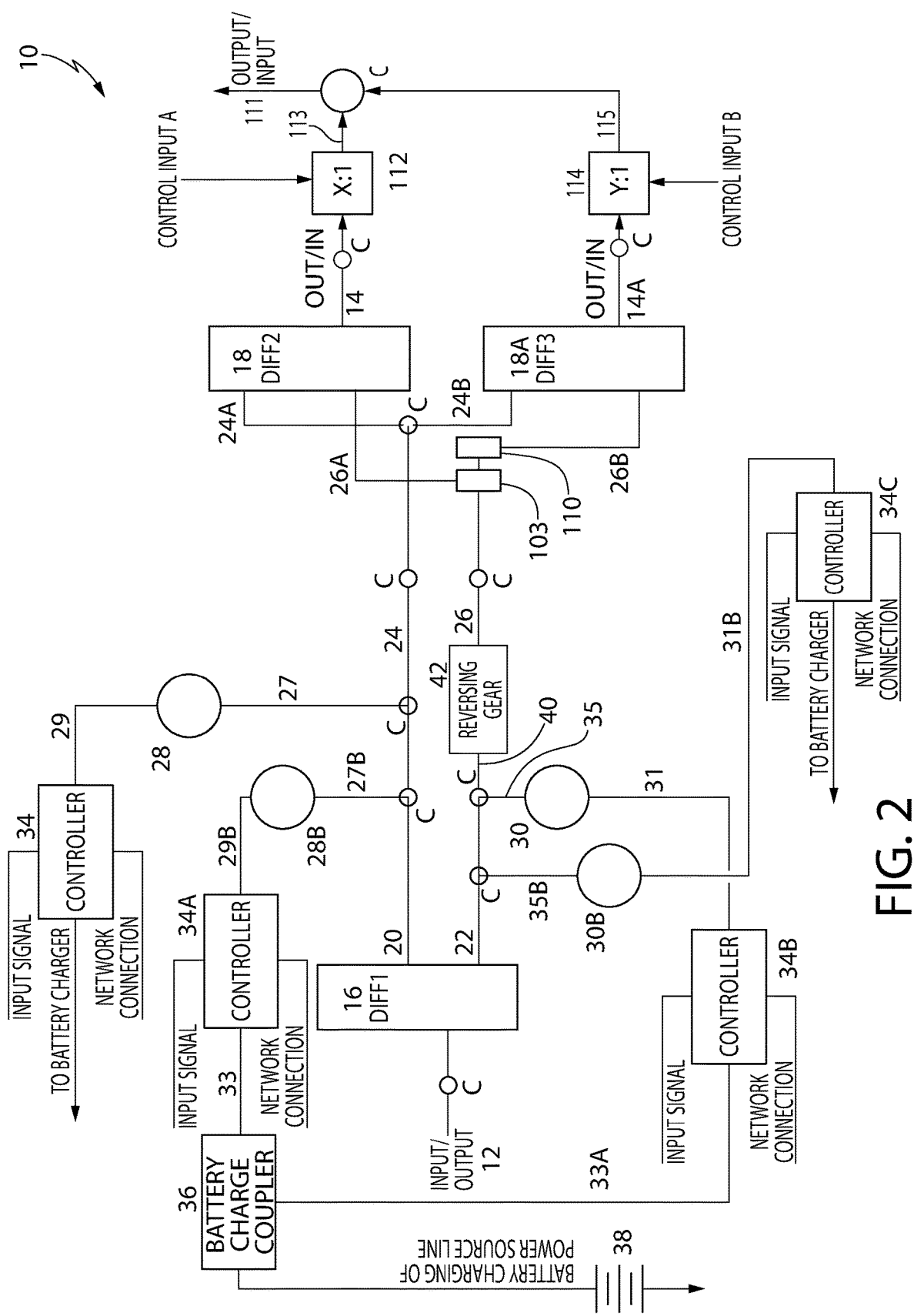
FIG. 2 is a block flow diagram of an exemplary embodiment of Applicant's apparatus or system.

When the vehicle is being forced in a forward movement, rotatable shaft 111 in FIG. 2 is a source for rotational energy. When the vehicle is being forced to slow down while moving forward, rotatable shaft 111 is a sink for rotational energy.

Rotating devices that use or generate energy do so most efficiently in a relatively narrow range of rotational speeds relative to the range of speeds they can rotate at. This narrow range of speeds may be referred to as the "rotational speed range for optimal efficiency of energy usage or generation" or alternatively as the "sweet spot." In an ideal system where a range of rotational speeds are produced at a range of torques, all rotational energy would be generated (or used) at or near the "sweet spot" and at the optimized energy density of the components (and the system).

One goal of Applicant's apparatus or system 10 is to enable rotational forces to be generated (or accepted) at rotatable shaft 111 in FIG. 1 at an optimal efficiency and to enable a multi-gear transmission system to produce the require d range of torques by the system of optimal rotating efficiency with the physically smallest source of rotational energy, or in other words, by a rotational source of energy with an optimal energy density.

The section of FIG. 1 to the right of rotatable shaft 24 and rotatable shaft 26 illustrates a configuration of differentials (18, 18A), one-way bearing/coupling-uncoupling device s (103, 110), torque and/or speed converters (112, 114) that enable utilizing a source or sources of rotating energy to produce varying speeds of motion on rotatable shaft 111 where both the source or the sources of rotational energy are rotating at their "sweet spot."

This section of FIG. 1 includes an apparatus or system 10 that enables a controlled and wide range of output speeds and torques at rotatable shaft 111 that can meet a specific set or range of specifications, and under all conditions of operation and therefore under all speeds and torques produced at rotatable shaft 111, the apparatus or system enables operation such that the energy efficiency of operation of all of the sources (or sinks) of rotational energy used in this system can operate at or near the "sweet spot." One or more couplers C can be arranged such that the speed and torque relationship of each rotating element that generates or uses energy can operate at the speed and torque that enables the optimization of the energy density of all of the sources (or sinks) that produce or accept rotational energy at rotatable shaft 111. For example, optimization of energy density can be enabled by appropriate selection of specific couplers C.

Referring to FIG. 1, differential 18 is coupled to rotatable shaft 24A and differential 18A is coupled to rotatable shaft 24B. Rotatable shafts 24A and 24B are coupled to rotatable shaft 24, which can be a "sink" or a "source" of rotational energy. (Rotatable shaft 24 would be neither a "sink" or a "source" when rotatable shafts 24 and 26 are rotating at speeds where rotatable shafts 14 and 14A are zero.) Differential 18 is coupled to rotatable shaft 14, which is coupled to a one-way bearing/coupling-uncoupling device 103. Differential 18A is coupled to rotatable shaft 14A, which is coupled to a one-way bearing/coupling-uncoupling device 110.

Differential 18 includes a mechanism (not shown) which may be a gear mechanism or other mechanism for applying a rotational torque to rotatable shaft 14 when a difference occurs between the rotational speeds of rotatable shafts 24A and 26A for differential 18. Differential 18A includes a mechanism (not shown) which may be a gear mechanism or other mechanism for applying a rotational torque to rotatable shaft 14A of differential 18A when a difference occurs between the rotational speeds of rotatable s hafts 24B and 26B for differential 18A.

For example, there may be a plurality of rotational speeds of rotatable shaft 24A and a plurality of speeds of rotatable shaft 26A when the speed of rotatable shaft 14 is zero. The gear mechanism or other mechanism of differential 18 transfers a rotational speed and/or torque to or from rotatable shaft 14 when a difference of rotational speed occurs between the rotational speed of rotatable shaft 24A and the rotational speed of rotatable shaft 26A. The difference of rotational speed is different than the difference of rotational speed between the rotational speed of rotatable shaft 24A and the rotational speed of rotatable shaft 26A that causes the rotational speed of rotatable shaft 14 to be zero.

There also may be a plurality of rotational speeds of rotatable shaft 24B and a plurality of speeds of rotatable shaft 26B when the speed of rotatable shaft 14A is zero. The gear mechanism or other mechanism of differential 18A transfers a rotational speed and/or torque to or from rotatable shaft 14A when a difference of rotational speed occurs between the rotational speed of rotatable shaft 24B and the rotational speed of rotatable shaft 26B. The difference of rotational speed is different than the difference of rotational speed between the rotational speed of rotatable shaft 24B and the rotational speed of rotatable shaft 26B that causes the rotational speed of rotatable shaft 14A to be zero.

Due to a difference in rotational speed between the rotational speeds of rotatable shafts 24A and 26A for differential 18, the speeds of rotation of rotatable shafts 24A and 26A can be any speed, and therefore can be at or near the rotational speeds that represent the "sweet spot" for the rotational energy source or sink at rotatable shafts 24 and 26. Similarly, due to a difference in rotational speed between the rotational speeds of rotatable shafts 24B and 26B for differential 18A, the speeds of rotation of rotatable shafts 24B and 26B can be any speed, and therefore can be at or near the rotational speeds that represent the "sweet spot" for the rotational energy source or sink at rotatable shafts 24 and 26. Therefore, the rotational energy at rotatable shaft 111 is produced at the optimal energy efficient speed for the rotary source or sink at rotatable shaft 24 and rotatable shaft 26.

One-way bearing/coupling-uncoupling device 103 transfers rotary torque between rotatable shaft 14 and torque and/or speed converter 112 when rotatable shaft 14 is rotating in one direction under torque and one-way bearing/coupling-uncoupling device 110 has no torque transfer activity with rotatable shaft 14A producing rotational torque in this direction and when one-way bearing/coupling-uncoupling device 103 is transferring torque. One-way bearing/coupling-uncoupling device 110 transfers rotary torque between rotatable shaft 14A and torque and/or speed converter 114 when rotatable shaft 14A is producing rotational torque in the opposite direction and one-way bearing/coupling-uncoupling device 103 has no torque transfer activity with rotatable shaft 14 producing rotational torque in this direction and when one-way bearing/coupling-uncoupling device 110 is transferring torque.

One of many potential benefits of the one-way bearing/coupling-uncoupling devices 103, 110 and others that are used in the various Figures is to potentially extend the life of a one-way bearing, which is a friction and force based operating device, and thus can be subject to wear over time. The one-way bearing/coupling-uncoupling device can effectively create a fixed coupling between shafts coupled by the one-way bearing shortly (as soon as possible) after the one-way bearing created the coupling between shafts, and thereby wear on the one-way bearing could be reduced. The fixed coupling could be quickly uncoupled when required to do so, under conditions where there was no-torque transfer through the device. The "coupling-uncoupling device" aspect of the one-way bearing/coupling-uncoupling device could be a claw type of non-slip clutch or other mechanism that produces a controllable fixed coupling, which could be integrated with the one-way bearing to form the one-way bearing/coupling-uncoupling device, or it could be a separate device coupled to the one-way bearing, to form the one-way bearing/coupling-uncoupling device.

Rotatable shaft 14 is coupled to one-way bearing/coupling-uncoupling device 103 which is coupled to torque and/or speed converter 112, with the torque conversion ratio of torque and/or speed converter 112 being a fixed ratio, or changeable by an internal control mechanism (not shown) or via an external Control Input A through a range of positive or negative gear ratios. Control Input A enables speed/torque transfer ratio X:1 in torque and/or speed converter 112 to be switched over a range of incremental values or varied over a continuous range of values.

Rotatable shaft 14A is coupled to one-way bearing/coupling-uncoupling device 110 which is coupled to a torque and/or speed converter 114, with the torque conversion ratio of torque and/or speed converter 114 being a fixed ratio, or changeable by an internal control mechanism (not shown) or via an external Control Input B through a range of positive or negative gear ratios. Control Input B enables speed/torque transfer ratio Y:1 in torque and/or speed converter 114 to be switched over a range of incremental values or varied over a continuous range of values.

The benefit of the shifting between torque and/or speed converter 112 and torque and/or speed converter 114 can be produced by a change in the relative speeds of rotatable shaft 24 and rotatable shaft 26 and prior to the transfer of torque from torque and/or speed converter 112 to torque and/or speed converter 114 and vice versa. The gear ratio of torque and/or speed converter 112 (and torque and/or speed converter 114) can be a fixed ratio or can be changed under internal or external control of torque and/or speed converter 112 or torque and/or speed converter 114 prior to torque transfer shifting to it. In this way, the shifting can be do ne without the use of additional external forces to affect the shifting or the use of energy loss devices such as friction clutches that can produce slip between shafts causing losses of rotational energy, where the energy losses are due to the forces required to operate the clutch during the traversal of the clutching process and without the energy losses that occur in the clutch during the traversal of the clutching process. One example would be to shift torque transfer from torque and/or speed converter 112 to torque and/or speed converter 114 and vice versa.

Conversely, when rotatable shaft 111 is a sink for rotational energy, rotating energy is produced by rotatable shaft 111 via coupler C, which couples rotatable shaft 113 and rotatable shaft 115 and rotatable shaft 111 to each other and to variable torque and/or speed converters 112 and 114 respectively. However, only one of rotatable shafts 113 or 115 will transfer rotational torque to either differential 18 or differential 18A, depending on the direction of rotation and torque of rotatable shaft 113 and rotatable shaft 115, as only one of these shafts will transfer torque between one-way bearing/coupling-uncoupling device 103 and rotatable shaft 14, or one-way bearing/coupling-uncoupling device 110 and rotatable shaft 14A. Rotational torque will be transferred to rotatable shaft 14 from rotatable shaft 113 or to rotatable shaft 14A from rotatable shaft 115, but not both, via one-way bearing/coupling-uncoupling devices 103 and 110 respectively.

The transfer of rotational torque can be switched between either torque and/or speed converter 112 and torque and/or speed converter 114 at any time along with a change in the relative speeds of rotatable shaft 24 and rotatable shaft 26.

Other than due to practical limitations, FIG. 1 can have embodiments with unlimited number of additional differentials like 18, 18A, rotatable shafts 14, 14A, one-way bearing/coupling-uncoupling devices 103, 110, torque and/or speed converters 112, 114, and rotatable shafts 113, 115 coupled to coupler C and rotatable shaft 111, where only from the totality of torque and/or speed converters, only one torque and/or speed converter would be transferring rotational torque.

The section of FIG. 1 to the left of rotatable shaft 24 and rotatable shaft 26 illustrates an apparatus or system that generates dual rotational forces from a single rotational source or a combination of multiple rotational sources at rotatable shaft 12, coupled by C to the input (/output) of differential 16, and to produce and couple to the dual rotating output (/input) rotatable shafts 20 and 22 of differential 16, where the speeds of these rotatable shafts can be varied from their rotation in one direction at the same speed, to zero (0) speed on one shaft and the maximum speed on the other shaft by motors 28 and 30, coupled to rotatable shafts 27 and 35 respectively, the direction of rotation being the same for both motors 28 and 30, controlled by the choice of whether motors 28 or 30 are acting as a generator or generators, or as a motor or motors. Motors 28 and 30 can be constructed as a plurality of motors in combination with their controllers 34 to provide a variety of benefits for operation at increased energy efficiency, increased reliability, ease of service, and benefits in economics of scale. Motor 28 or its plurality of motors are coupled (e.g., electrically) to controller 34 or its plurality of controllers and are physically coupled to rotatable shaft 27, which is coupled to rotatable shaft 20 and rotatable shaft 24. Motor 30 or its plurality of motors are coupled (e.g., electrically) to controller 34 or its plurality of controllers and coupled to rotatable shaft 35, which is coupled to rotatable shaft 22 and to rotatable shaft 26. While motors are referred to in the embodiments discussed and illustrated herein, persons of skill in the art will recognize that other types of motors or sources/sinks of rotational energy may be usable.

Figure 1A:
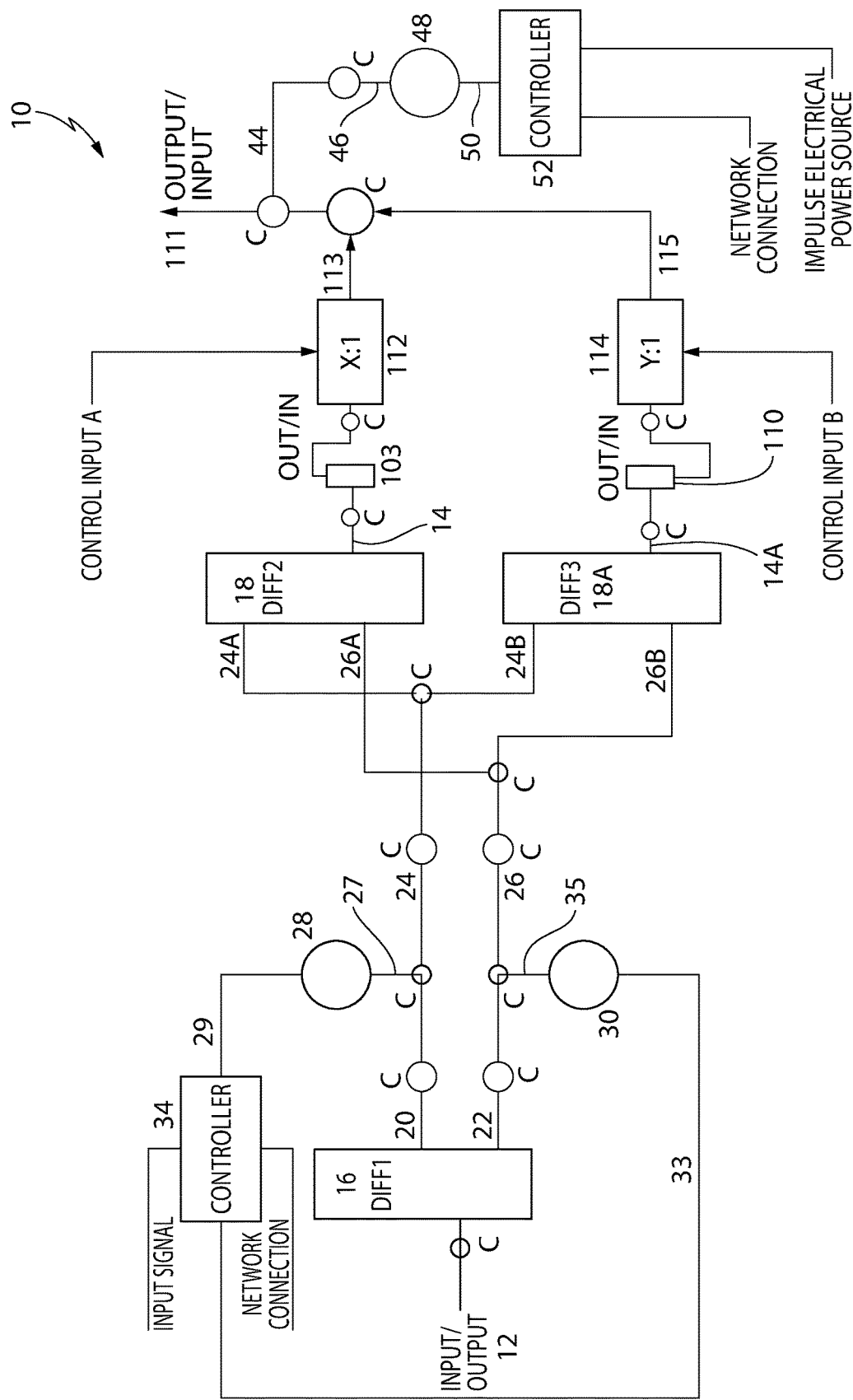
FIG. 1A is a block flow diagram of a variation of the exemplary embodiment of Applicant's apparatus or system in FIG. 1.
Figure 1B:
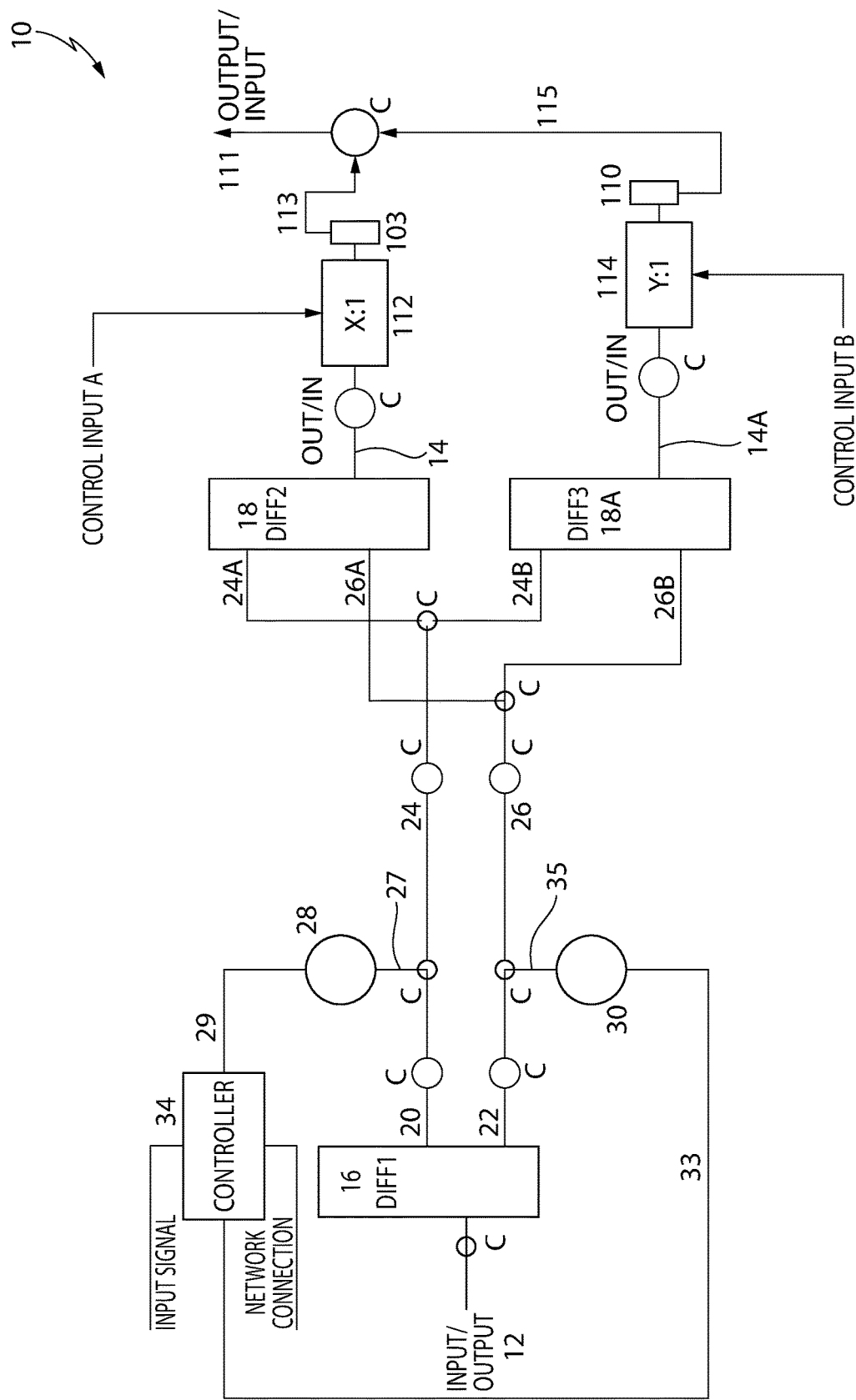
FIG. 1B is a block flow diagram of a variation of the exemplary embodiment of Applicant's apparatus or system in FIG. 1.
Figure 1C:
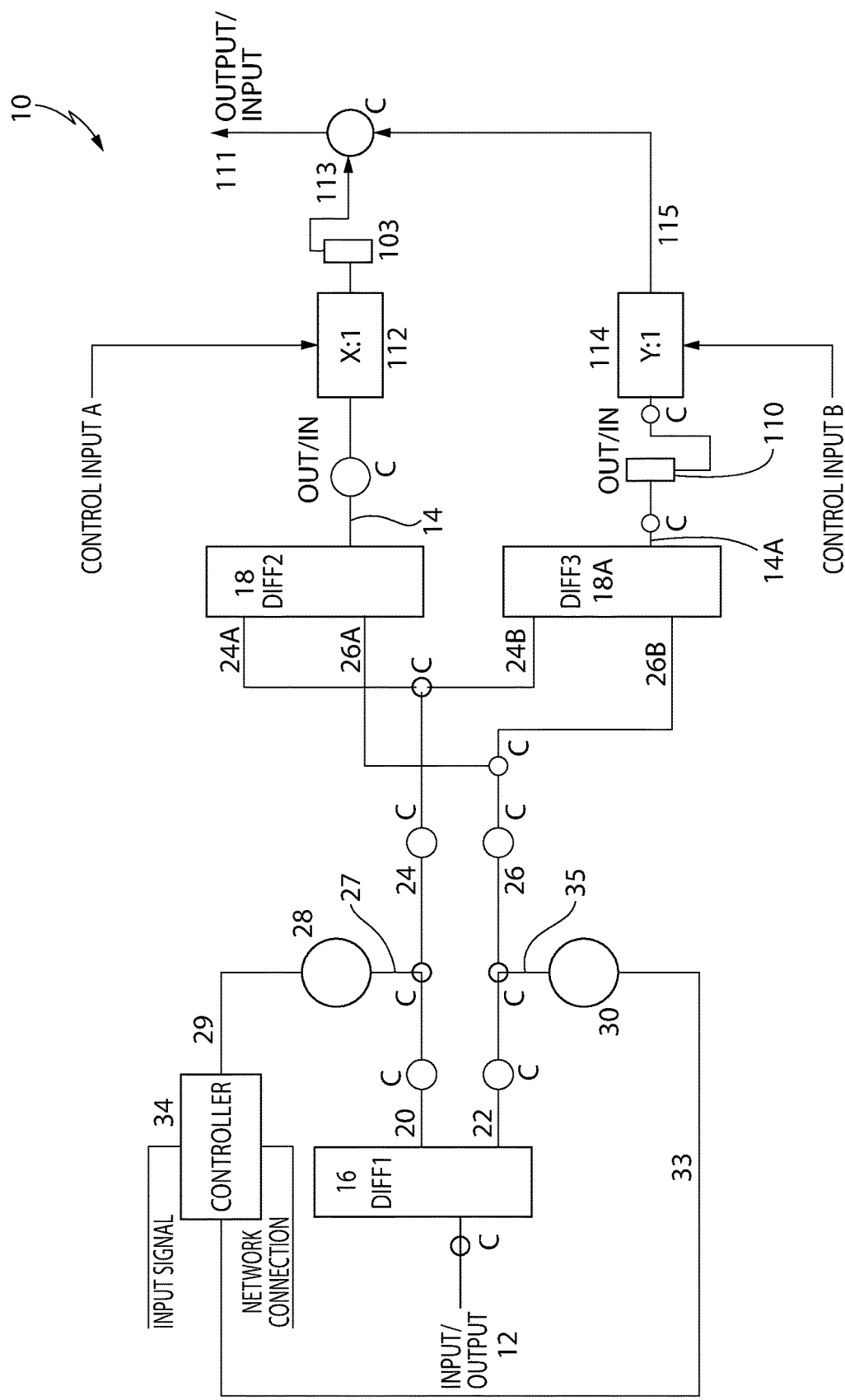
FIG. 1C is a block flow diagram of a variation of the exemplary embodiment of Applicant's apparatus or system in FIG. 1.
Figure 1D:
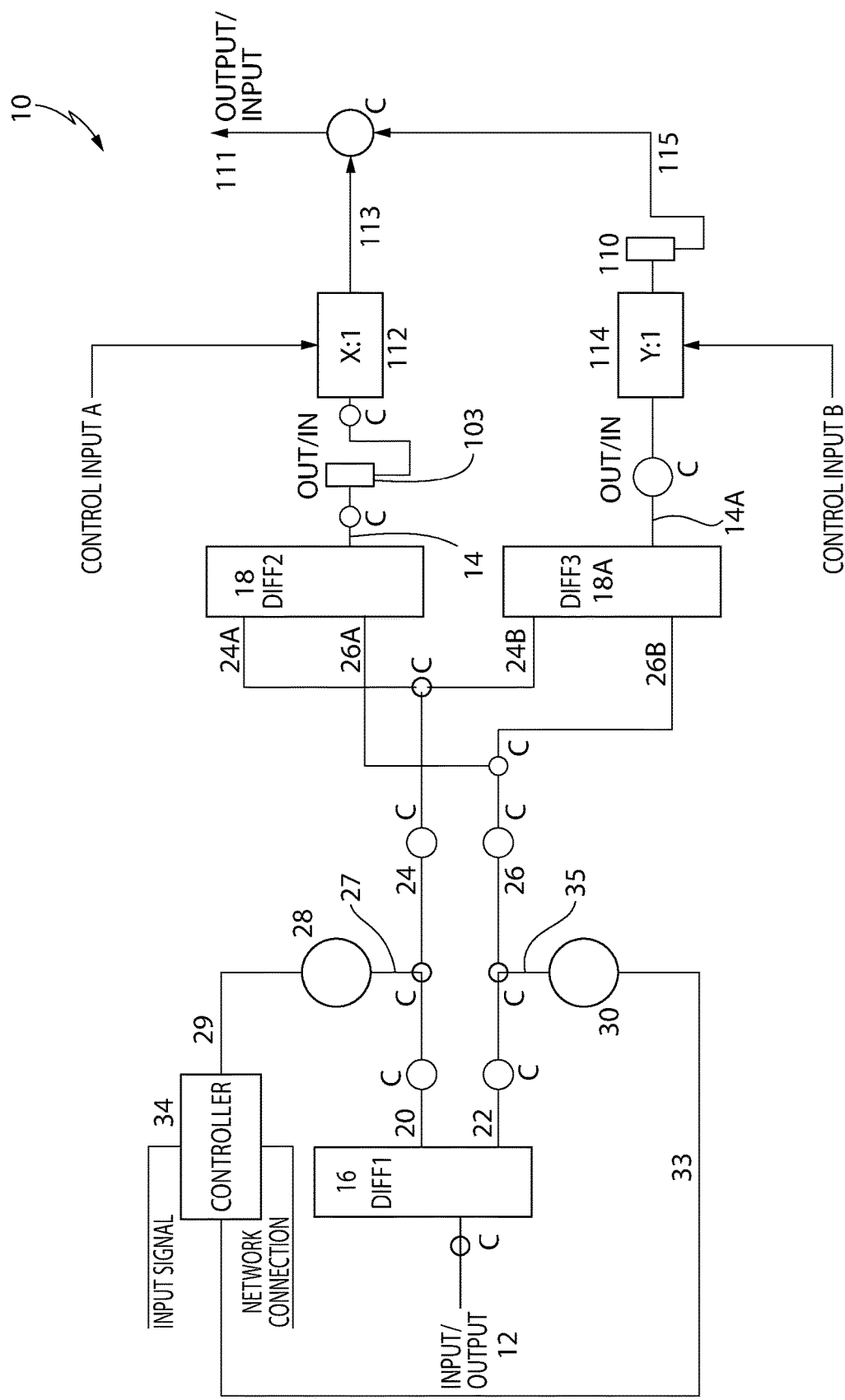
FIG. 1D is a block flow diagram of a variation of the exemplary embodiment of Applicant's apparatus or system in FIG. 1.
Figure 1E:
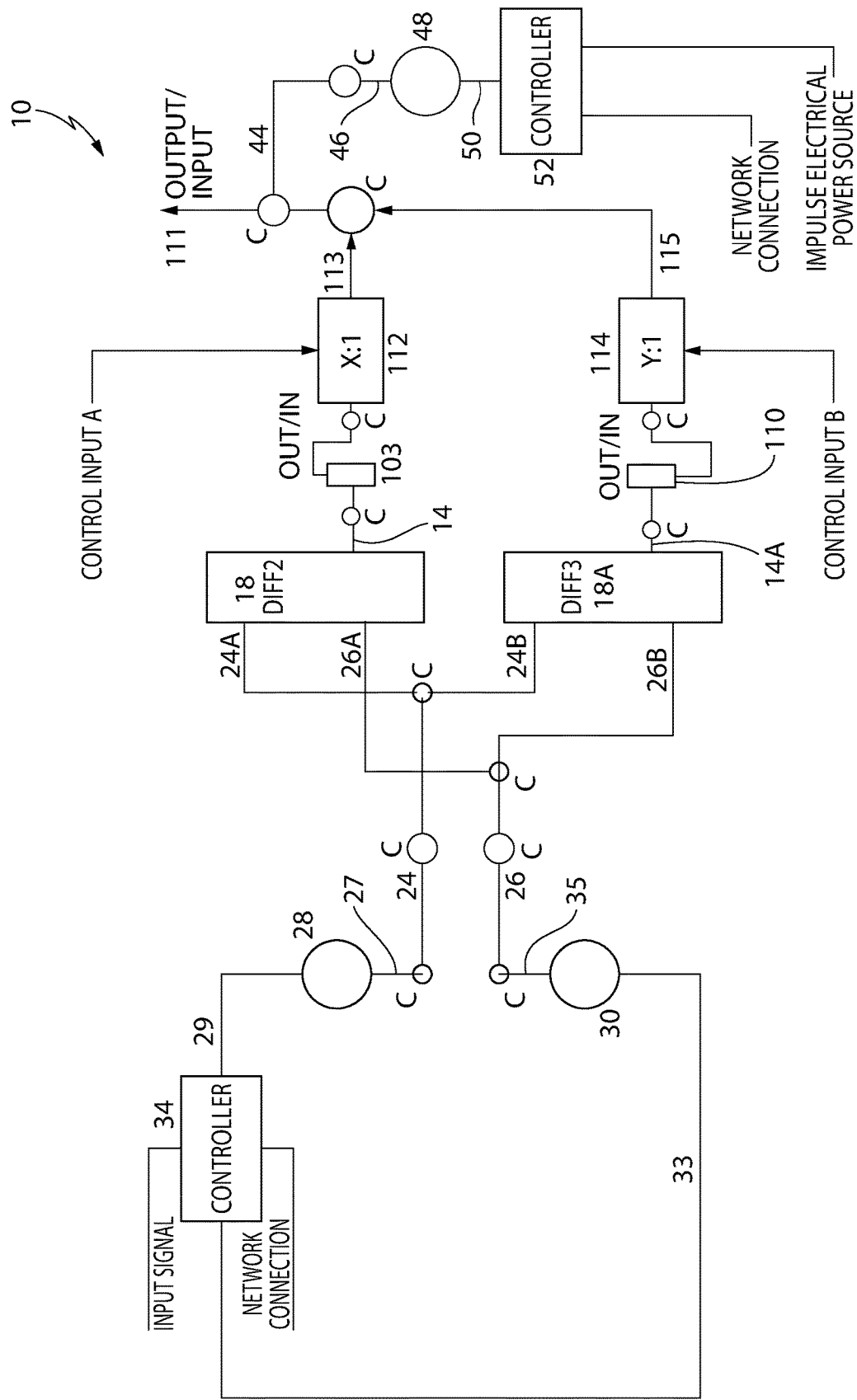
FIG. 1E is a block flow diagram of a variation of the exemplary embodiment of Applicant's apparatus or system in FIG. 1.

A special case of the section of FIG. 1 to the left of rotatable shaft 24 and rotatable shaft 26 is where the rotary power source coupled to rotatable shaft 12 is removed, and differential 16 is removed along with rotatable shafts 20 and 22, as in FIG. 1E. In this case, motors 28 and 30 can be controlled to act as rotational energy sources or sinks while feeding electrical energy between them, or to or from a battery (not shown) connected to their controller 34 or controllers via cables 29 and 33.

In addition to the exemplary embodiment of Applicant's apparatus or system 10 illustrated in FIG. 1, variations of that embodiment, as well as other embodiments, are possible. For example, FIGS. 1A through 1E illustrate such variations and other embodiments.

The embodiment shown in FIG. 1A is similar to the embodiment shown in FIG. 1 but the embodiment in FIG. 1A includes an impulse motor/controller/impulse power source or sink to reduce torque interruption during gear shift. This includes motor 48 in communication with controller 52, such as via cable 50. The motor is coupled to rotatable shaft 46 and rotatable shaft 44, which is coupled to rotatable shaft 111. As an electric motor 48 and its controller 52 (connected to a battery pack and/or possibly a super capacitor) can be a relatively small capacity electric motor but can provide large rotational power source or sink for a short time and help sufficiently reduce or eliminate the torque interruption that can occur when shifting between differential 18 and differential 18A or additional differentials as may be included in an embodiment of the Applicant's apparatus. Electric motor 48 can consist of a multitude of smaller electric motors connected in parallel or in series, each with its own controller functionality in the way controller 52 provides controller functionality for electric motor 48.

The embodiment shown in FIG. 1B is similar to the embodiment shown in FIG. 1 but the one-way bearing/coupling-uncoupling devices 103 and 110 are at different locations, as shown in FIG. 1B. The one-way bearing/coupling-uncoupling devices have the same effect of coupling or decoupling rotational torque along the respective paths shown.

The embodiment shown in FIG. 1C is similar to the embodiment shown in FIG. 1 but one-way bearing/coupling-uncoupling device 103 is at a different location, as shown in FIG. 1C. The one one-way bearing/coupling-uncoupling device 103 has the same effect of coupling or decoupling rotational torque along the path.

Figure 2A:
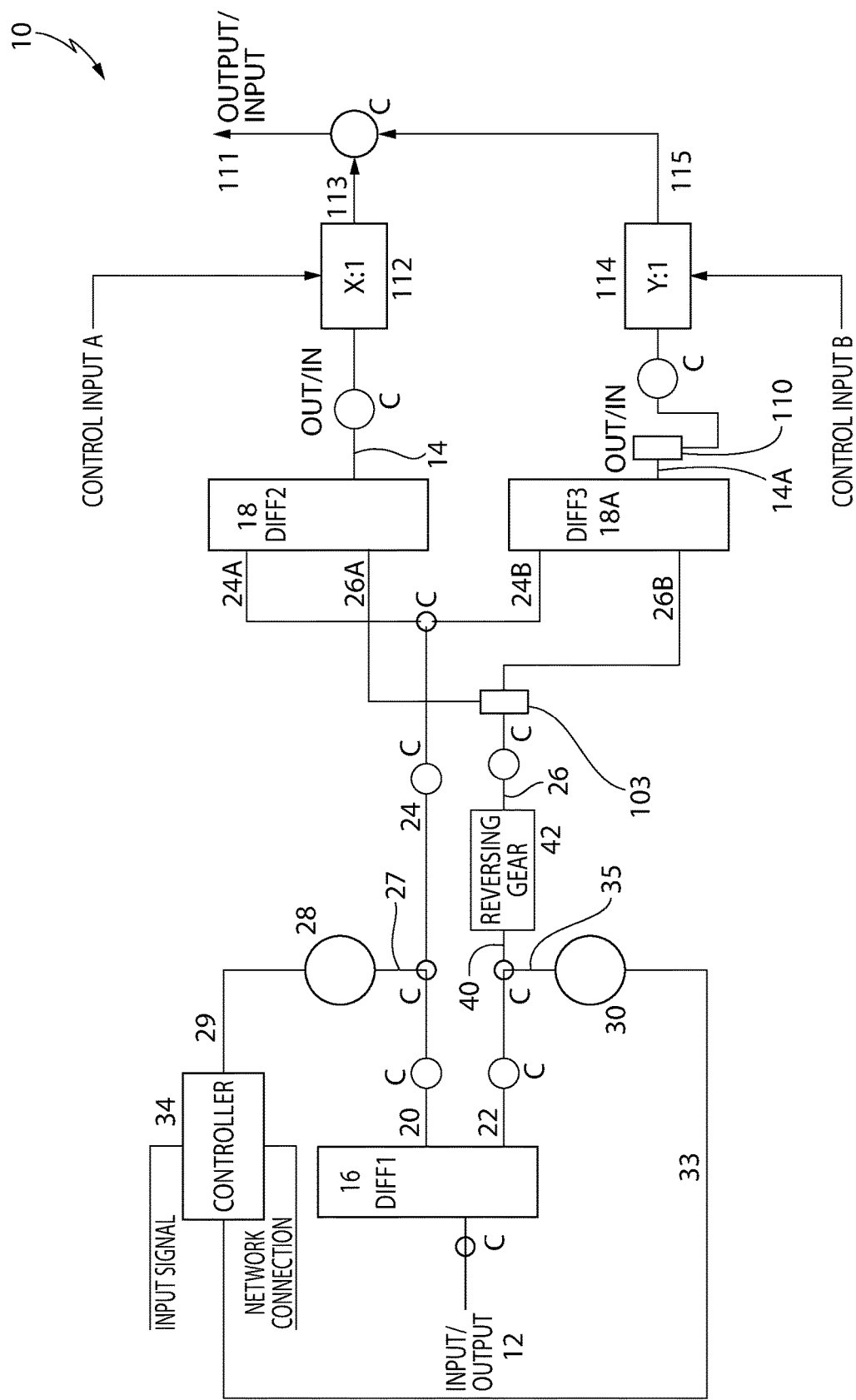
FIG. 2A is a block flow diagram of a variation of the exemplary embodiment of Applicant's apparatus or system in FIG. 2.
Figure 2B:
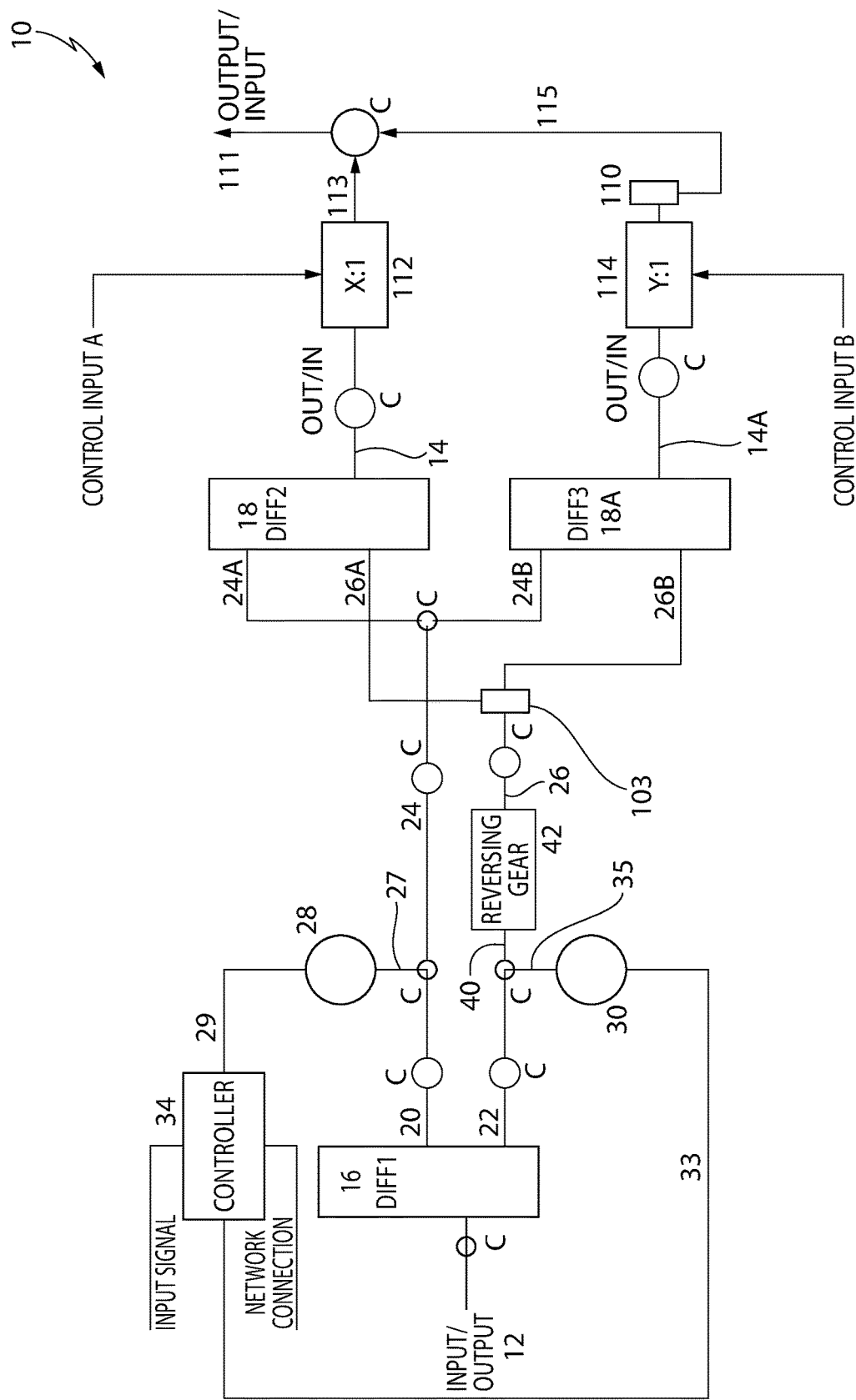
FIG. 2B is a block flow diagram of a variation of the exemplary embodiment of Applicant's apparatus or system in FIG. 2.
Figure 2C:
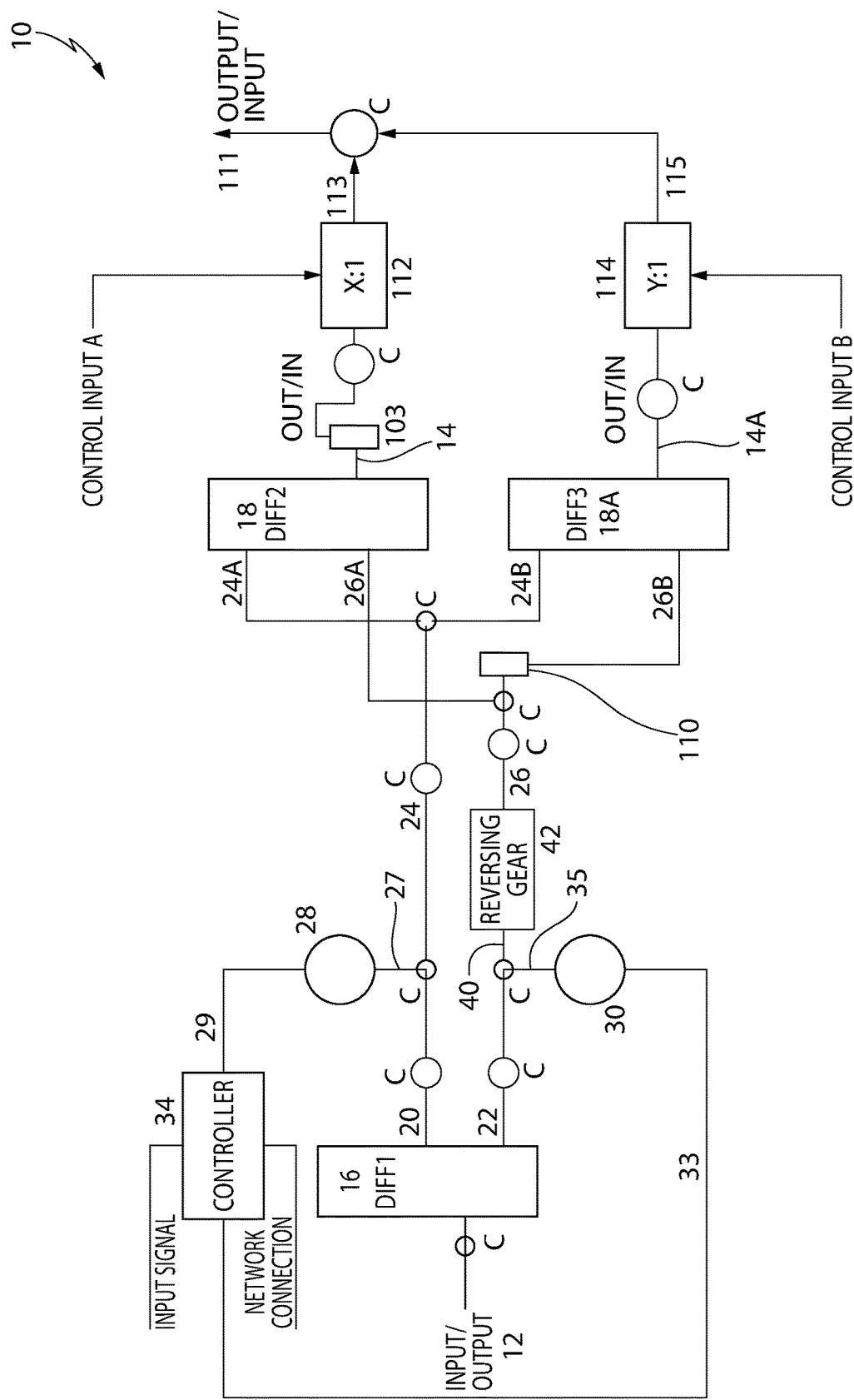
FIG. 2C is a block flow diagram of a variation of the exemplary embodiment of Applicant's apparatus or system in FIG. 2.
Figure 2D:
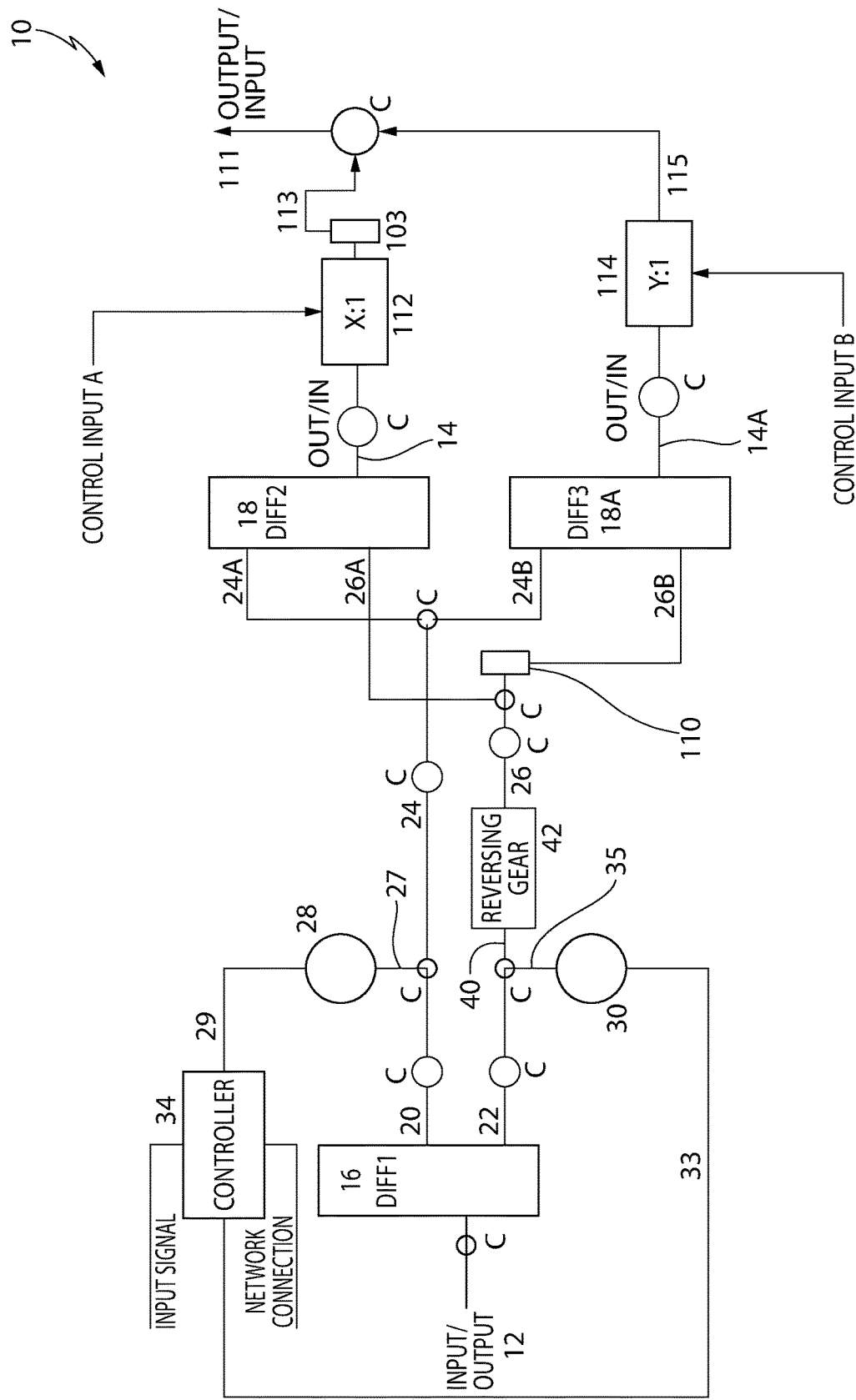
FIG. 2D is a block flow diagram of a variation of the exemplary embodiment of Applicant's apparatus or system in FIG. 2.

The embodiment shown in FIG. 1D is similar to the embodiment shown in FIG. 1 but one-way bearing/coupling-uncoupling device 110 is at a different location, as shown in FIG. 2D. The one-way bearing/coupling-uncoupling device 110 has the same effect of coupling or decoupling rotational torque along the path.

The embodiment shown in FIG. 1E is similar to the embodiment shown in FIG. 1A except rotatable shaft 12, differential 16, rotatable shafts 20 and 22, and their couplers are removed, as shown in FIG. 1A.

It would be understood by a person skilled in the art that FIG. 1E would need a source of electrical power such as a battery 38 or electricity generator system (not shown) along with a battery charge coupler 36 to moderate the use of the electrical energy, similar to the arrangement of such components shown on the left side of FIGS. 2, 8-10, and 11-11G. It would be understood by a person skilled in the art that the impulse electrical power source used by controller 52 could utilize the battery 38 in part or in whole.

Figure 5:
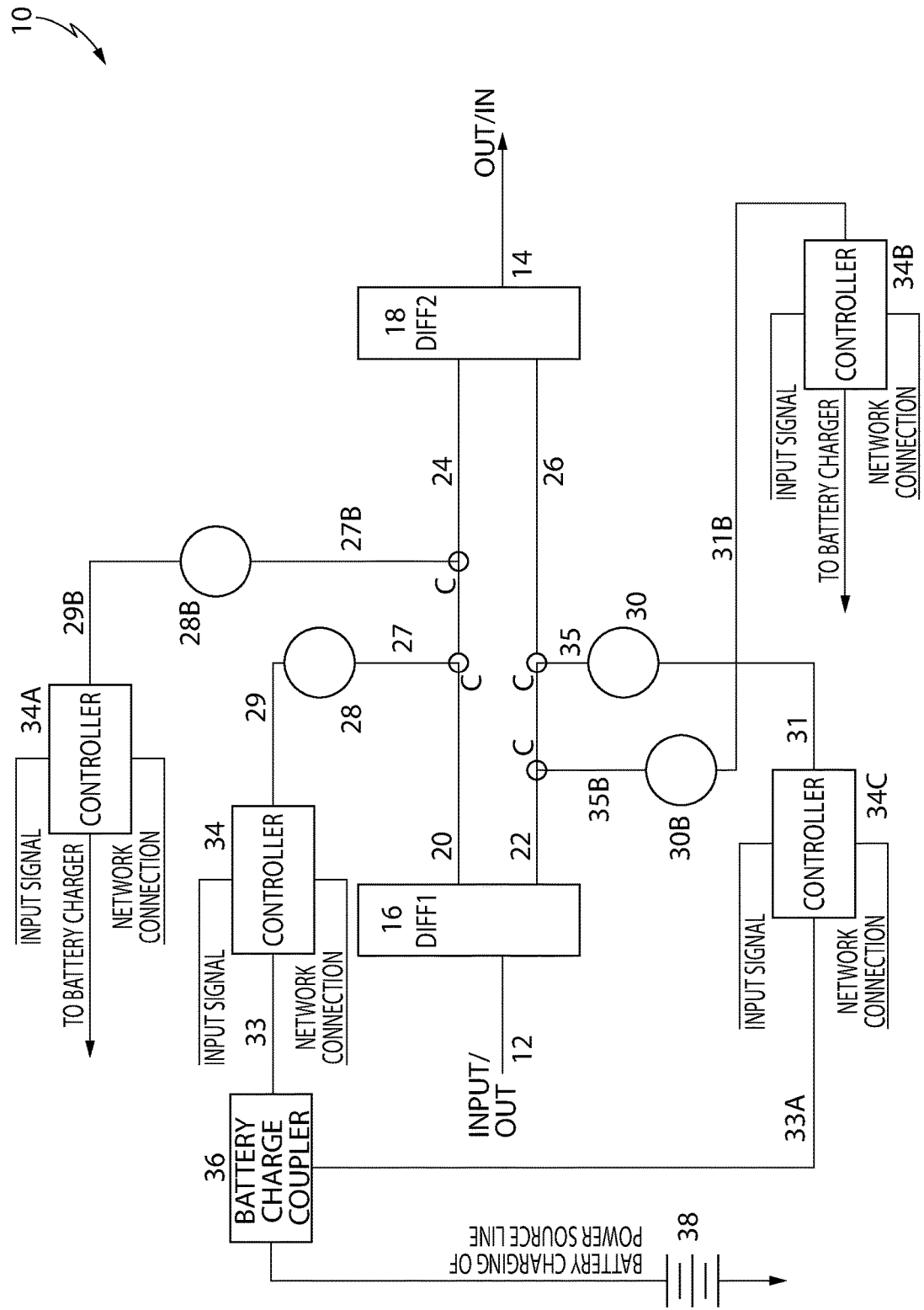
FIG. 5 is a block flow diagram of an exemplary embodiment of Applicant's apparatus or system.

The embodiment illustrated in FIG. 2 is a variation of the embodiment illustrated in FIG. 1 updated with the one-way bearing/coupling-uncoupling device s 103 and 110 moved onto rotatable shaft 26. Differential 18 is coupled to rotatable shaft 26A which is coupled to one-way bearing/coupling-uncoupling device 103, and differential 18A is coupled to rotatable shaft 26B which is coupled to one-way bearing/coupling-uncoupling device 110. The embodiment illustrated in FIG. 2 uses multiple and parallel smaller motors/generators and their dedicated controllers as shown in FIG. 5 and discussed below, with all the aspects described for the embodiment illustrated in FIG. 5. In the embodiment illustrated in FIG. 2, a reversing gear 42 is coupled to rotatable shaft 40 which is coupled to rotatable shafts 35 and 22. A person skilled in the art could derive a number of methods for the reversing gear 42, such as the embodiments shown in FIG. 3 and FIG. 3A, to selectively reverse the direction of rotation of rotatable shaft 26, when motor 28 and motor 30 are rotating at a speed whereby both rotatable shafts 14 and 14A are at zero speed and torque is not being transferred from rotatable shaft 12, or motor 28 or motor 30 through differential 18 or differential 18A, thereby selectively setting up the flow of rotational torque between differential 18 and differential 18A such that either rotatable shaft 14 or rotatable shaft 14A is transferring torque to one of torque and/or speed converters 112 or 114 respectively, but not both, thus providing one of two paths for rotational torque through torque and/or speed converter 112 or 114, and enabling each to change their ratio while not transferring torque, as in prior examples and descriptions of operation.

The embodiment shown in FIG. 2A is similar to the embodiment shown FIG. 2 but the one-way bearing/coupling-uncoupling device 110 is at a different location, as shown in FIG. 2A. The one-way bearing/coupling-uncoupling device 110 has the same effect of coupling or decoupling rotational torque along the path.

The embodiment shown in FIG. 2B is similar to the embodiment shown FIG. 2 but the one-way bearing/coupling-uncoupling device 110 is at a different location, as shown in FIG. 2B. The one-way bearing/coupling-uncoupling device 110 has the same effect of coupling or decoupling rotational torque along the path.

The embodiment shown in FIG. 2C is similar to the embodiment in shown FIG. 2 but the one-way bearing/coupling-uncoupling device 103 is at a different location, as shown in FIG. 2C. The one-way bearing/coupling-uncoupling device 103 has the same effect of coupling or decoupling rotational torque along the path.

The embodiment shown in FIG. 2D is similar to the embodiment in shown FIG. 2 but the one-way bearing/coupling-uncoupling device 103 is at a different location, as shown in FIG. 2D. The one-way bearing/coupling-uncoupling device 103 has the same effect of coupling or decoupling rotational torque along the path.

Figure 3:
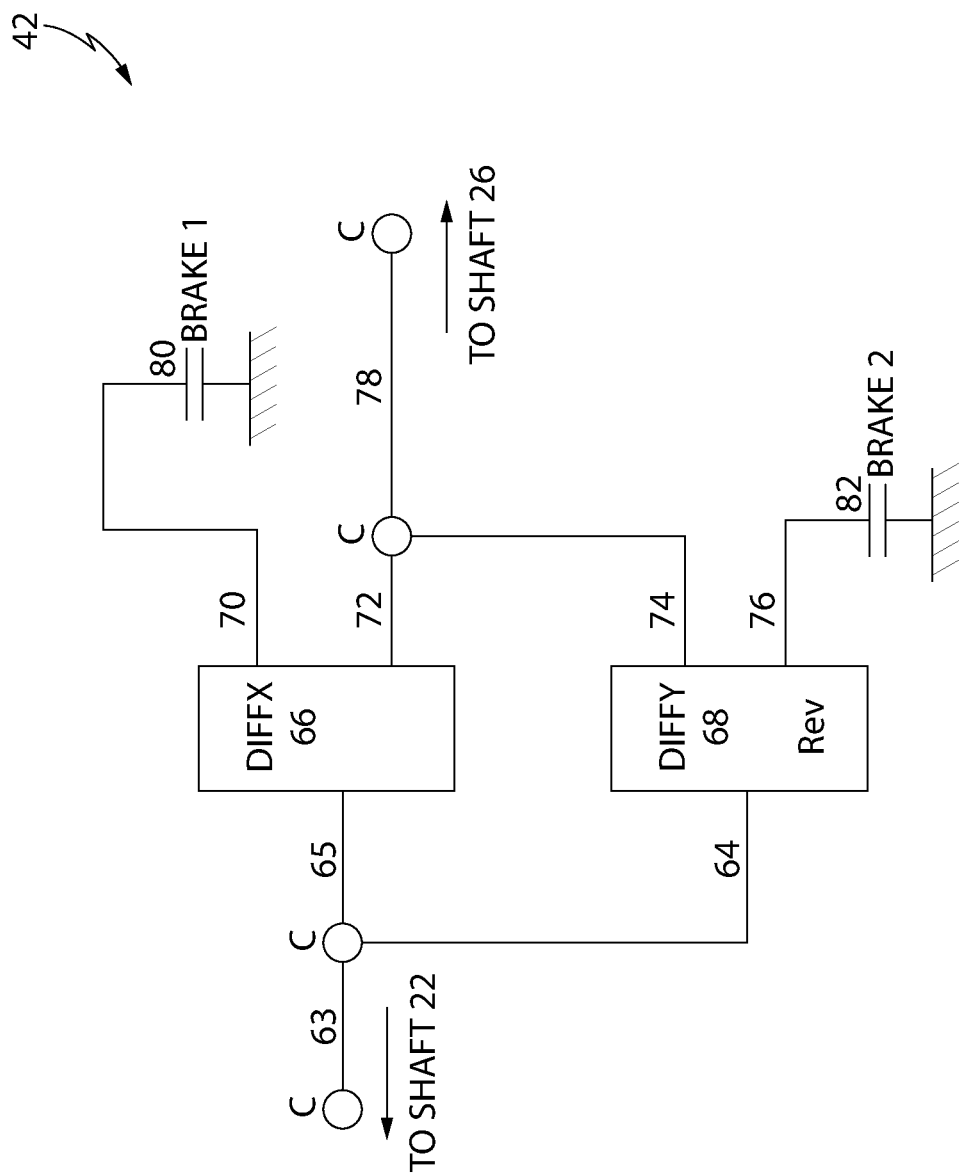
FIG. 3 is a block flow diagram of an exemplary embodiment of a reversing gear used in some embodiments of Applicant's apparatus or system.
Figure 3A:
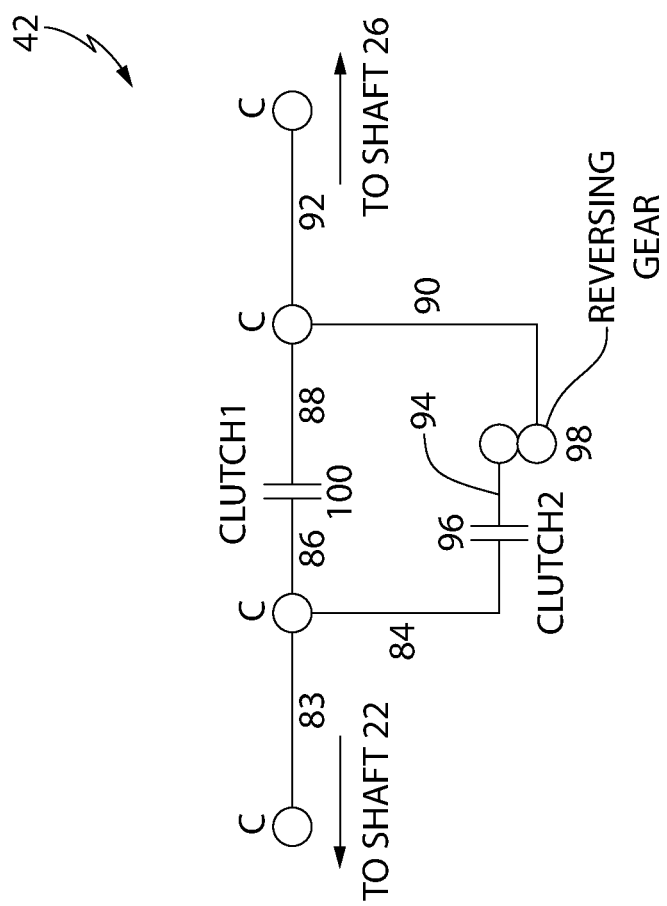
FIG. 3A is a block flow diagram of an exemplary embodiment of another reversing gear used in some embodiments of Applicant's apparatus or system.

FIG. 3 and FIG. 3A illustrate embodiments of the Reversing Gear 42 shown in FIG. 2 and FIGS. 2A-2D. The Reversing Gear 42 dynamically switches the rotational direction of rotatable shaft 22 during the gear ratio change between speed and/or torque converters 112 and 114. As there is no torque required to be transferred through the Reversing Gear (shown in FIG. 3 or FIG. 3A, or other embodiments of the Reversing Gear) during the gear ratio change, brake 180 or brake 282, can be used between rotatable shaft 70 or rotatable shaft 76 of differential 66 or differential 68 respectively, to "ground" to enable torque to flow through rotatable shaft 72 or rotatable shaft 74 respectively, coupled to rotatable shaft 78, as shown in FIG. 3. The mechanical characteristic of differential 68 is that the direction of rotation of rotatable shaft 74 is opposite to that of rotatable shaft 72, under the same direction of rotation of rotatable shaft 63 coupled to rotatable shaft 65 and to rotatable shaft 64, when their respective brake 82 or 80 respectively, is activated to "ground" the shaft it is coupled to.

FIG. 3A illustrates an embodiment of a dynamically switchable Reversing Gear 98 coupled to rotatable shaft 94 and rotatable shaft 90 and clutch 1100 coupled to rotatable shaft 86 and rotatable shaft 88, or clutch 296 coupled to rotatable shaft 84 and rotatable shaft 94, to transfer rotational torque between rotatable shaft 83 and rotatable shaft 92 in the same direction, or between rotatable shaft 83, through reversing gear 98 to rotatable shaft 92, in a reversed direction. As there is no torque transferred during the change of direction using the clutches, there is minimal power loss due to the clutches, and in fact, the clutches could be clutches with engaging teeth (or other such positive engaging mechanisms) to ensure there are not slippage losses.

Figure 4:
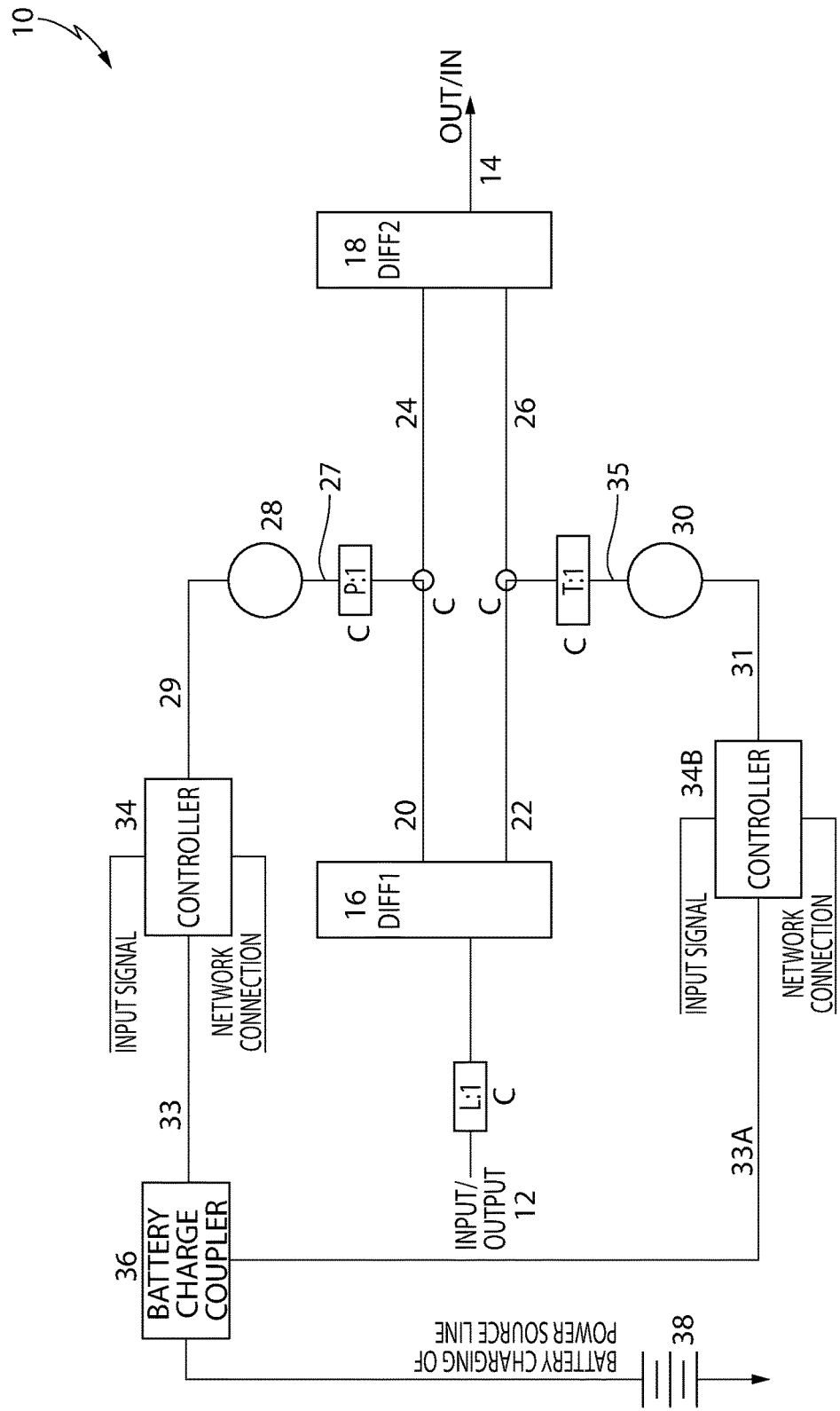
FIG. 4 is a block flow diagram of an exemplary embodiment of Applicant's apparatus or system.

FIG. 4 shows another embodiment having a gear-ratio unit P:1 between motor/generator 28 and rotatable shaft 20, and a gear-ratio unit T:1 between motor/generator 30 and rotatable shaft 22. There also is a gear-ratio unit L:1 between a rotational power source/sink and rotatable shaft 12.

These gear-ratio units enable conversion of the system to operator at (much) higher speeds with related reduction of size of the system. With L:1 at 1:1 and a ratio of 10:1 for P:1 and T:1, the gear-ratio units could reduce the system size, other than differential 16, by a factor of 10.

Further, a ratio of 10:1 for L:1 gear-ratio unit, along with a ratio of 10:1 for the T:1 and P:1 gear-ratio units, could reduce the size of differentials 16 and 18 by a factor of 10 and, in principle, the size of motor/generators 28 and 30 by a factor of 100:1, though there may be rotational speed constraints on some of the parts.

A gear-ratio unit may be needed on rotatable shaft 14 to re-scale the rotational speed of rotatable shaft 14 (and thus torque) into a required range.

This enables the rotational power source (sink) coupled to rotatable shaft 12 to be designed and/or dynamically controlled to run at the most efficient speed under any specific torque demand to produce or sink power on rotatable shaft 14.

A significant, fundamental benefit of this embodiment of system 10 is that while the rotational speed produced or used through rotatable shaft 12 is not linearly related to the rotational speed produced or used by rotatable shaft 14 and the direction of rotation of rotatable shaft 14 is independent of the direction of rotation of rotatable shaft 12, the capability to increase with gear ratio units L:1, P:1, and T:1 enables increase of speed of rotation of differential 16 and differential 18 and motor 28 and motor 30, thereby requiring less torque to be supported by these items which enables physical reduction of size and increases optimal power density of the Applicant's apparatus. This approach to increasing power density can be applied in the various embodiments of Applicant's apparatus.

The embodiment illustrated in FIG. 5 is a variation of the embodiment illustrated in FIG. 4. The embodiment in FIG. 5 uses two or more motor/generators (28, 30 and 28B, 30B) acting mechanically in parallel or in series, or a combination acting mechanically in parallel and in series on each of rotatable shafts 20 and 22, with the capability of shutting off the operation of any of these motor/generators such that when they are shut off, they simply rotate freely without hindrance or impact on the rotation of rotatable shaft 20 or rotatable shaft 22, which they are coupled to. The coupling of the motor/generators can be distributed in any way on rotatable shafts 20 or 24 and separately on rotatable shafts 22 or 26.

Also, each of these motors/generators (28, 30 and 28B, 30B) can have its own dedicated controller (34, 34A, 34B, 34C) to control the motor/generator operation, although the controllers can readily be combined into a single controller device. The main point is that each motor has a dedicated controller functionality and one controller functionality does not normally control two motors. However, in principle it is possible to control more than one motor in a motoring mode, or more than one motor in a generating mode to be controlled by a single controller. It also is possible for each motor/generator controller functionally to be operating in a networked environment to enable them to operate according to a strategic manner and/or according to an algorithmic response.

Figure 6:
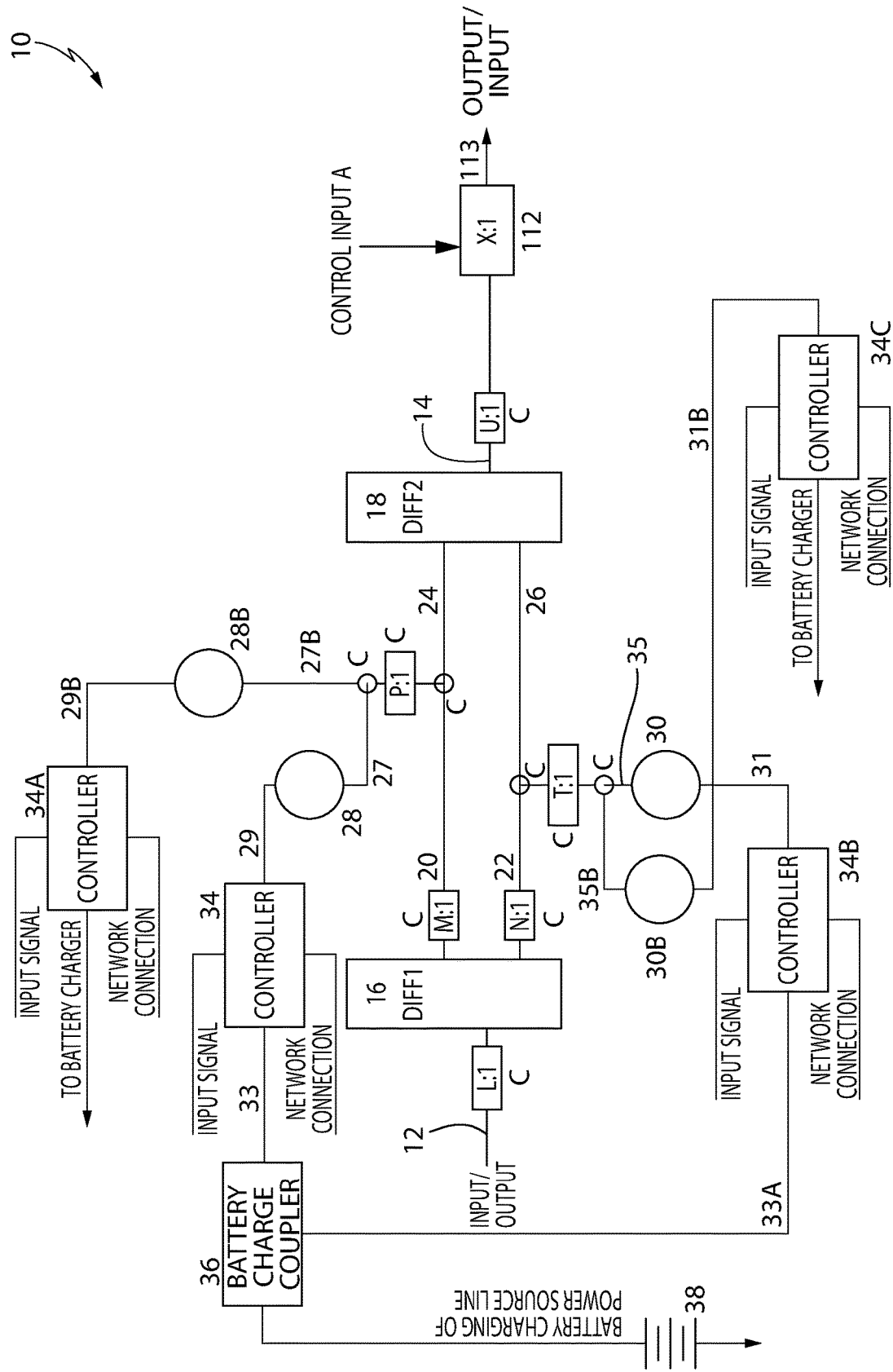
FIG. 6 is a block flow diagram of an exemplary embodiment of Applicant's apparatus or system.

Referring to FIG. 6, output torque (Output/Input, as the system enables bi-directional flow of rotational energy) at rotatable shaft 113 can be increased or decreased (conversely the speed of rotation of the shaft can be decreased or increased) with a torque and/or speed converter 112 under internal or external control of the variation in gear-ratio. For example, an automatic transmission for torque and/or speed converter 112 would meet this purpose. A manual transmission would also meet this purpose. These are two examples.

A source of rotational power (which may be able to also act as a sink for rotational power) can be connected to rotatable shaft 12. If this source/sink of rotational power is a controllable device, in principle, rotatable shaft 12 could be connected directly to rotatable shaft 113 and eliminate all the elements (other rotatable shafts 14, 20, 22, 24, and 26, differential 16, differential 18, motors 28, 28B, 30, and 30B, torque and/or speed converter 112, couplers C, etc.).

For example, the source of rotating power may be an engine or a motor (or other rotational source of power). The rotating power source or sources coupled to rotatable shaft 12 is acting as a sink for rotational power.

If, for example, rotatable shaft 113 is coupled to the wheel or wheels of a vehicle, then a rotating power source, such as an engine or a motor, must supply the full torque requirement to start moving the vehicle from a stopped position and accelerate the vehicle to the required speed. The rotating power source will have to be sufficiently large in size to supply this torque, which will occur at relatively low speeds.

The rotating power source will have to supply the torque at the vehicle's highest speed and therefore at high speeds. This would require the rotating power source to be a relatively larger unit compared to the same engine construction having a transmission, as normally occurs in most automobiles and other vehicles.

For example, first gear in an automatic or manual transmission (or equivalent in a mechanical continuously variable transmission (CVT)) multiplies the torque output of an engine by a factor of more than 1 to produce the torque for starting the vehicle, with the other gear ratios to provide the torque needed at each stage of vehicle motion. The engine would have to be much larger and might not even fit under the vehicle's hood if it had to supply the vehicle starting torque directly to the wheels, and if the transmission did not provide the increased torque conversion. The automatic or manual transmission (or mechanical CVT) in vehicles with the controlled variation in gear-ratios enables the engine to be smaller in size than would otherwise be needed without a transmission between.

Applicant's apparatus, devices, systems, and methods provide for significant advances compared to the prior art. For example, FIG. 6 includes a means for changing gear-ratios, which is the torque and/or speed converter 112, and which could be an automatic transmission, or a manual transmission, or a mechanical CVT, or a dual-clutch transmission, etc.

The differential engines in U.S. Pat. Nos. 6,461,266 and 6,726,588 provide efficiency advantages in the operation of the source of rotational power coupled to shaft 12 but they provide only a single gear ratio for effecting the torque transfer between shaft 12 and shaft 113. FIG. 1 illustrating an embodiment of Applicant's apparatus or system shows how variable gear-ratios can be provided between rotatable shaft 12 and rotatable shaft 113 along with the other advantages of Applicant's apparatus, devices, systems, and methods.

Both Internal Combustion Engines (ICE) and Electric Motors exhibit optimal efficiency of operation at specific rotational speeds or narrow ranges of rotational speeds and/or other limits to efficiency of operation where efficiency of energy usage decreases, and the highest points of efficiency of operation of the ICE or Electric Motors may vary at various levels of torque demands or combination of torque demands and speed demands.

The non-linear relationship between the rotational speeds of rotatable shaft 12 and rotatable shaft 113 enables an ICE or an Electric Motor (or other rotational source of power) to be operated at its most efficient rotational speed for a required torque demand. This enables rotatable shaft 12 to rotate at the speed for optimal efficiency of torque generation by the ICE or Electric Motor (or other rotational source of power), while rotatable shaft 113 rotates at the speed required for a vehicle to move at the desired speed and possible varying loads due to wind resistance, grade of the road, internal demand from the vehicle, etc.

For ICE applications or other sources of rotary torque that may need to maintain rotation, Applicant's apparatus, devices, systems, and methods provide the ability to uncouple the ICE (or an Electric Motor or other rotational source of power) from the wheels, effectively replacing the torque converter or clutch or other physical decoupling and coupling device between two rotating shafts in a vehicle, such as between rotatable shaft 12 and rotatable shaft 113.

Figure 7:
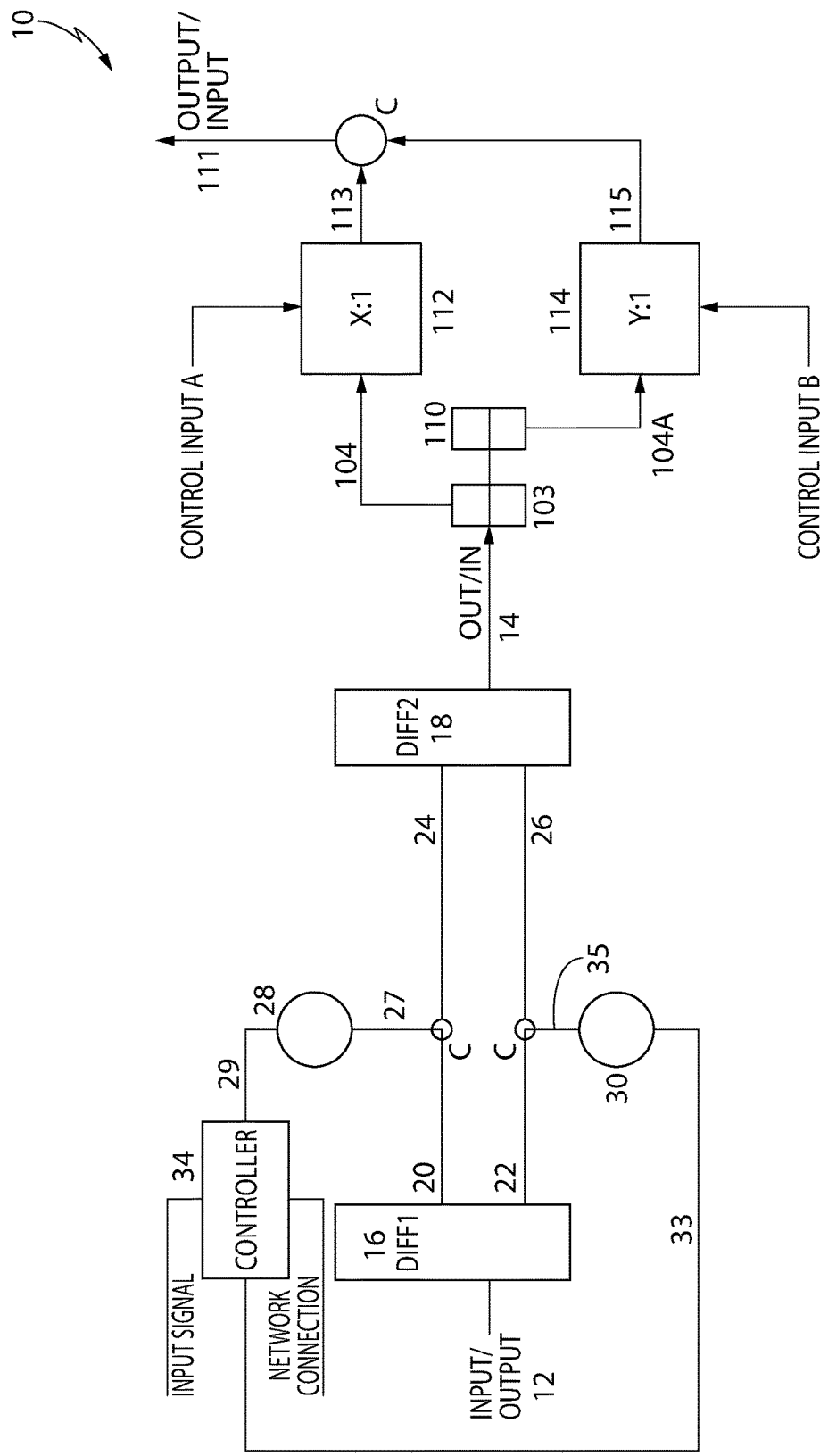
FIG. 7 is a block flow diagram of an exemplary embodiment of Applicant's apparatus or system.

The embodiment shown in FIG. 7, where rotatable shaft 111 is coupled to the wheels of a vehicle for example, rotational power acting as a source coupled to rotatable shaft 12, differential 16 transfers this rotational power to rotatable shafts 20 and 22 for torque to be transferred through differential 16. For simplification of example, if differential 16 has a 1:1:1 ratio of speeds between rotatable shafts 12, 20 and 22, and if rotatable shafts 20 and 22 experience the same torque applied to them, which torque could include "0" torque, both rotatable shafts 20 and 22 will rotate at the same speed, thus converting a single source of rotational power coupled to rotatable shaft 12 to dual sources of rotational power from rotatable shafts 20 and 22. Motor 28 which is coupled to rotatable shaft 20 can be controlled by controller 34 to operate as a sink for rotational power and thereby act as a generator to be a source of power for motor 30 to be controlled by controller 34 to act as a source of rotational power coupled to rotatable shaft 22, or vice versa with motor 30 acting as a generator to power motor 28. In this example, there is no external source of power for the motors 28 and 30, though there would be a relatively low-level power to support the circuitry of the controller 34. The controller 34 may control the operation of both motor 28 and motor 30. Rotatable shaft 24 is also coupled to rotatable shaft 20 and motor 28, and rotatable shaft 26 is coupled to rotatable shaft 22 and motor 30. If differential 18 has a gear or other mechanisms such that when rotatable shaft 24 and rotatable shaft 26 are rotating at the same speed and direction, the rotational speed of rotatable shaft 14 is zero.

Rotatable shaft 14 is coupled by one-way bearing/coupling-uncoupling device 103 to rotational speed and/or torque converter 112 and to one-way bearing/coupling-uncoupling device 110 to rotational speed and/or torque converter 114. Speed and/or torque converter 112 is coupled to rotatable shaft 113, and speed and/or torque converter 114 is coupled to rotatable shaft 115. Rotatable shaft 14 direction of rotation is controlled by the relative speed between rotatable shaft 24 and rotatable shaft 26. When motor 28 operates as a generator and provides power to enable controller 34 to operate motor 30 as a source of rotational power, motor 28 acts as a sink for rotational power on rotatable shaft 20, which is coupled to rotatable shaft 24 and motor 28 slows down the speed of rotation of rotatable shaft 24 relative to the rotational speed of rotatable shaft 26 and rotatable shaft 14 rotates in one direction. When the reverse occurs through control of controller 34, such that motor 30 operates as a generator and motor 28 as a source of rotational power, with rotatable shaft 26 rotating slower than rotatable shaft 24, but still rotating in the same direction as before, rotatable shaft 14 rotates in the opposite direction.

When rotatable shaft 14 starts to rotate in one direction and produce rotating torque in the same direction, rotatable shaft 14 coupled to one-way bearing/coupling-uncoupling device 103 will be transferring torque to speed and/or torque converter 112 and to rotatable shaft 113 coupled to Output/Input rotatable shaft 111 and rotatable shaft 14 coupled to one-way bearing/coupling-uncoupling device 110 will not transfer any torque.

When the direction of rotation on rotatable shaft 14 is opposite to the example above, with direction of torque in the direction of rotation, rotatable shaft 14 transfers torque to speed and/or torque converter 114, coupled to rotatable shaft 115, coupled to Output/Input shaft 111.

Depending on demand on the vehicle speed and torque, it may be determined that a different gear ratio than provided by torque and/or speed converter 112 is required, and this new gear ratio that would satisfy the demand would be internally or externally selected in torque and/or speed converter 114 in a relatively simple manner while there is no torque being transferred through the torque and/or speed converter 114. To enable the torque produced by rotary power source coupled to rotatable shaft 12 to flow through the new gear ratio in torque and/or speed converter 114 and to rotatable shaft 111, controller 34 is commanded by its input signal or via its network connection to change the relative speeds of rotatable shafts 24 and 26 without changing the direction of their direction of rotation. This change in relative speeds between rotatable shafts 24 and 26 will cause rotatable shaft 14 to rotate in the opposite direction of rotation, which will cause one-way bearing/coupling-uncoupling device 103 to cease transferring rotational torque and cause one-way bearing/coupling-uncoupling device 110 to start transferring rotational torque and produce rotational torque at rotatable shaft 14 coupled to torque and/or speed converter 114 with a specific internally or externally selected gear ratio, to rotatable shaft 115 and coupled to rotatable shaft 111. Changing the relative speed between rotatable shafts 24 and 26 enables shifting the transfer of torque between torque and/or speed converters 112 and 114.

The changing of the capability to transfer torque between torque and/or speed converters 112 and 114 is done under conditions where there is no transfer of torque from rotatable shaft 12 to rotatable shaft 111 until the relative change in speeds between rotatable shaft 24 and rotatable shaft 26 is sufficient to enable transfer of torque through the selected one-way bearing/coupling-uncoupling device 103 or one-way bearing/coupling-uncoupling device 110. The change in relative speeds of rotatable shaft 24 and rotatable shaft 26 to be done sufficiently quickly and under sufficient precision of control by controller 34 as to produce the gear ratio change relatively quickly to with minimize torque interruption.

Figure 8:
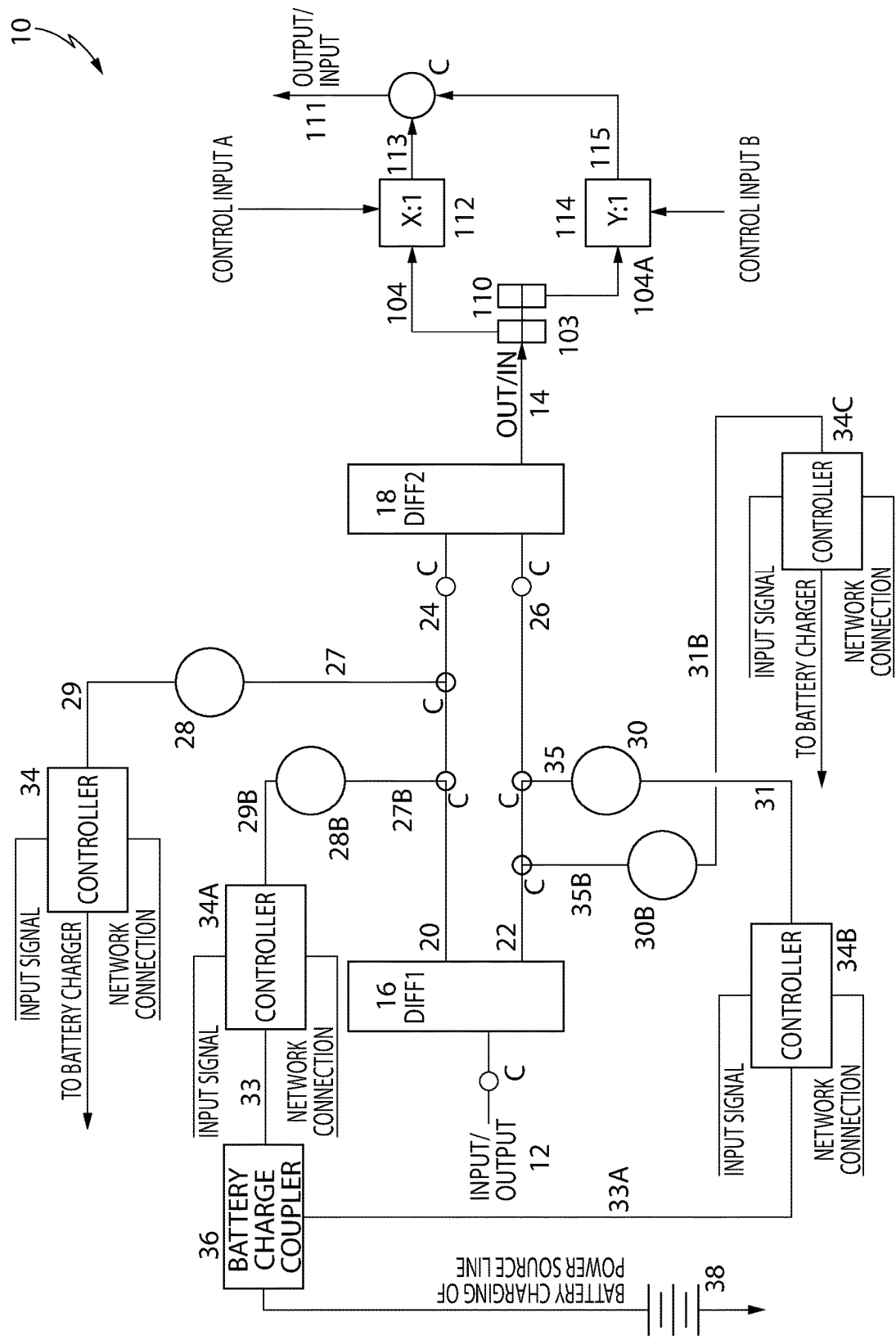
FIG. 8 is a block flow diagram of an exemplary embodiment of Applicant's apparatus or system.

The embodiment illustrated in FIG. 8 is a variation of the embodiment illustrated in FIG. 7. In FIG. 8, the use of multiple motors/generators working mechanically together to produce a summation of their rotational forces can have significant increases in efficiency of operation and significant value in economics of scale.

The motors/generators (28, 30 and 28B, 30B) can be electric motor/generators and their controllers (34, 34A, 34B, 34C) designed for the same, but may also be alternate means of producing and sinking and controlling rotational power that may utilize technologies known and understood currently, or means of producing and sinking and controlling rotational power that may utilize technology or technologies that are not yet known and understood currently.

For example, electric motors can exhibit a reduction of efficiency when they are required to operate at lower levels of their maximum power capacity. Therefore, using multiple motors operating to produce rotational power in parallel, one or more motor/generators can be shut off in a defined strategic manner so as to require the remaining motor(s)/generator(s) to produce rotational power at or near their maximum capacity, thereby operating at a higher efficiency. These motors/generators can be dynamically switched on or off so as to ensure that the motors/generators which are "on" will be operating at or near full capacity and thus at their highest level of efficiency.

The sum of the rotational power of the total number of motors/generators operating on each of rotatable shafts 20 and 22 meets the requirements of the system.

In addition to enabling maximizing of the efficiency of operation of the motors/generators, having multiple motors/generators operating mechanically in parallel on each of rotatable shafts 20 and 22 produces an increase in reliability of the system, as the system is designed such that if a motor/generator fails, it will do so in the "freely rotating" mode and without impacting the rotation of rotatable shafts 20 or 22. In case of failure of a motor/generator, the remaining motors/generators effecting each of rotatable shafts 20 or 22 can continue to operate.

The above suggests that having many (e.g., 5, 10, 20, etc.) smaller motors/generators operating on rotatable shafts 20 and 22, and that in total can produce the required rotational power on each of rotatable shafts 20 and 22, can increase the reliability of the system.

That can also increase the efficiency of the system as there is an incrementally greater granularity of power levels which can be turned on or off to ensure that the operating motors/generators are operating at or near their maximum power levels and therefore closer to their maximum efficiency of operation.

There are other ramifications to having many small motors/generators with their own controllers rather than a single motor/generator with a single controller for each motor/generator for each of rotatable shafts 20 and 22. For instance, if the system is designed for ease of service, each motor/generator and its dedicated controller can be a single small module that can have a "good"/"bad" indicator and can be mechanically and electrically disconnected and easily replaced by a relatively unskilled repair mechanic. This can be important as electrification of vehicles, for instance, gains momentum and can move faster than the time it takes to train or re-train automotive service people to work with electrified vehicles.

As well, with a larger number of smaller motors/generators and their dedicated controllers, possibly as a single module, the economics of scale could help reduce the cost of such a system.

It might even be possible to design such a system that the low cost of a motor/generator and its dedicated controller is a single module with a "good"/"bad" indicator that would enable the vehicle operator to replace the module with quick connect/disconnect capability.

The rotary power to rotatable shaft 12 can be an ICE, electric motor, or other high or low rotational power source such as a steam driven rotating power source, nuclear powered rotational power source (and sink), or other yet unknown source that can produce (and possibly sink) rotational power.

Figure 9:
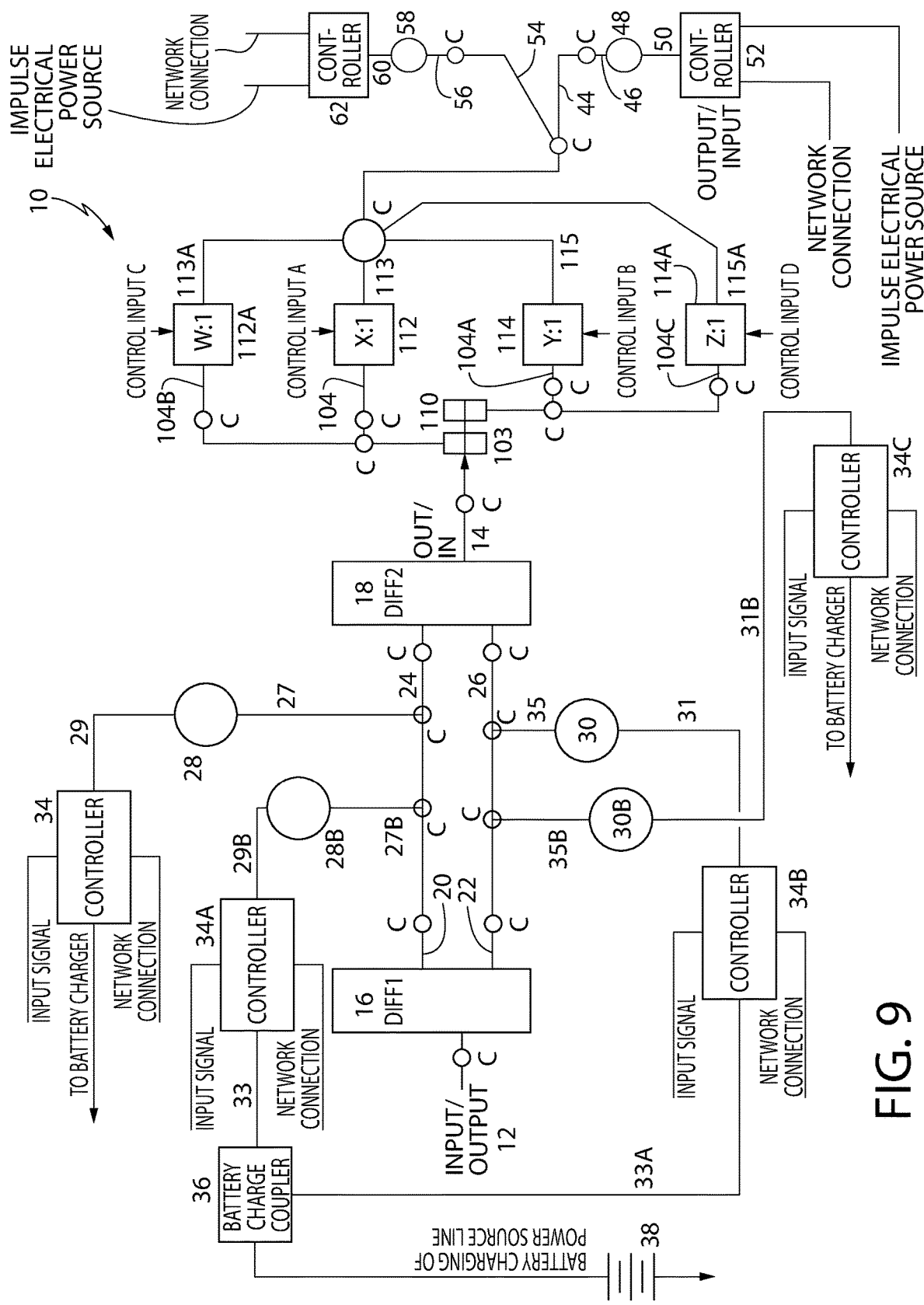
FIG. 9 is a block flow diagram of an exemplary embodiment of Applicant's apparatus or system.

FIG. 9 illustrates an embodiment that includes additional shafts 104B and 104C and corresponding torque and/or speed converter 112A to rotatable shaft 113A and torque and/or speed converter 114A to rotatable shaft 115A, all coupled to rotatable shaft 111. FIG. 9 shows an embodiment that includes couplers C on rotatable shafts 104, 104A, 104B, and 104C. The couplers C can embody coupling/uncoupling units that can act to couple or uncouple the shafts they are on, thus increasing the ability of the embodiment shown in FIG. 9 to have increased selection of torque and/or speed converters, essentially without limitation, though limitations may be imposed by practical or physical constraints or design constrains or other reasons. The coupling/uncoupling action of the couplers on shafts 104, 104A, 104B, and 104C could occur when torque was not being transferred by these shafts. These couplers C could have a variety of embodiments to provide lossless coupling/uncoupling as there is no torque transfer during the coupling/uncoupling activity, such as a differential with a brake on of three elements of the differential, or claw type clutch, and others that those skilled in the art could incorporate.

FIG. 9 includes impulse motor/controllers/impulse power source or sink to reduce torque interruption during gear shift. This includes motors 48 and 58 in communication with controllers 52 and 62, such as via cables 50 and 60 respectively. The motors are coupled to rotatable shafts 46 and 56 respectively and rotatable shafts 44 and 46 respectively, which are coupled via rotatable shaft 54 to rotatable shaft 111. A person skilled in the art could increase the number of motors and controllers or reduce to one motor and one controller, depending on the needs of system 10.

A significant, fundamental benefit of this system is that the rotational power produced or used through rotatable shaft 12 is not linearly related to the rotational power produced or used by rotatable shaft 14 and the direction of rotation of rotatable shaft 14 is independent of the direction of rotation of rotatable shaft 12 and with the use of the above coupling/uncoupling units for couplers C, on shafts 104, 104A, 104B, and 104C, could select individual torque and/or speed converters that could benefit the strategy of shifting to increased or decreased gear ratios, or simply shifting between an effectively unlimited number of fixed gear ratios.

This embodiment of Applicant's apparatus continues to enable the rotational power source (sink) coupled to rotatable shaft 12 to be designed and/or dynamically controlled to run at the most efficient speed under any specific torque demand to produce or sink power on rotatable shaft 14 and provide torque and/or speed conversion over a virtually unlimited range of gear ratios while, additionally and importantly, unlike other systems using differential gears and dual motors and which require their motor to traverse through a wide range of speeds and directions, including motor (/generator) speeds that produce low or lower than optimal efficiency of operation, Applicant's system enables the motor/generator pair to rotate at their ideal and optimal efficiency of speed, under all conditions of speed and torque (power) transfer. In general, there are a plurality of rotational speeds of the motor and generator, where the rotational speed of rotatable shaft 14 is zero and the motor/generator will not be transferring speed between the input and output of the system.

Figure 10:
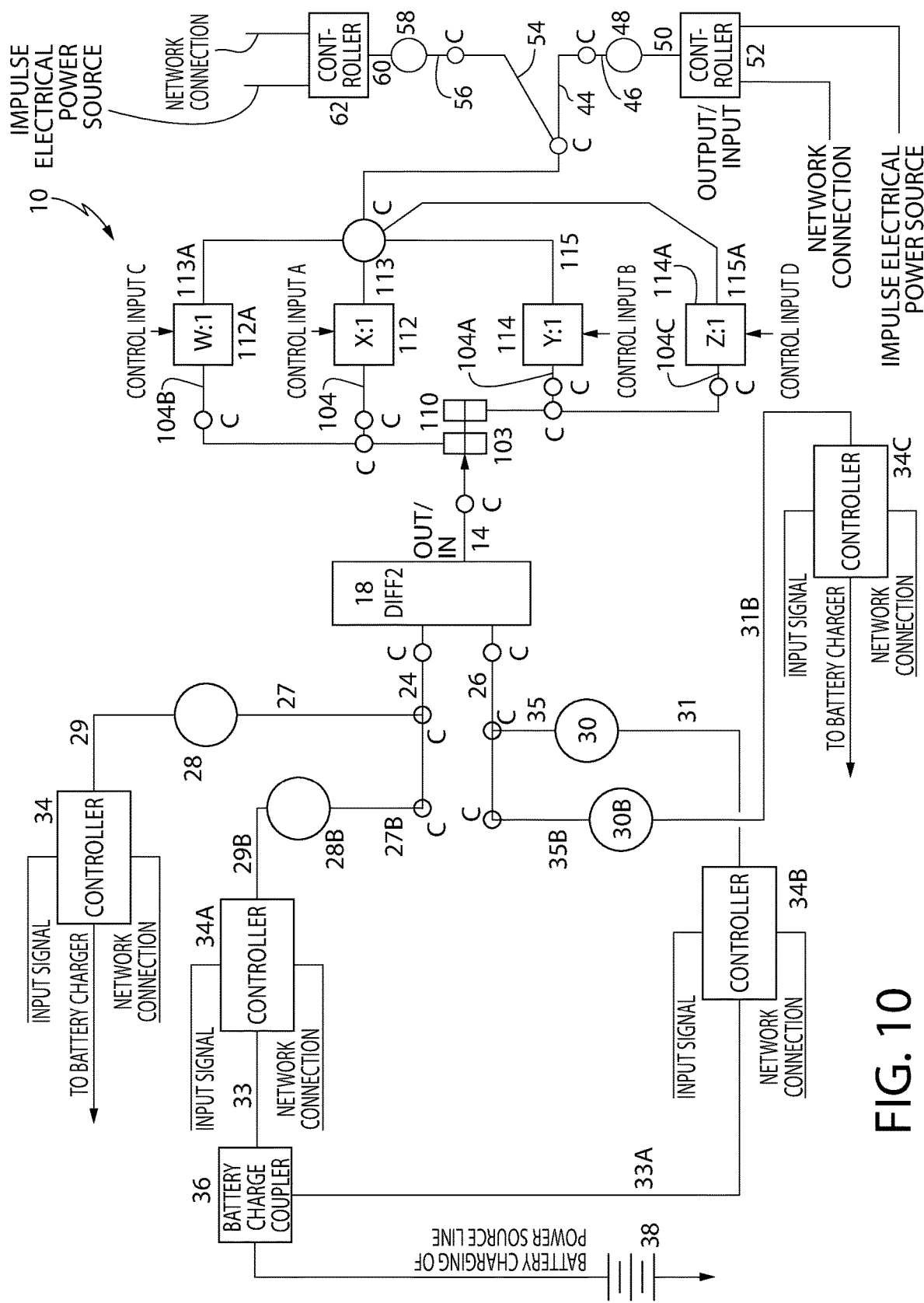
FIG. 10 is a block flow diagram of an exemplary embodiment of Applicant's apparatus or system.

The embodiment illustrated in FIG. 10 is similar to the embodiment illustrated in FIG. 9, except that the single source of rotational power through rotatable shaft 12 has been removed, and differential 16, rotatable shaft 20, and rotatable shaft 22 have been removed, and motors 28, 28B, 30, and 30B and their respective controllers 34, 34A, 34B, and 34C respectively provide the various combinations of rotary power sources and sinks to transfer torque to and from differential 18.

The embodiment shown in FIG. 10 includes impulse motor/controllers, /impulse power source or sink to reduce torque interruption during gear shift. This includes motors 48 and 58 in communication with controllers 52 and 62, such as via cables 50 and 60 respectively. The motors are coupled to rotatable shafts 46 and 56 respectively and to rotatable shafts 44 and 46 respectively, which are coupled to rotatable shaft 111. A person skilled in the art could increase the number of motors and controllers or reduce to one motor and one controller, depending on the needs of system 10.

Figure 11:
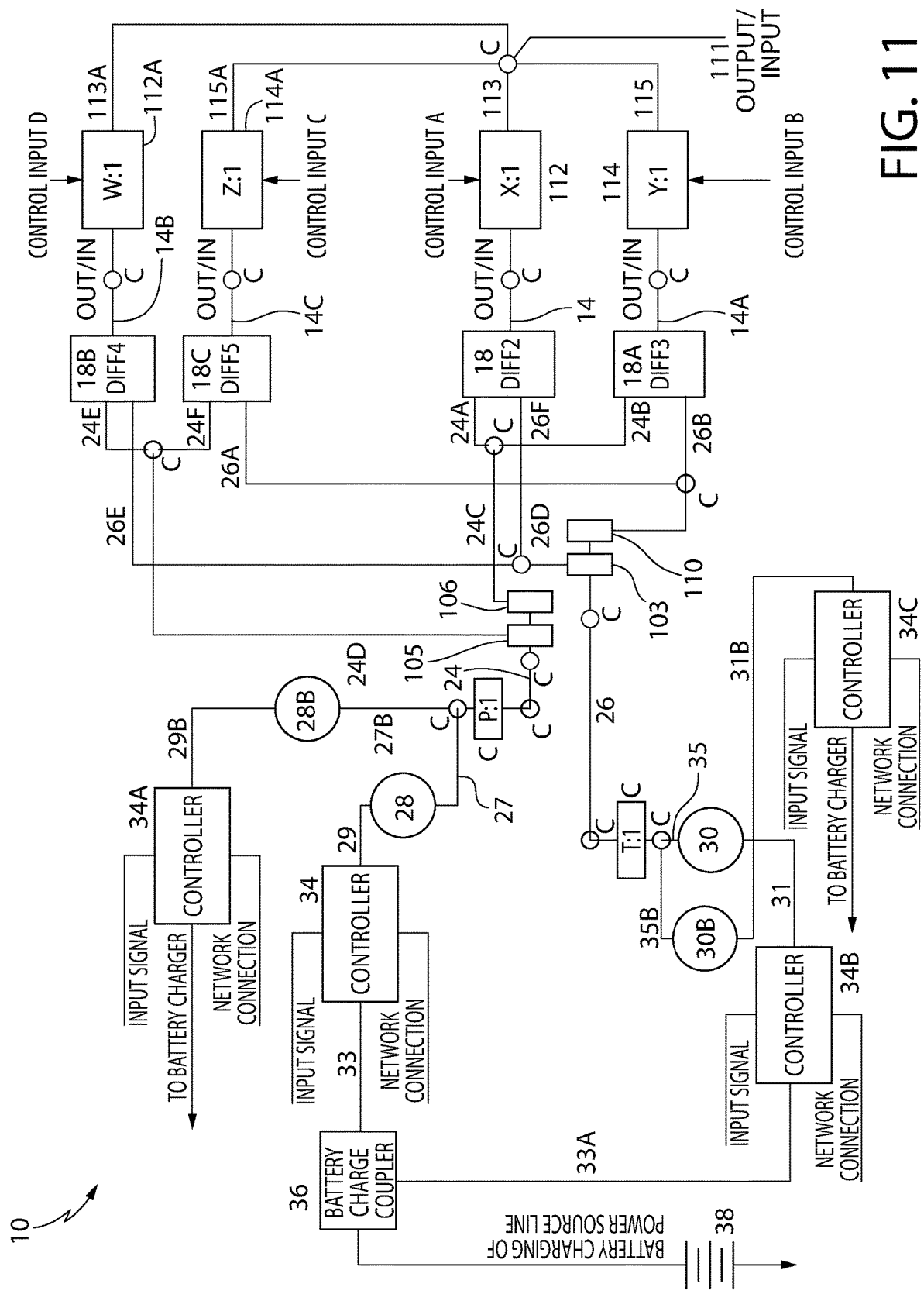
FIG. 11 is a block flow diagram of an exemplary embodiment of Applicant's apparatus or system.

In the embodiment illustrated in FIG. 11, rotary power is provided to or taken by one or more electric motors (28, 28B) coupled mechanically to produce a sum of their power and coupled via rotatable shafts 27 and 27B respectively and to rotatable shaft 24, coupled to differentials 18, 18A, 18B, and 18C, and one or more electric motors (30, 30B) coupled mechanically to produce a sum of their power and coupled via rotatable shafts 35 and 35B respectively and to rotatable shaft 26, coupled to differentials 18, 18A, 18B, and 18C. The battery 38 is the source of power providing for the motors 28, 28B, 30, and 30B via controllers 34, 34A, 34B and 34C respectively, via electric cables 33 and 33A from battery charge coupler to controllers 34 and 34B respectively (electric cables between battery charge coupler and controllers 34A and 34C not shown) and from controllers 34 and 34A via electric cables 29 and 29B for motors 28 and 28B respectively and from controllers 34B and 34C via electric cables 31 and 31B for motors 30 and 30B respectively. The battery 38 via battery charge coupler 36 charges the battery 38 when the motors act as the power sink when at least some of the motors are acting as generators. A reversing gear (not shown) may or may not be needed, depending on the mechanical configuration of differential 18.

Unlike other systems where an electric motor or motors must traverse a wide range of speeds, including zero (0) speed, which requires such motor or motors to operate in low or less than optimal efficiency, Applicant's system enables the motor/generator pair to rotate at their ideal and optimal efficiency of speed, under all conditions of speed and torque (power) transfer. In general, there are a plurality of rotational speeds of the motor and generator where the rotational speed of rotatable shaft 14 is zero and the motor/generator will not be transferring speed between the input and output of the system.

When the differential speeds of the motors are sufficiently high, it can be advantageous for both to operate in the same direction while maintaining a high or near optimal efficiency of operation. The torque and/or speed converters 112 and 114 would accommodate such operation for the system to match the external requirements for rotational power speeds.

Applicant's apparatus, devices, systems, and methods enable use of the smallest motors or motor sets and smooth and selective switching between gear ratios for torque and/or speed converters 112 and 114 without the use of power wasting clutches or other lower efficiency coupling devices to switch between torque and/or speed converters 112 and 114.

The embodiment of Applicant's apparatus or system 10 illustrated in FIG. 11 supports bi-directional energy flows similar to the embodiment of Applicant's apparatus or system 10 illustrated in FIG. 1 and discussed above. The section to the right of rotatable shafts 24 and 26 of FIG. 11 enables up to four combinations of directions of rotation of rotatable shafts 24 and 26. This enables selection of four different output shafts from any one of up to four differentials—differential 18, differential 18A, differential 18B, and differential 18C. The four differentials 18, 18A, 18B and 18C can be coupled to fixed gear-ratio torque and/or speed converters 112, 114, 112A, or 114A respectively, and thereby selecting each of the four output shafts can produce a different gear ratio. Such four gear ratios may be sufficient in many electric vehicles or other applications of this embodiment of Applicant's apparatus. Otherwise, each of the torque and/or speed converters coupled to the output of each differential can be variable with multiple gear ratios available for each torque and/or speed converter, and thus offering the selection of four groups of gear-ratio units. This may be helpful when a large number of gear ratios may help optimize a powertrain, such as in a large transport truck.

Rotatable shaft 24 can be rotated by electric motors 28 and 28B via their controllers 34 and 34A respectively at any speed within their range of operation and in either direction, and independent of the rotational speed or direction of rotation of rotatable shaft 24, rotatable shaft 26 can be rotated by electric motors 30 and 30B via their controllers 34B and 34C respectively at any speed within their range of operation and in either direction.

As described in alternate embodiments such as FIG. 2, but without the need for a reversing gear, differential 18 and differential 18A in FIG. 11 can produce zero speed and zero torque on rotatable shaft 14 or rotatable shaft 14A under certain speed ranges of their rotatable shafts 24A and 26F, and rotatable shafts 24B and 26B respectively, with rotatable shaft 14 transferring torque with speed and/or torque converter 112 to rotatable shaft 113, coupled to rotatable shaft 111, and with rotatable shaft 14A transferring torque with speed and/or torque converter 114 to rotatable shaft 115, coupled to rotatable shaft 111, but rotatable torque is transferred only by either rotatable shaft 14 or 14A at a time, but not both at the same time.

In a similar manner to the operation of differential 18 and 18A, differential 18B and differential 18C in FIG. 11 can produce zero speed and zero torque on rotatable shaft 14B or 14C under certain speed ranges of their rotatable shafts 24E and 26E, and rotatable shafts 24F and 26A respectively, with rotatable shaft 14B transferring torque with speed and/or torque converter 112A and rotatable shaft 113A, coupled to rotatable shaft 111, and with rotatable shaft 14C transferring torque with speed and/or torque converter 114A and rotatable shaft 115A, coupled to rotatable shaft 111, but rotatable torque is transferred only by either rotatable shaft 14B or 14C at a time, but not both at the same time.

The additional constraint to the above is that only one of the four rotatable shafts 14, 14A, 14B, or 14C can transfer rotational torque at a time, with the other three rotatable shafts rotating but without transferring torque.

In FIG. 11, as in FIG. 2, one-way bearing/coupling-uncoupling devices 103 and 110 selectively transfer rotational torque from rotatable shaft 26 to differential 18 or differential 18A, as one-way bearing/coupling-uncoupling device 103 can transfer torque with rotatable shaft 26D to rotatable shaft 26F to differential 18, and one-way bearing/coupling-uncoupling device 110 can transfer torque with rotatable shaft 26B to differential 18A. One-way bearing/coupling-uncoupling device 103 can also transfer torque to rotatable shaft 26D to rotatable shaft 26E to differential 18B, and one-way bearing/coupling-uncoupling device 110 can also transfer torque to rotatable shaft 26A to differential 18C, depending on the direction of rotation of rotatable shaft 26.

Although in the embodiment shown in FIG. 2, rotatable shaft 24 is coupled to differential 18 and differential 18A via rotatable shaft 24A and 24B, in this embodiment shown in FIG. 11, rotatable shaft 24 is coupled to one-way bearing/coupling-uncoupling device 105 and one-way bearing/coupling-uncoupling device 106 such that one direction of rotation of rotatable shaft 24 will transfer torque through one-way bearing/coupling-uncoupling device 106, coupled to rotatable shaft 24C to rotatable shaft 24A and rotatable shaft 24B coupled to differential 18 and differential 18A respectively and the opposite direction of rotation of rotatable shaft 24 will enable transfer of torque through one-way bearing/coupling-uncoupling device 105, coupled to rotatable shaft 24D to rotatable shaft 24E and rotatable shaft 24F, coupled to differential 18B and differential 18C respectively.

In addition to the range of speeds of motors 28 and 28B, and motors 30 and 30B, which can produce zero speed for rotatable shafts 14, 14A, 14B and 14C, motors 28 and 28B can rotate in one of two directions at speeds above and below those speeds causing zero speed on the above four rotatable shafts and motors 30 and 30B can also rotate in one of two directions at speeds above and below those speeds causing zero speed on the above four rotatable shafts. In this way, there can be up to four combinations of rotation of electric motors 28 and 28B and electric motors 30 and 30B. Each of these four combinations of rotation can engage one-way bearing/coupling-uncoupling devices 105, 106, 103, and 110 such that torque is transferred with one of the four differentials 18, 18A, 18B or 18C, thus producing torque at only one of rotatable shafts 14, 14A, 14B, or 14C, but not more than one of them at a time, thus selectively transferring torque to torque and/or speed converters 112, 114, 112A, or 114A respectively, and thereby to rotatable shafts 113, 115, 113A, 115A respectively, coupled to rotatable shaft 111.

In addition to the exemplary embodiment of Applicant's apparatus or system 10 illustrated in FIG. 11, variations of that embodiment, as well as other embodiments, are possible. For example, FIGS. 11A through 11G illustrate such variations and other embodiments.

Figure 11A:
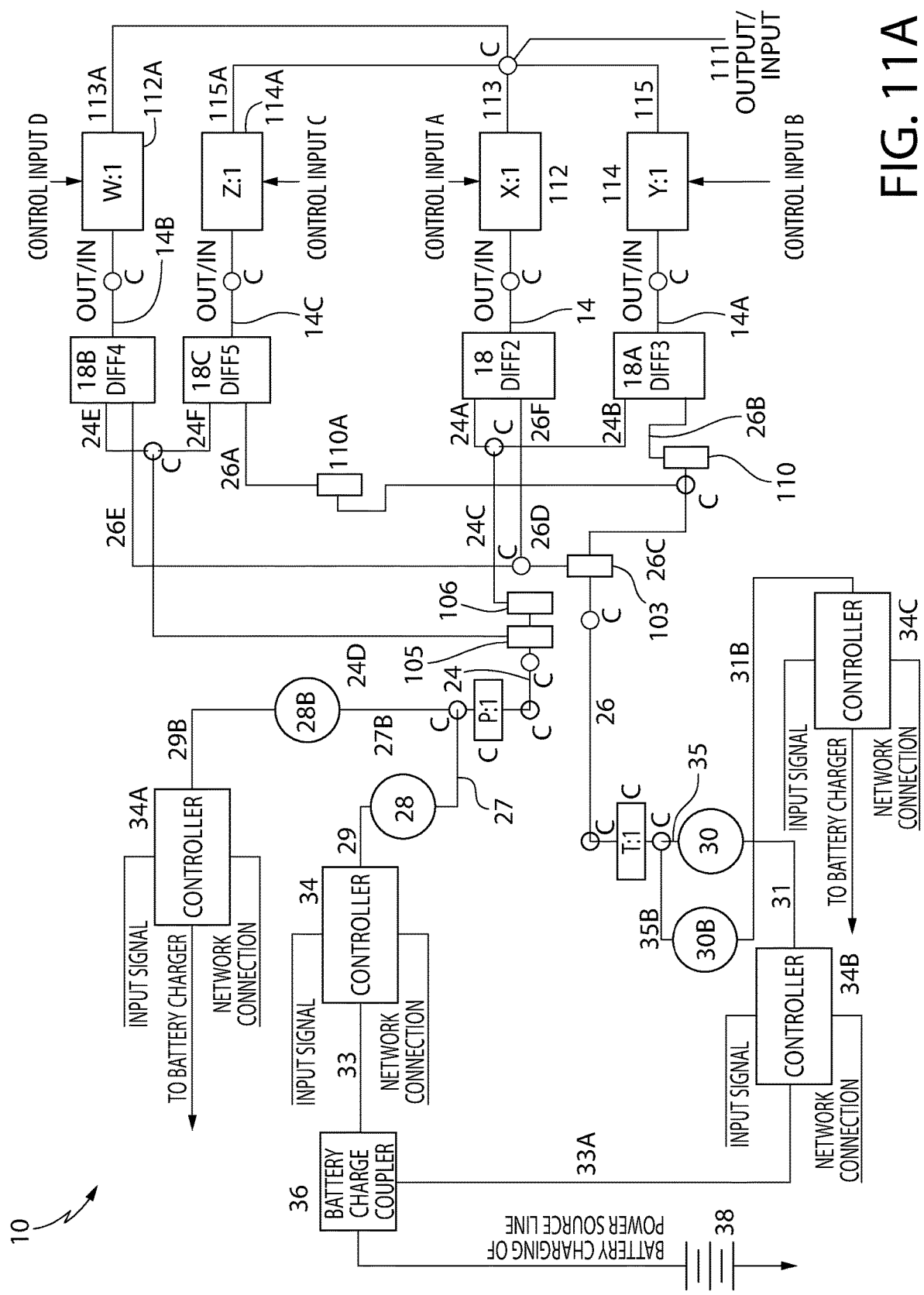
FIG. 11A is a block flow diagram of a variation of the exemplary embodiment of Applicant's apparatus or system in FIG. 11.

In FIG. 11A, the path of torque transfer of one-way bearing/coupling-uncoupling device 110 as described in FIG. 11 above can have alternate embodiments to produce the functionality of one-way bearing/coupling-uncoupling device 110 as described in FIG. 11, where in the alternate embodiment, one-way bearing/coupling-uncoupling devices 110 and 110A are placed along different points of the torque path belonging to one-way bearing/coupling-uncoupling device 110 in FIG. 11.

Figure 11B:
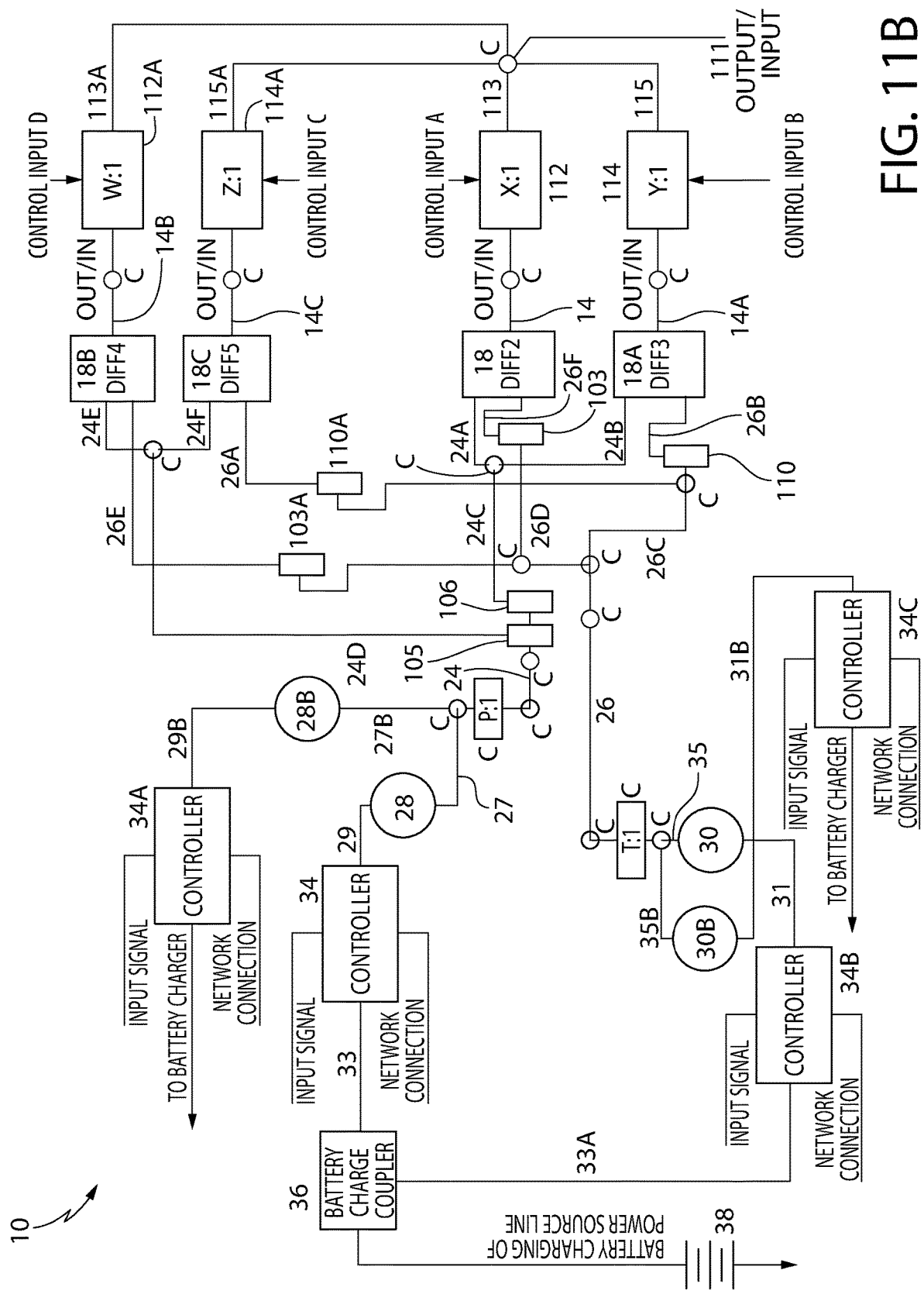
FIG. 11B is a block flow diagram of a variation of the exemplary embodiment of Applicant's apparatus or system in FIG. 11.

In FIG. 11B, the path of torque transfer of one-way bearing/coupling-uncoupling device 103 as described in FIG. 11 above can have alternate embodiments to produce the functionality of one-way bearing/coupling-uncoupling device 103 as described in FIG. 11, where in the alternate embodiment, one-way bearing/coupling-uncoupling devices 103 and 103A are placed along different points of the torque path belonging to one-way bearing/coupling-uncoupling device 103 in FIG. 11.

Figure 11C:
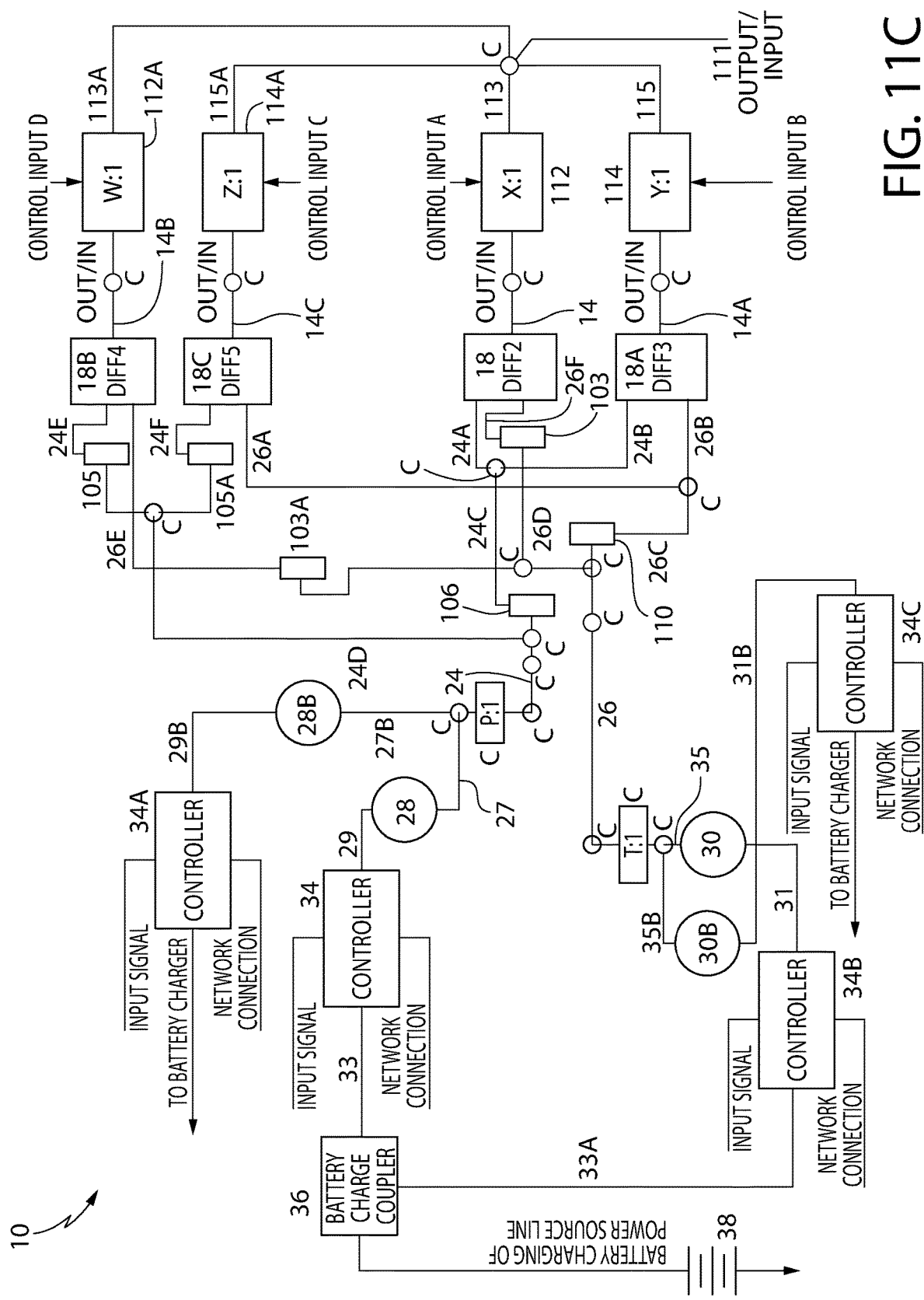
FIG. 11C is a block flow diagram of a variation of the exemplary embodiment of Applicant's apparatus or system in FIG. 11.

In FIG. 11C, the position and functionality of one-way bearing/coupling-uncoupling device 110 is back in the same position and function as in FIG. 11, while the path of torque transfer of one-way bearing/coupling-uncoupling device 105 as described in FIG. 11 above can have alternate embodiments to produce the functionality of one-way bearing/coupling-uncoupling device 105 as described in FIG. 11, where in the alternate embodiment, one-way bearing/coupling-uncoupling devices 105 and 105A are placed along different points of the torque path belonging to one-way bearing/coupling-uncoupling device 105 in FIG. 11.

Figure 11D:
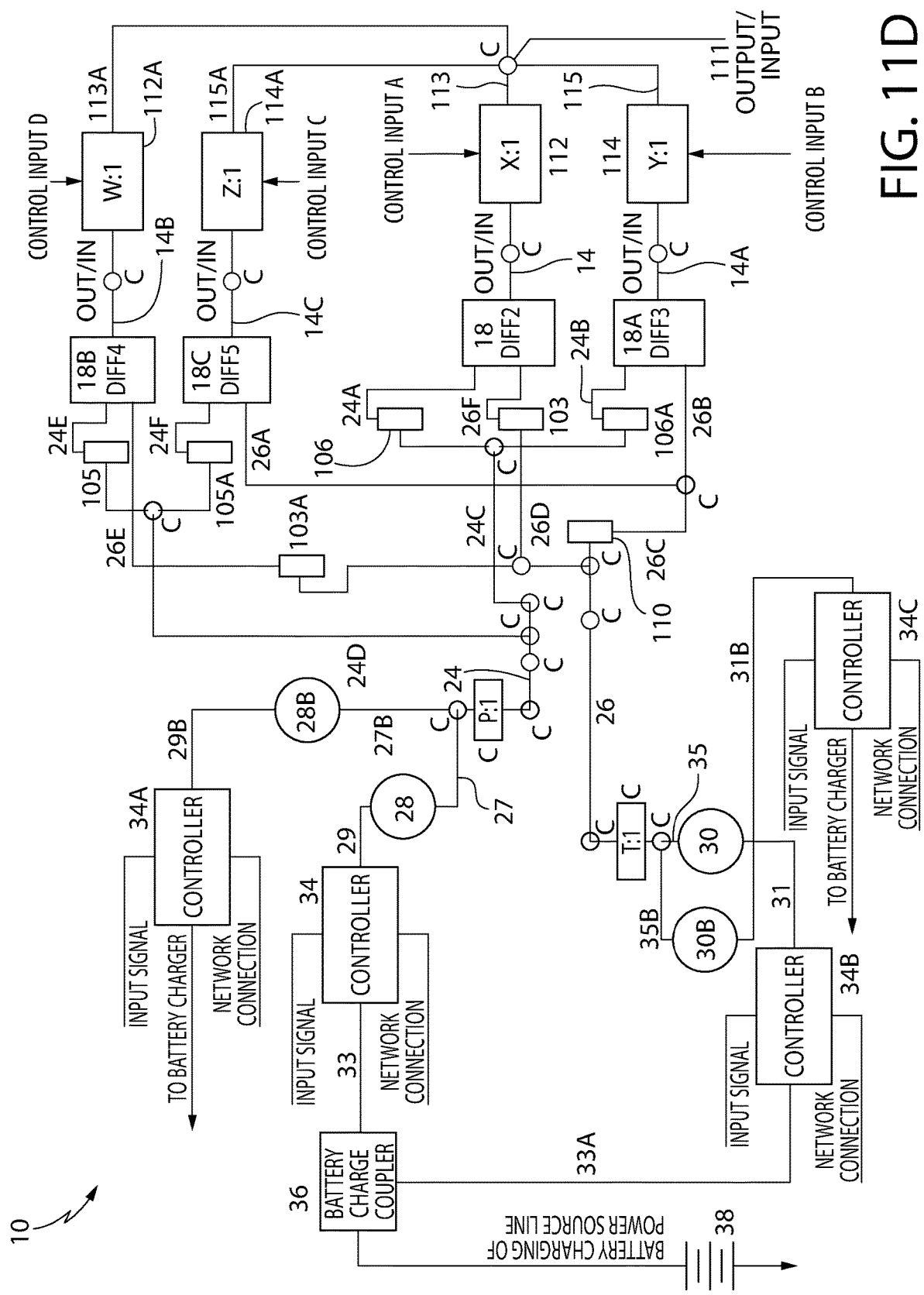
FIG. 11D is a block flow diagram of a variation of the exemplary embodiment of Applicant's apparatus or system in FIG. 11.

In FIG. 11D, the position and functionality of one-way bearing/coupling-uncoupling device 110 is back in the same position and function as in FIG. 11, while the path of torque transfer of one-way bearing/coupling-uncoupling device 106 as described in FIG. 11 above can have alternate embodiments to produce the functionality of one-way bearing/coupling-uncoupling device 106 as described in FIG. 11, where in the alternate embodiment, one-way bearing/coupling-uncoupling devices 106 and 106A are placed along different points of the torque path belonging to one-way bearing/coupling-uncoupling device 106 in FIG. 11.

Figure 11E:
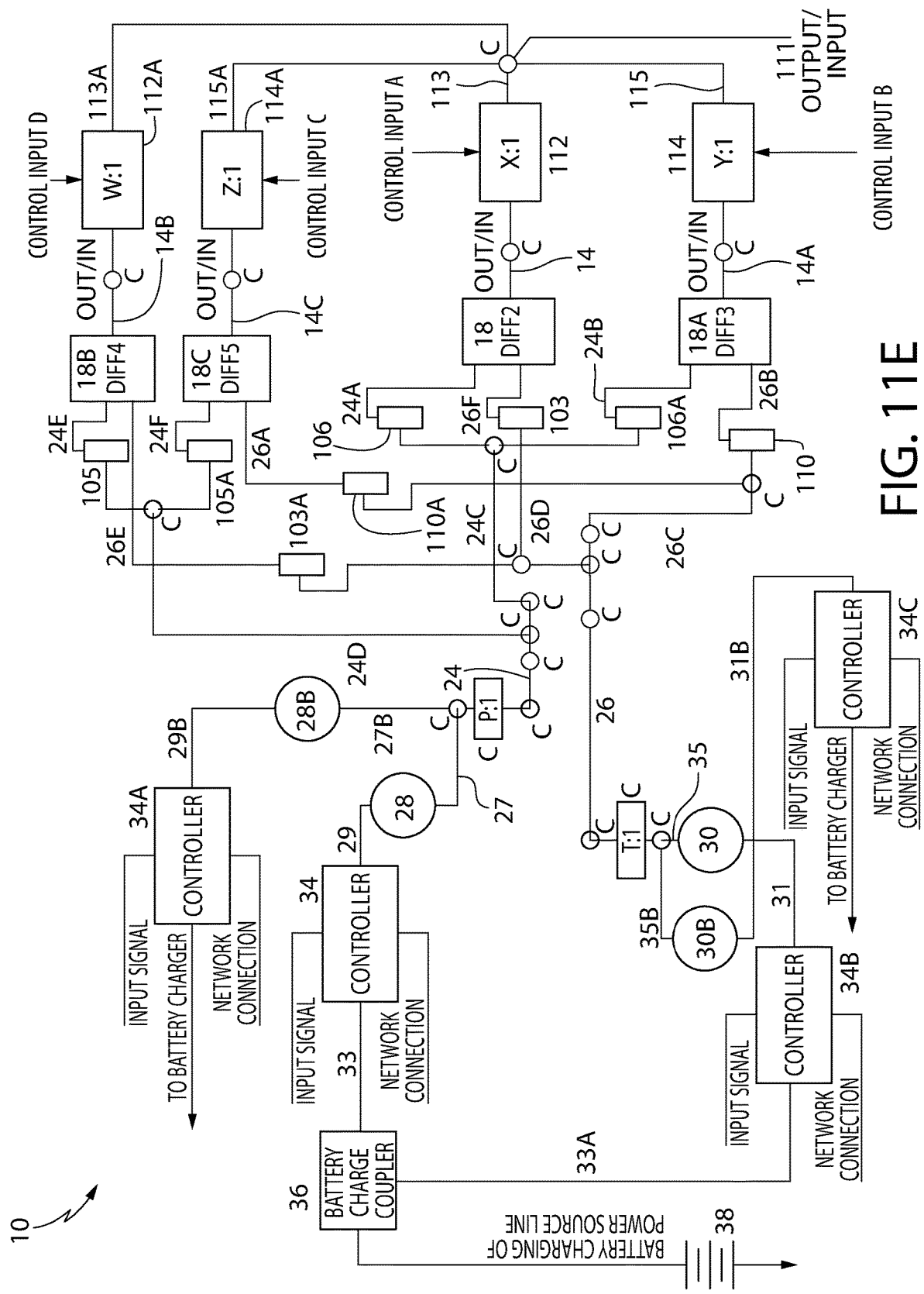
FIG. 11E is a block flow diagram of a variation of the exemplary embodiment of Applicant's apparatus or system in FIG. 11.

In FIG. 11E, the position and functionality of one-way bearing/coupling-uncoupling device 110 is as in the alternative embodiment of FIG. 11A and the one-way bearing/coupling-uncoupling devices 105, 106, and 103 of FIG. 11 are back in the same position and function as in the alternative embodiment of FIG. 11D, and this alternative embodiment FIG. 11E has the same functionality as the embodiment of FIG. 11.

Figure 11F:
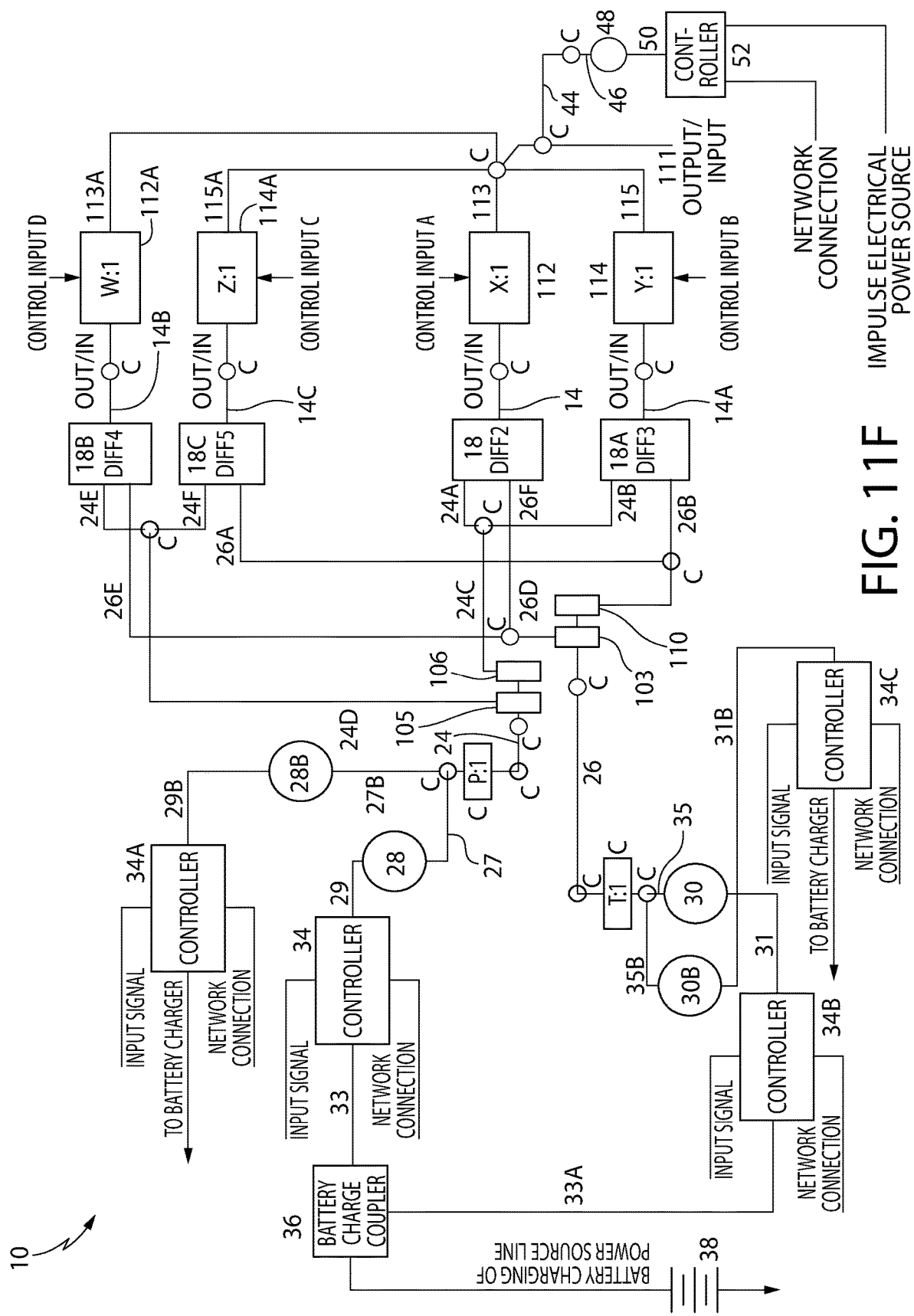
FIG. 11F is a block flow diagram of a variation of the exemplary embodiment of Applicant's apparatus or system in FIG. 11.

FIG. 11F is a variation of FIG. 11, where FIG. 11F includes impulse motor/controller/impulse power source or sink to reduce torque interruption during gear shift. This includes motor 48 in communication with controller 52 via cable 50. The motor is coupled to rotatable shaft 46 and rotatable shaft 44, which is coupled to rotatable shaft 111.

Figure 11G:
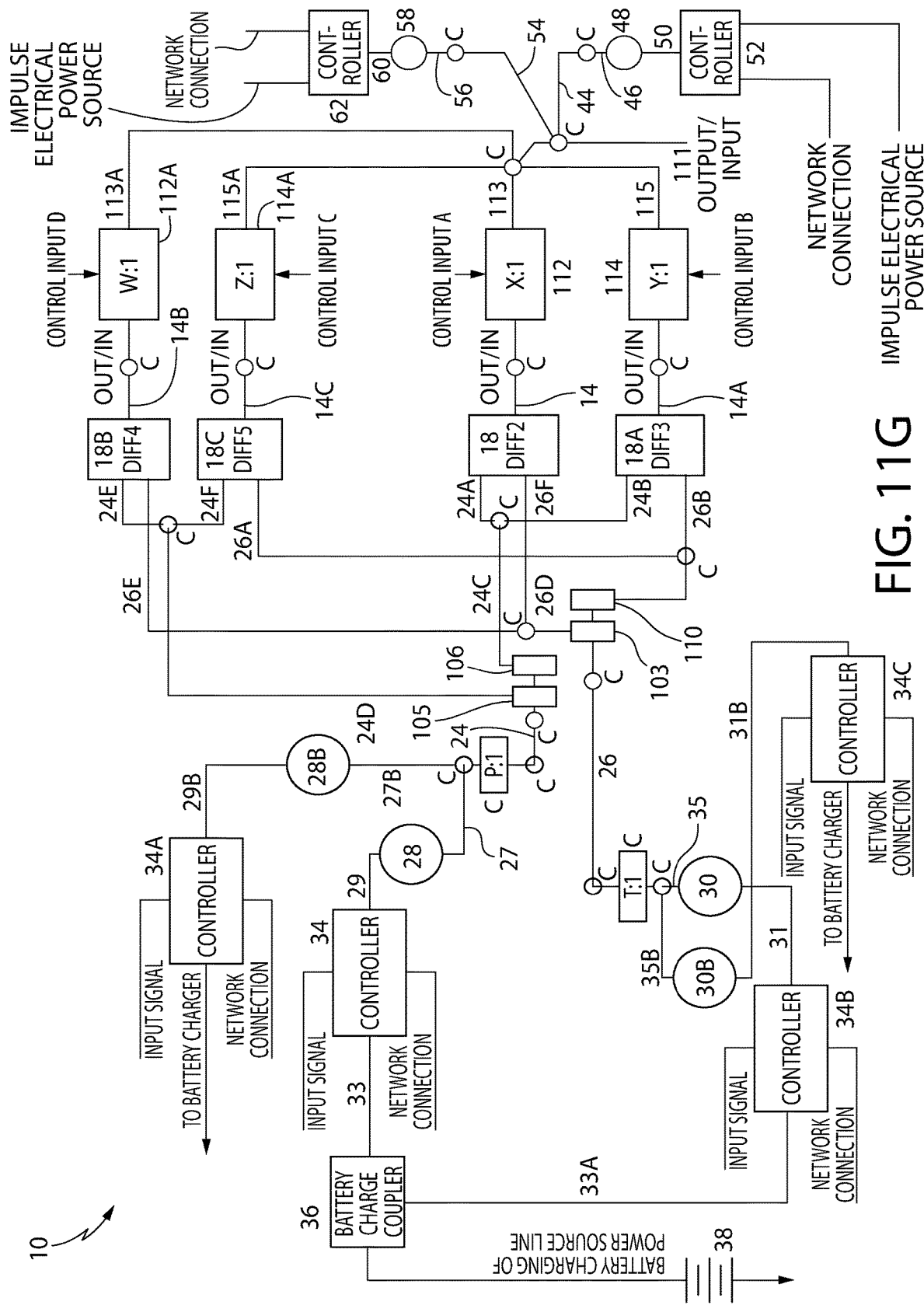
FIG. 11G is a block flow diagram of a variation of the exemplary embodiment of Applicant's apparatus or system in FIG. 11.

FIG. 11G is a variation of FIG. 11, where FIG. 11G includes impulse motor/controllers/impulse power source or sink to reduce torque interruption during gear shift. This includes motors 48 and 58 in communication with controllers 52 and 62, such as via cables 50 and 60 respectively. The motors are coupled to rotatable shafts 46 and 56 respectively and rotatable shafts 44 and 46 respectively, which are coupled to rotatable shaft 111. A person skilled in the art could increase the number of motors and controllers or reduce to one motor and one controller, depending on the needs of system 10.

Figure 12:
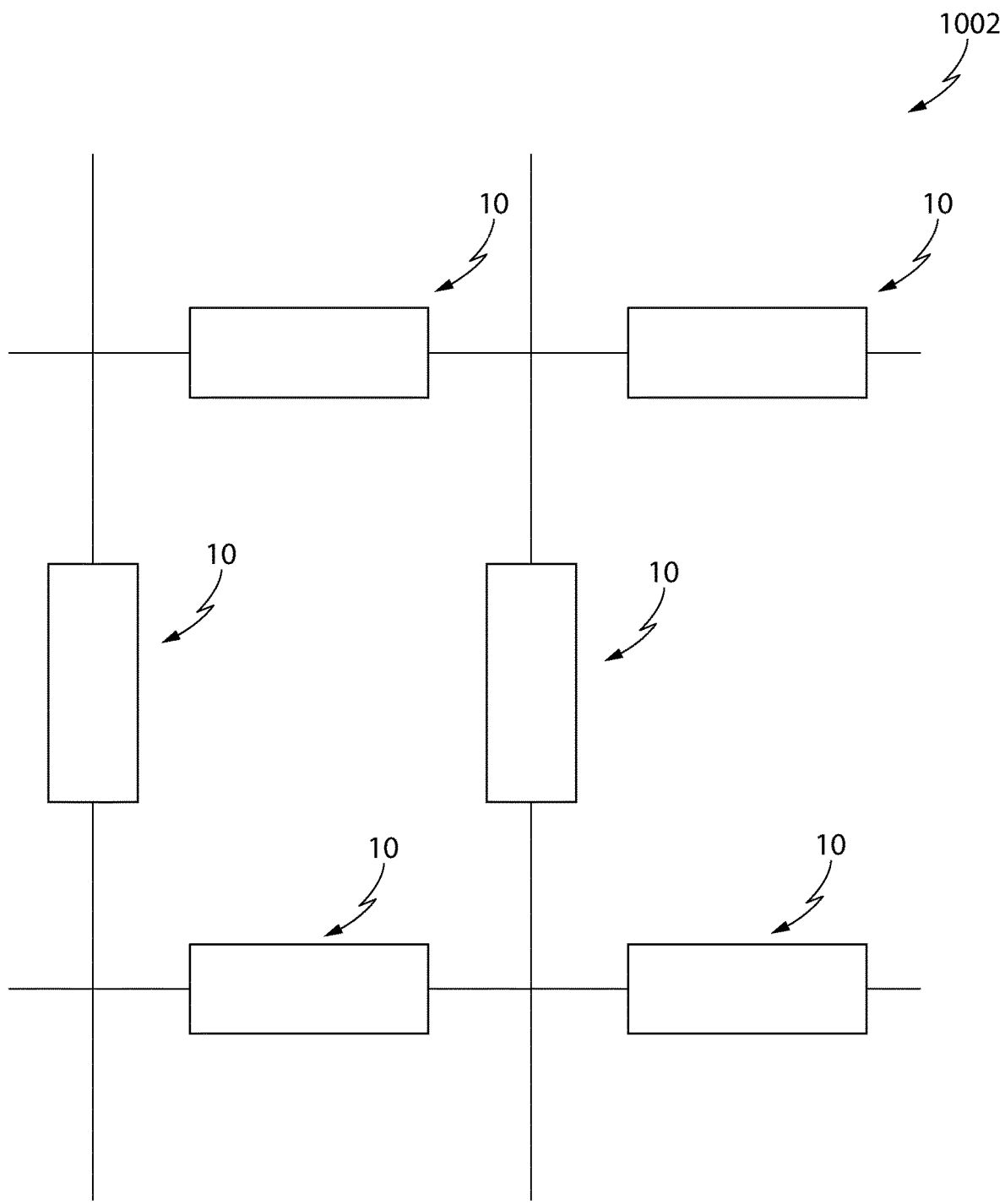
FIG. 12 is a schematic diagram of an exemplary embodiment of a network of Applicant's systems, such as Applicant's systems in the block flow diagrams of the exemplary embodiments in FIGS. 1 through 11G.

Applicant's system comprising differentials, one-way bearing/coupling-uncoupling devices, rotatable shafts, motors motoring, and motors sometimes acting as generators, with two or more choices for torque and speed transfer ratios, can be configured into a network of systems 1002, such as illustrated in FIG. 12, where each block comprises a system 10 (one of the subjects of this patent application) forming a network of systems. For example, each wheel of a 4-wheel vehicle could be powered by a system 10 such as shown in FIG. 2, with the controllers (34, 34A, 34B, 34C) operating in a networked environment to enable them to operate according to a strategic manner and/or according to an algorithmic response. As well, a single ICE or Electric Motor (or other type of motor) could be the rotary power source by example coupled to rotatable shaft 12. There could be multiple configurations of multiples of system 10 as shown in FIGS. 1, 1A-1D, 2, 2A-2D, 6, 7, 8, and 9 (or other like configurations) for a vehicle with multiple systems, with each system having a rotatable shaft 12, shaft 12', shaft 12", etc. By example, for a vehicle with four wheels and four systems as shown in FIG. 5, the source of rotary power could be a single ICE or an Electric Motor, coupled to each of four shafts 12, 12', 12" and 12''', with the output shafts 111, 111', 111" and 111''' coupled to each wheel. It is possible for each motor/generator controller functionally to be operating in a networked environment to enable them to operate according to a strategic manner and/or according to an algorithmic response.

Applicant's apparatus, devices, systems, and methods include many other embodiments and variations thereof which are not illustrated in the drawings or discussed in the Detailed Description section. Those embodiments and variations, however, do fall within the scope of the appended claims and equivalents thereof.

Persons skilled in the art will recognize that the embodiments and variations illustrated in the drawings and discussed in the Detailed Description section do not disclose all of the possible arrangements of Applicant's apparatus, devices, systems, and methods, and that other arrangements are possible. Accordingly, all such other arrangements are contemplated by Applicant's apparatus, devices, systems, and methods, and are within the scope of the appended claims and equivalents thereof.

Persons skilled in the art also will recognize that many other embodiments incorporating Applicant's inventive concepts are possible, as well as many variations of the embodiments illustrated and described herein.

Although illustrated and described herein with reference to certain specific embodiments, Applicant's apparatus, devices, systems, and methods are nevertheless not intended to be limited to the details shown. Rather, various modifications may be made in the details within the scope and range of equivalents of the claims without departing from the spirit of the invention.

What is claimed is:

1. An apparatus, comprising:
a first rotatable shaft coupled to a second rotatable shaft and to a third rotatable shaft;
a fourth rotatable shaft coupled to a fifth rotatable shaft and to a sixth rotatable shaft;
a first differential coupled to the second rotatable shaft and to the fifth rotatable shaft;
a second differential coupled to the third rotatable shaft and to the sixth rotatable shaft;
a seventh rotatable shaft coupled to the first differential;
an eighth rotatable shaft coupled to the second differential;
a first torque and/or speed converter coupled to the seventh rotatable shaft;
a second torque and/or speed converter coupled to the eighth rotatable shaft;
a ninth rotatable shaft coupled to the first torque and/or speed converter;
a tenth rotatable shaft coupled to the second torque and/or speed converter;
an eleventh rotatable shaft coupled to both the ninth rotatable shaft and the tenth rotatable shaft;
at least one one-way bearing/coupling-uncoupling device coupled to at least one of the fourth rotatable shaft, the fifth rotatable shaft, the sixth rotatable shaft, the seventh rotatable shaft, and the ninth rotatable shaft; and
at least one an other one-way bearing/coupling-uncoupling device coupled to at least one of the fourth rotatable shaft, the sixth rotatable shaft, the eighth rotatable shaft, and the tenth rotatable shaft.

2. An apparatus as in claim 1, further comprising:
a first gear mechanism or a first other mechanism in the first differential,
wherein there are a plurality of rotational speeds of the second rotatable shaft and a plurality of rotational speeds of the fifth rotatable shaft whereby a rotational speed of the seventh rotatable shaft is zero, and
wherein the first gear mechanism or the first other mechanism transfers a rotational speed and/or torque to or from the seventh rotatable shaft when a difference of rotational speed occurs between the rotational speed of the second rotatable shaft and the rotational speed of the fifth rotatable shaft,
whereby said difference of rotational speed is different than an other difference of rotational speed between the rotational speed of the second rotatable shaft and the rotational speed of the fifth rotatable shaft that causes the rotational speed of the seventh rotatable shaft to be zero.

3. An apparatus as in claim 2, further comprising:
a second gear mechanism or a second other mechanism in the second differential,
wherein there are a plurality of rotational speeds of the third rotatable shaft and a plurality of rotational speeds of the sixth rotatable shaft whereby a rotational speed of the eighth rotatable shaft is zero, and
wherein the second gear mechanism or the second other mechanism transfers a rotational speed and/or torque to or from the eighth rotatable shaft when a difference of rotational speed occurs between a rotational speed of the third rotatable shaft and a rotational speed of the sixth rotatable shaft, whereby said difference of rotational speed is different than an other difference of rotational speed between the rotational speed of the third rotatable shaft and the rotational speed of the sixth rotatable shaft that causes the rotational speed of the eighth rotatable shaft to be zero.

4. An apparatus as in claim 1, wherein the at least one first one-way bearing/coupling-uncoupling device transfers rotary torque between
(a) at least one of the fourth rotatable shaft and the fifth rotatable shaft, the seventh rotatable shaft and the first torque and/or speed converter, and the first torque and/or speed converter and the ninth rotatable shaft, when the fourth rotatable shaft is rotating in a first direction, or when the first one-way bearing/coupling-uncoupling device engages to transfer torque, or
(b) at least one of the first rotatable shaft and the second rotatable shaft, the seventh rotatable shaft and the first torque and/or speed converter, and the first torque and/or speed converter and the ninth rotatable shaft, when the first rotatable shaft is rotating in the first direction, or when the first one-way bearing/coupling-uncoupling device engages to transfer torque, or
(c) at least one of the first rotatable shaft and the second rotatable shaft, the fourth rotatable shaft and the fifth rotatable shaft, the seventh rotatable shaft and the first torque and/or speed converter, and the first torque and/or speed converter and the ninth rotatable shaft, when the seventh rotatable shaft is rotating in a first direction, or when the first one-way bearing/coupling-uncoupling device engages to transfer torque.

5. An apparatus as in claim 4, wherein the second one-way bearing/coupling-uncoupling device transfers rotary torque between
(a) at least one of the fourth rotatable shaft and the sixth rotatable shaft, the eighth rotatable shaft and the second speed and/or torque converter, and the second speed and/or torque converter and the tenth rotatable shaft, when the fourth rotatable shaft is rotating in a second direction opposite the first direction, or when the second one-way bearing/coupling-uncoupling device engages to transfer torque, if the first one-way bearing/coupling-uncoupling device is coupled to the fourth rotatable shaft, or
(b) at least one of the first rotatable shaft and the sixth rotatable shaft, the eighth rotatable shaft and the second speed and/or torque converter, the second speed and/or torque converter and the tenth rotatable shaft, when the first rotatable shaft is rotating in a second direction opposite the first direction, or when the second one-way bearing/coupling-uncoupling device engages to transfer torque, if the first one-way bearing/coupling-uncoupling device is coupled to the first rotatable shaft, or
(c) at least one of the first rotatable shaft and the sixth rotatable shaft, the fourth rotatable shaft and the fifth rotatable shaft, the eighth rotatable shaft and the second speed and/or torque converter, the second speed and/or torque converter and the tenth rotatable shaft, when the eighth rotatable shaft is rotating in a second direction opposite the first direction, or when the second one-way bearing/coupling-uncoupling device engages to transfer torque.

6. An apparatus as in claim 1, wherein a torque conversion ratio of the first torque and/or speed converter is fixed or is changeable by a first internal control mechanism or by a first external control input.

7. An apparatus as in claim 6, wherein a torque conversion ratio of the second torque and/or speed converter is fixed or is changeable by a second internal control mechanism or by a second external control input.

8. An apparatus as in claim 1, wherein at least one of the first rotatable shaft, the second rotatable shaft, the seventh rotatable shaft, and the eighth rotatable shaft has coupled to said at least one rotatable shaft at least one coupler.

9. An apparatus as in claim 8, wherein at least one of the at least one coupler includes a device providing a torque and/or conversion ratio.

10. An apparatus as in claim 9, wherein at least one device provides a torque and/or speed conversion ratio different than at least one other torque and/or speed conversion ratio provided by at least one other device.

11. An apparatus as in claim 1, wherein a transfer of torque is bi-directional for at least one of the first rotatable shaft, the second rotatable shaft, the third rotatable shaft, the fourth rotatable shaft, the fifth rotatable shaft, the sixth rotatable shaft, the seventh rotatable shaft, the eighth rotatable shaft, the ninth rotatable shaft, the tenth rotatable shaft, and the eleventh rotatable shaft.

12. An apparatus as in claim 1,
wherein a first speed conversion ratio between the second rotatable shaft and the seventh rotatable shaft is the same as a second speed conversion ratio between the third rotatable shaft and the eighth rotatable shaft, and
wherein a third speed conversion ratio between the fifth rotatable shaft and the seventh rotatable shaft is the same as a fourth speed conversion ratio between the sixth rotatable shaft and the eighth rotatable shaft.

13. An apparatus as in claim 12, wherein the first speed conversion ratio is the same as the third speed conversion ratio.

14. An apparatus, comprising:
a first rotatable shaft coupled to a second rotatable shaft and to a third rotatable shaft;
a fourth rotatable shaft coupled to a fifth rotatable shaft and to a sixth rotatable shaft;
a first differential coupled to the second rotatable shaft and to a thirteenth rotatable shaft;
a second differential coupled to the third rotatable shaft and to the sixth rotatable shaft;
a seventh rotatable shaft coupled to the first differential;
an eighth rotatable shaft coupled to the second differential;
a first torque and/or speed converter coupled to the seventh rotatable shaft;
a second torque and/or speed converter coupled to the eighth rotatable shaft;
a ninth rotatable shaft coupled to the first torque and/or speed converter;
a tenth rotatable shaft coupled to the second torque and/or speed converter;
an eleventh rotatable shaft coupled to the ninth rotatable shaft and to the tenth rotatable shaft;
a third differential coupled to a twelfth rotatable shaft and to a fourteenth rotatable shaft;
a fourth differential coupled to a fifteenth rotatable shaft and to the fifth rotatable shaft;
a sixteenth rotatable shaft coupled to the third differential;
a seventeenth rotatable shaft coupled to the fourth differential;

a third torque and/or speed converter coupled to the sixteenth rotatable shaft;

a fourth torque and/or speed converter coupled to the seventeenth rotatable shaft;

an eighteenth rotatable shaft coupled to the third torque and/or speed converter and to both the ninth rotatable shaft and the eleventh rotatable shaft;

a nineteenth rotatable shaft coupled to the fourth torque and/or speed converter and to both the ninth rotatable shaft and the eleventh rotatable shaft;

at least one one-way bearing/coupling-uncoupling device coupled to at least one of the first rotatable shaft, the second rotatable shaft, the third rotatable shaft, the fourteenth rotatable shaft, the fifteenth rotatable shaft, a twentieth rotatable shaft, and a twenty first rotatable shaft; and at least one an other one-way bearing/coupling-uncoupling device coupled to at least one of the fourth rotatable shaft, the fifth rotatable shaft, the sixth rotatable shaft, the twelfth rotatable shaft, the thirteenth rotatable shaft, a twenty second rotatable shaft, and a twenty third rotatable shaft.

15. An apparatus as in claim 14, further comprising:

a first gear mechanism or a first other mechanism in the first differential, wherein there are a plurality of rotational speeds of the second rotatable shaft and a plurality of rotational speeds of the thirteenth rotatable shaft whereby a rotational speed of the seventh rotatable shaft is zero, wherein the first gear mechanism or the first other mechanism transfers a rotational speed and torque to or from the seventh rotatable shaft when a difference of rotational speed occurs between the rotational speed of the second rotatable shaft and the rotational speed of the thirteenth rotatable shaft, whereby said difference of rotational speed is different than an other difference of rotational speed between the rotational speed of the second rotatable shaft and the rotational speed of the thirteenth rotatable shaft that causes the rotational speed of the seventh rotatable shaft to be zero, and a second gear mechanism or a second other mechanism in the second differential, wherein there are a plurality of rotational speeds of the third rotatable shaft and a plurality of rotational speeds of the sixth rotatable shaft whereby a rotational speed of the eighth rotatable shaft is zero, and wherein the second gear mechanism or the second other mechanism transfers a rotational speed and torque to or from the eighth rotatable shaft when a difference of rotational speed occurs between a rotational speed of the third rotatable shaft and a rotational speed of the sixth rotatable shaft, whereby said difference of rotational speed is different than an other difference of rotational speed between the rotational speed of the third rotatable shaft and the rotational speed of the sixth rotatable shaft that causes the rotational speed of the eighth rotatable shaft to be zero.

16. An apparatus as in claim 15, further comprising:

a third gear mechanism or a third other mechanism in the third differential, wherein there are a plurality of rotational speeds of the fourteenth rotatable shaft and a plurality of rotational speeds of the twelfth rotatable shaft whereby a rotational speed of the sixteenth rotatable shaft is zero, wherein the third gear mechanism or the third other mechanism transfers a rotational speed and torque to or from the sixteenth rotatable shaft when a difference of rotational speed occurs between the rotational speed of the fourteenth rotatable shaft and the rotational speed of the twelfth rotatable shaft, whereby said difference of rotational speed is different than an other difference of rotational speed between the rotational speed of the fourteenth rotatable shaft and the rotational speed of the twelfth rotatable shaft that causes the rotational speed of the sixteenth rotatable shaft to be zero, and a fourth gear mechanism or a fourth other mechanism in the fourth differential, wherein there are a plurality of rotational speeds of the fifteenth rotatable shaft and a plurality of rotational speeds of the fifth rotatable shaft whereby a rotational speed of the seventeenth rotatable shaft is zero, and wherein the fourth gear mechanism or the fourth other mechanism transfers a rotational speed and torque to or from the seventeenth rotatable shaft when a difference of rotational speed occurs between a rotational speed of the fifteenth rotatable shaft and a rotational speed of the fifth rotatable shaft, whereby said difference of rotational speed is different than an other difference of rotational speed between the rotational speed of the fifteenth rotatable shaft and the rotational speed of the fifth rotatable shaft that causes the rotational speed of the seventeenth rotatable shaft to be zero.

17. An apparatus as in claim 14, wherein a first of the at least one an other one-way bearing/coupling-uncoupling devices transfers rotary torque between the fourth rotatable shaft and the thirteenth rotatable shaft or the twelfth rotatable shaft when the fourth rotatable shaft is rotating in a first direction, or when the first of the at least one an other one-way bearing/coupling-uncoupling device engages to transfer torque, or wherein a second of the at least one an other one-way bearing/coupling-uncoupling devices transfers rotary torque between the fourth rotatable shaft and the sixth rotatable shaft or the fifth rotatable shaft when the fourth rotatable shaft is rotating in a second direction opposite the first direction, or when the second of the at least one an other one-way bearing/coupling-uncoupling device engages to transfer torque.

18. An apparatus as in claim 17, wherein a first of the at least one one-way bearing/coupling-uncoupling devices transfers rotary torque between the first rotatable shaft and the fourteenth rotatable shaft or fifteenth rotatable shaft when the first rotatable shaft is rotating in a first direction, or when the first of the at least one one-way bearing/coupling-uncoupling device engages to transfer torque, or wherein a second of the at least one one-way bearing/coupling-uncoupling devices transfers rotary torque between the first rotatable shaft and the second rotatable shaft or the third rotatable shaft when the first rotatable shaft is rotating in a second direction opposite the first direction, or when the second of the at least one one-way bearing/coupling-uncoupling device engages to transfer torque.

19. An apparatus as in claim 14,
wherein a torque conversion ratio of the first torque and/or speed converter is fixed or is changeable by a first internal control mechanism or by a first external control input, and
wherein a torque conversion ratio of the second torque and/or speed converter is fixed or is changeable by a second internal control mechanism or by a second external control input.

20. An apparatus as in claim 19,
wherein a torque conversion ratio of the third torque and/or speed converter is fixed or is changeable by a third internal control mechanism or by a third external control input, and
wherein a torque conversion ratio of the fourth torque and/or speed converter is fixed or is changeable by a fourth internal control mechanism or by a fourth external control input.

21. An apparatus as in claim 14, wherein at least one of the first rotatable shaft, the fourth rotatable shaft, the seventh rotatable shaft, and the eighth rotatable shaft has coupled to said at least one rotatable shaft at least one coupler.

22. An apparatus as in claim 21, wherein at least one of the at least one coupler includes a device providing a torque conversion ratio.

23. An apparatus as in claim 22, wherein at least one device provides a torque conversion ratio different than at least one other torque conversion ratio provided by at least one other device.

24. An apparatus as in claim 14, wherein a transfer of torque is bi-directional for at least one of the first rotatable shaft, the second rotatable shaft, the third rotatable shaft, the fourth rotatable shaft, the fifth rotatable shaft, the sixth rotatable shaft, the seventh rotatable shaft, the eighth rotatable shaft, the ninth rotatable shaft, the tenth rotatable shaft, the eleventh rotatable shaft, the twelfth rotatable shaft, the thirteenth rotatable shaft, the fourteenth rotatable shaft, the fifteenth rotatable shaft, the sixteenth rotatable shaft, the seventeenth rotatable shaft, the eighteenth rotatable shaft, the nineteenth rotatable shaft, the twentieth rotatable shaft, the twenty first rotatable shaft, the twenty second rotatable shaft, and the twenty third rotatable shaft.

25. An apparatus as in claim 14,
wherein a first speed conversion ratio between the second rotatable shaft and the seventh rotatable shaft is the same as a second speed conversion ratio between the third rotatable shaft and the eighth rotatable shaft, and
wherein a third speed conversion ratio between the fifth rotatable shaft and the seventh rotatable shaft is the same as a fourth speed conversion ratio between the sixth rotatable shaft and the eighth rotatable shaft.

26. An apparatus as in claim 25, wherein the first speed conversion ratio is the same as the third speed conversion ratio.

27. An apparatus as in claim 1, further comprising:
a first another rotatable shaft coupled to a third differential;
a second another rotatable shaft coupled to the first rotatable shaft and to a first motor/generator;
a third another rotatable shaft coupled to the third differential;
a second motor/generator coupled to the third another rotatable shaft and to the fourth rotatable shaft; and
at least one controller in communication with at least one of the first motor/generator or the second motor/generator, or with a third motor/generator coupled to the eleventh rotatable shaft.

28. An apparatus as in claim 27, wherein the at least one controller is in communication with at least one network connection.

29. An apparatus as in claim 14, further comprising:
at least one motor/generator coupled by at least one rotatable shaft to the first rotatable shaft or to the fourth rotatable shaft; and
at least one controller in communication with at least one of the at least one motor/generator or with at least one an other motor/generator coupled to the eleventh rotatable shaft.

30. An apparatus as in claim 29, wherein the at least one controller is in communication with at least one network connection.

* * * * *